(12) United States Patent
Graham et al.

(10) Patent No.: US 7,008,465 B2
(45) Date of Patent: Mar. 7, 2006

(54) CLEANABLE HIGH EFFICIENCY FILTER MEDIA STRUCTURE AND APPLICATIONS FOR USE

(75) Inventors: Kristine M. Graham, Minnetonka, MN (US); Timothy H. Grafe, Edina, MN (US); Mark A. Gogins, Roseville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 6 days.

(21) Appl. No.: 10/869,459

(22) Filed: Jun. 16, 2004

(65) Prior Publication Data

US 2004/0255783 A1    Dec. 23, 2004

Related U.S. Application Data

(60) Provisional application No. 60/479,693, filed on Jun. 19, 2003.

(51) Int. Cl.
  *B03C 3/155*   (2006.01)
  *B03C 3/36*    (2006.01)
(52) U.S. Cl. .............................. 95/78; 55/300; 55/302; 55/385.1; 55/385.3; 55/486; 55/521; 55/528; 55/DIG. 3; 55/DIG. 33; 55/DIG. 35; 95/273; 95/280; 95/287; 96/67; 96/69; 96/226; 210/493.5; 210/505
(58) Field of Classification Search .................. 55/524, 55/527, 528, 521, 497, 498, 486–488, 300, 55/302, 385.1–385.6, DIG. 3, DIG. 33, DIG. 35; 96/67, 69, 226; 95/74, 78, 273, 278–280, 95/286, 287; 210/767, 798, 411, 493.5, 501, 210/503, 505; 977/DIG. 1
See application file for complete search history.

(56) References Cited

U.S. PATENT DOCUMENTS

| | | | |
|---|---|---|---|
| 4,020,783 A | 5/1977 | Anderson et al. | 116/268 |
| 4,188,197 A | 2/1980 | Amberkar et al. | 55/382 |
| 4,223,101 A | 9/1980 | Fine et al. | 528/76 |
| 4,650,506 A | 3/1987 | Barris et al. | 55/487 |
| 4,689,186 A | 8/1987 | Bornat | 264/6 |
| 4,720,292 A | 1/1988 | Engel et al. | 55/337 |
| 5,035,240 A | 7/1991 | Braun et al. | 128/205.27 |
| 5,112,372 A | 5/1992 | Boeckermann et al. | 96/388 |

(Continued)

FOREIGN PATENT DOCUMENTS

DE    299 07 699 U1    8/1999

(Continued)

OTHER PUBLICATIONS

"Time Resolved Measurements of Industrial Pulse-Cleaned Cartridge Dust Collectors", McDonald et al., *Fluid Filtration: Gas*, vol. 1, 1986, pp. 241-256.

(Continued)

*Primary Examiner*—Richard L. Chiesa
(74) *Attorney, Agent, or Firm*—Merchant & Gould P.C.

(57) ABSTRACT

An improved cartridge, typically in cylindrical or panel form that can be used in a dry or wet/dry vacuum cleaner. The cartridge is cleanable using a stream of service water, or by rapping on a solid object, or by using a compressed gas stream, but can provide exceptional filtering properties even for submicron particulate in the household or industrial environment. The cartridge has a combination of nanofiber filtration layer on a substrate. The nanofiber and substrate are engineered to obtain a maximum efficiency at reasonable pressure drop and permeability. The improved cartridge constitutes at least a substrate material and at least a layer including a non-woven, fine fiber separation layer.

228 Claims, 43 Drawing Sheets

U.S. PATENT DOCUMENTS

| | | | |
|---|---|---|---|
| 5,409,642 A | 4/1995 | Allen et al. ..................... 264/6 |
| 5,441,550 A | 8/1995 | Hassenboehler, Jr. et al. ........................... 55/486 |
| 5,539,595 A | 7/1996 | Beck et al. .............. 360/97.01 |
| 5,613,992 A | 3/1997 | Engel ......................... 55/432 |
| 5,639,700 A | 6/1997 | Braun et al. ................ 442/340 |
| 5,672,399 A | 9/1997 | Kahlbaugh et al. ........ 428/36.1 |
| 5,681,469 A | 10/1997 | Barboza et al. ............. 210/503 |
| 5,754,365 A | 5/1998 | Beck et al. .............. 360/97.02 |
| 5,783,086 A | 7/1998 | Scanlon et al. ............. 210/651 |
| 5,869,156 A * | 2/1999 | Chung ....................... 428/35.7 |
| 5,872,678 A | 2/1999 | Boigenzahn et al. .... 360/97.01 |
| 5,872,679 A | 2/1999 | Boigenzahn et al. .... 360/97.01 |
| 5,874,000 A | 2/1999 | Herding ...................... 210/490 |
| D416,308 S | 11/1999 | Ward et al. ................ D23/209 |
| 5,993,501 A * | 11/1999 | Cusick et al. ................. 55/486 |
| 6,165,243 A * | 12/2000 | Kawaguchi et al. .......... 55/524 |
| 6,315,805 B1 | 11/2001 | Strauss ........................ 55/486 |
| 6,372,004 B1 * | 4/2002 | Schultink et al. ............. 55/382 |
| 6,395,046 B1 | 5/2002 | Emig et al. ................... 55/382 |
| 6,409,785 B1 | 6/2002 | Smithies et al. .............. 55/486 |
| 6,537,614 B1 | 3/2003 | Wei et al. .................... 427/331 |
| 6,547,860 B1 | 4/2003 | Buchwald et al. ............. 96/17 |
| 6,550,639 B1 | 4/2003 | Brown et al. ................ 221/135 |
| 6,673,136 B1 | 1/2004 | Gillingham et al. .......... 95/273 |
| 6,716,274 B1 | 4/2004 | Gogins et al. ................ 95/273 |
| 6,743,273 B1 * | 6/2004 | Chung et al. ................. 55/482 |
| 6,746,517 B1 * | 6/2004 | Benson et al. ................ 95/273 |
| 6,800,117 B1 * | 10/2004 | Barris et al. .................. 95/273 |
| 6,872,311 B1 * | 3/2005 | Koslow .................... 210/502.1 |
| 6,875,256 B1 * | 4/2005 | Gillingham et al. .......... 95/273 |
| 6,924,028 B1 * | 8/2005 | Chung et al. ............... 428/357 |
| 2001/0042361 A1 | 11/2001 | Cox et al. ..................... 55/382 |
| 2002/0011051 A1 | 1/2002 | Schultheib et al. ........... 55/382 |
| 2002/0046656 A1 | 4/2002 | Benson et al. ................ 95/287 |
| 2002/0056684 A1 | 5/2002 | Klein ......................... 210/491 |
| 2002/0073667 A1 | 6/2002 | Barris et al. .................. 55/486 |
| 2003/0010002 A1 | 1/2003 | Johnson et al. ............... 55/486 |
| 2003/0177909 A1 * | 9/2003 | Koslow ....................... 96/154 |
| 2004/0035095 A1 * | 2/2004 | Healey ....................... 55/486 |
| 2004/0187454 A1 * | 9/2004 | Chung et al. ................. 55/482 |

FOREIGN PATENT DOCUMENTS

| | | | | |
|---|---|---|---|---|
| JP | | 3-52610 | * 3/1991 | .................. 55/524 |
| WO | WO 01/32292 A1 | | 5/2001 | |
| WO | WO 02/20134 A2 | | 3/2002 | |

OTHER PUBLICATIONS

"An Optical Particle Counting System for Testing Industrial Pulse-Cleaned Cartridge Dust Collectors", Liu et al., *Particle Characterization*, vol. 3, 1986, pp. 68-73.

* cited by examiner

CLEANABLE HIGH EFFICIENCY FILTER MEDIA STRUCTURE AND APPLICATIONS FOR USE

RELATED APPLICATION

This application claims priority under 35 U.S.C. §119(e) to U.S. provisional patent application Ser. No. 60/479,693 filed Jun. 19, 2003, which application is incorporated by reference herein.

FIELD OF THE INVENTION

The invention relates to a cleanable, efficient filter structure that can be used generally in filtration applications including in a vacuum cleaner, a dust collector, a gas turbine inlet air filter system, or a variety of other applications to remove dust, dirt and other particulate from a gaseous or contaminated air stream. The filter is both an excellent dust and dirt removal structure but also is mechanically robust and can easily be cleaned using a number of simple techniques. Generally the filters can be used in dust collectors, gas turbine inlet air filter systems, and a variety of other filter applications can be operated without substantial reduction of airflow, efficiency or other beneficial filtration parameters. One specific application includes a cartridge or panel in a vacuum cleaner including machines that can be operated both wet and dry conditions.

BACKGROUND OF THE INVENTION

Gas streams often carry particulate material. In many instances, it is desirable to remove some or all of the particulate material from a gas flow stream. For example, air intake streams to engines for motorized vehicles or power generation equipment, gas streams directed to gas turbines, and air streams to various combustion furnaces, often include entrained particulate material. The particulate material, should it reach the internal workings of the various mechanisms involved, can cause substantial damage. Removal of the particulate material from the gas flow upstream of the engine, turbine, furnace or other equipment involved is often needed.

The invention relates to polymeric fine fiber compositions used on a enhanced efficiency, (e.g.) HEPA or ULPA substrate. The fine fiber compositions have improved properties that can be used in a variety of applications including the formation of fibers, microfibers, nanofibers, fiber webs, fibrous mats, permeable structures such as membranes, coatings or films. The polymeric materials of the invention are compositions that have physical properties that permit the polymeric material, in a variety of physical shapes or forms, to have resistance to the degradative effects of humidity, heat, air flow, chemicals and mechanical stress or impact.

In making fine fiber filter media, a variety of materials have been used including fiberglass, metal, ceramics and a range of polymeric compositions. A variety of fiber forming methods or techniques have been used for the manufacture of small diameter micro- and nanofibers. One method involves passing the material through a fine capillary or opening either as a melted material or in a solution that is subsequently evaporated. Fibers can also be formed by using "spinnerets" typical for the manufacture of synthetic fiber such as nylon. Electrostatic spinning is also known. Such techniques involve the use of a hypodermic needle, nozzle, capillary or movable emitter. These structures provide liquid solutions of the polymer that are then attracted to a collection zone by a high voltage electrostatic field. As the materials are pulled from the emitter and accelerate through the electrostatic zone, the fiber becomes very thin and can be formed in a fiber structure by solvent evaporation.

Industrial dust collection equipment is also required to remove greater proportions of smaller and smaller particles from process air streams due to increasingly stringent regulatory requirements. Gas turbine intake filtration systems also must remove quantities of very small particles as the presence of such particles can cause irreparable damage to turbine blades. The cleanliness of an environment, the health of its occupants, the effectiveness of industrial processes, the maintenance of industrial equipment, and the overall aesthetics of living require that submicron particulate materials be readily removed by filter from an air stream.

In order to achieve submicron particulate removal from air streams passing through such systems, inertial separators tend to simply place a physical barrier in the path of particulate material that is then knocked from the air stream into a collection bin. Paper bag dust collectors are simply filters based on paper filter technologies in a bag form. Such paper bags are typically simply fit across the air stream for the purpose of separating particulate from the air stream.

Newer filters have been designed with a collection filter or a flat panel or cylindrical cartridges. In these applications, a HEPA filtering material is used. Typically such HEPA Structures include an expanded PTFE (stretched Teflon) layer with a layer of a melt blown fiber combined in a filter construction, or a cellulose filter paper layer with a layer of melt blown fiber combined in a filter construction. These structures are often cleaned simply by rapping the filter or by blowing filter cake or particulate from the filter using compressed air streams.

The filtration efficiency and cleanability of newer filters is important. These filters must be able to remove dust and dirt, but must be easily cleanable without damage to the filter. Often cleaning dirty filters by rapping the filter on a solid object to dislodge dust and dirt can cause the filter media to fail or can cause multilayered elements to delaminate, thus causing the filter to fail through the formation of a pathway for the dust and dirt through the filter structure. Another failure mode occurs when fine dust particles are trapped into the depth of the filter media, such that the dust cannot be dislodged by typical filter cleaning mechanisms, resulting in reduced vacuum power and shorter filter life.

The technology disclosed herein relates to an on-going development of Donaldson Company Inc., of Minneapolis, Minn., the assignee of the present invention. The disclosure concerns continuing technology development related, in part, to the subjects characterized in U.S. Pat. Nos. B2 4,720,292; Des. 416,308; 5,613,992; 4,020,783; and 5,112,372. Donaldson, Inc., of Minneapolis, Minn.; also owns each of the patents identified in the previous sentence and, the complete disclosure of each is incorporated herein by reference.

The invention also relates to polymer materials used as a robust HEPA or ULPA substrate, can be manufactured with improved environmental stability to heat, humidity, reactive materials and mechanical stress. Such materials can be used in the formation of fine fibers such as microfibers and nanofiber materials with improved stability and strength. As the size of fiber is reduced the survivability of the materials is increasingly more of a problem. Such fine fibers are useful in a variety of applications. In one application, filter structures can be prepared using this fine fiber technology. The invention relates to polymers, polymeric composition, fiber, filters, filter constructions, and methods of filtering. Applications of the invention particularly concern filtering of particles from fluid streams, for example from air streams and liquid (e.g. non-aqueous and aqueous) streams. The techniques described concern structures having one or more layers of fine fibers in the filter media. The compositions and fiber sizes are selected for a combination of properties and survivability.

One example of a dust filter vacuum technology using a fine fiber layer in a vacuum bag is Emig et al., U.S. Pat. No. 6,395,046. One example of a filter cartridge in a wet/dry vacuum using expanded PTFE or stretched Teflon is Scanlon et al., U.S. Pat. No. 5,783,086. One example of a cellulose filter paper/melt blown layered filter is the Ridgid-brand VF5000 filter available at Home Depot stores. One example of a scrimmed HEPA filter is the Shop-Vac 903-34-00 HEPA Cartridge Filter available from www.shop-vac.com. Filter materials, such as scrimmed HEPA media often have high efficiency, but often have short lifetimes and can be degraded through water exposure. Expanded PTFE media typically have very high pressure drops and moderate HEPA efficiency. Cellulose filter paper/melt blown layered filters typically exhibit poor filter cleanability.

The market for general-purpose vacuum cleaners and for wet/dry vacuum systems has imposed increasingly high standards of performance for the vacuum cleaners and their filters over recent years. The devices are required to remove greater and greater proportions of smaller and smaller particles from streams obtained by the vacuum cleaner from often-harsh wet or dry environments in the home, garage, basement, shop, yard, and a variety of industrial environments. The increased requirements satisfy needs for improved health, reduced allergies, improved cleanability, reduced ambient particle counts, and other requirements for home, shop, and industrial environments.

A substantial need exists, in light of attempts using prior filter structures, to obtain filtration at moderate to low pressure drop, extended lifetime, filtration ability to remove large amounts of submicron particulate at relatively high flow rates and extended lifetimes. The preferred filter is cleanable mechanically with by rapping on a solid object or by a simple water wash, and can survive repeated use and cleaning cycles.

BRIEF DESCRIPTION OF THE INVENTION

The invention relates to a layered filter media, to a filter structure in the form of a flat panel or a cylindrical cartridge. The filter uses a unique combination of active filtration layers including at least a high efficiency substrate and at least one fine fiber or nanofiber layer to effectively remove dust, dirt and other particulate. Such a substrate type can include HEPA media, fiberglass HEPA, ULPA media, 95% DOP media, melt blown media, electret media, cellulose/meltblown layered media, etc. We have found that the combination of the appropriate sized layers in a filter, using a flat panel or cylindrical structure will obtain, in the systems adapted for use with this unique filter, a substantial removal of even fine dust loadings from an air stream in a mechanically robust unit. The filter of the invention can be configured for insertion as a filter structure, panel or cylindrical cartridge into a filtration unit. The filter comprises a high efficiency substrate layer or combination of layers with at least one layer of nanofiber or fine fiber formed on the substrate layer or combination of layers. The nanofiber layer and the high efficiency substrate are selected to obtain a balanced set of properties that permits the user to remove submicron particles efficiently at a relatively low-pressure drop. A high efficiency substrate (either a single layer or a layered substrate structure) has a particulate efficiency exceeding 80% when tested in accordance with ASTM 1215. We have found that the combination of an efficient nanofiber layer and a high efficiency filter media provides substantial filtration efficiency, ease of cleanability regardless of cleaning method used to clean the filter and lower manufacturing cost. The layered structure can comprise a layer of a series of coarse separation media separating the fine fiber from the substrate.

The invention can be used in the form of filter media, filter cartridges, in the form of a flat panel or cylindrical unit, can be used in a variety of filtering method applications. Such applications include filtering both gaseous and liquid flows, vacuum cleaner, dust removal, automotive and other transportation applications (including both wheeled vehicles and filtration applications in aircraft equipment), use of these materials in the Powercore (Z-media) applications by Donaldson Company, Inc., filtration of gas turbine intake power station streams, filtering room air for military, residential, industrial and healthcare, semiconductor manufacture and other applications where reduction of small particulate is important for health, effective production, cleanliness, safety or other important purposes, filtering air streams in military applications for the purpose of removing biohazard or chemhazard materials from the local environment, filtration for closed ventilation equipment, used, for example, in a space shuttle, aircraft air recirculation, submarines, clean rooms and other such closed applications, as a high efficiency filter in respirator devices used by public service/safety personnel such as police and fire, military personnel, civilian populations, hospital populations, industrial workers, and others requiring a high degree of efficiency in removing small particulate from inhaled atmospheres.

The filter media structures of the invention can also be used as a high efficiency filter and liquid applications. In such applications, a typically liquid material including aqueous and non-aqueous liquids flowing through a conduit can encounter a filter positioned across the stream in a "dead end" or "cross flow" orientation. In dead end filtration the particulate impacts the filter and is removed. In cross flow mode, the liquid stream passes across the fiber while the smooth surface morphology of the nanofiber layers enhances the cleaning capacity of the media surface from the cross flow effect. The useful life of the structure is substantially improved by the presence of the high efficiency nanofiber layer across the high efficiency or ULPA layer.

We have found that the performance of vacuum cleaners including wet/dry vacuum systems and shop/vac systems can be substantially improved with the use of a layered media comprising at least one layer of a fine fiber and a layer of a high efficiency media. The layered media can also comprise other filtration and spacing layers. The media can be made into a filter structure in the form of a panel or cartridge. Our experimentation shows that such structures can successfully remove submicron particulate from an air stream at substantial flow rates at reasonable pressure drops. The structure provides a filtration efficiency, efficient cleanability and lower manufacturing costs. The preferred system comprises one or more layers of the nanofiber formed on a substrate using a scrim or a coarse fiber non-woven layer as a separation layer. The combination of the nanofiber layer, scrim separation and the fiberglass substrate provides high efficiency, low pressure drop, efficient cleanability and lower manufacturing costs and robust mechanical stability, even in the face of rough cleaning practices.

Methods for the cleaning of an air intake stream in a gas turbine system are also provided. The methods include utilizing preferred filter media. In general, the preferred media concern utilization, within an air filter, of barrier media, typically pleated media, and fine fibers, to advantage.

The filter media includes at least a micro- or nanofiber web layer in combination with a substrate material in a mechanically stable filter structure. These layers together provide excellent filtering, high particle capture, efficiency at minimum flow restriction when a fluid such as a gas or liquid passes through the filter media. The substrate can be positioned in the fluid stream upstream, downstream or in an internal layer. A variety of industries have directed substantial attention in recent years to the use of filtration media for filtration, i.e. the removal of unwanted particles from a fluid such as gas or liquid. Such filtration processes require the mechanical strength, chemical and physical stability of the microfiber and the substrate materials. The filter media can be exposed to a broad range of temperature conditions, humidity, mechanical vibration and shock and both reactive and non-reactive, abrasive or non-abrasive particulates entrained in the fluid flow. Further, the filtration media often require the self-cleaning ability of exposing the filter media to a reverse pressure pulse (a short reversal of fluid flow to remove surface coating of particulate), mechanical vibration or other cleaning mechanism that can remove entrained particulate from the surface of the filter media. Such reverse cleaning can result in substantially improved (i.e.) reduced pressure drop after the pulse or vibratory cleaning. Particle capture efficiency typically is not improved after pulse or vibratory cleaning, however such pulse or vibratory cleaning will reduce pressure drop, saving energy for filtration operation. Such filters can be removed for service and cleaned in aqueous or non-aqueous cleaning compositions. Processing including spinning fine fiber and then forming an interlocking web of microfiber on a porous substrate can often form such media. In the spinning process the fiber can form physical bonds between fibers to interlock the fiber mat into a integrated layer. Such a material can then be fabricated into the desired filter format such as cartridges, flat disks, canisters, panels, bags and pouches. Within such structures, the media can be substantially pleated, rolled or otherwise positioned on support structures.

In a first aspect of the invention, it is a filter media or filter structure having at least one layer of a fine fiber or nanofiber with a high efficiency substrate. In a second aspect of the invention is a layer of fine fiber or nanofiber with a high permeability scrim layer combined with a high efficiency substrate. A third aspect of the invention is a layer of nanofiber or fine fiber combined with a layer of scrim and a layer of a high efficiency substrate having a second scrim layer opposite the previous scrim layer. A fourth aspect of the invention is a layer of nanofiber or fine fiber combined with a scrim layer, a high efficiency substrate combined with scrim layer and a final fine fiber or nanofiber layer. A fifth aspect of the invention comprises a nanofiber or fine fiber layer combined with a substrate followed by a second nanofiber or fine fiber layer. A sixth aspect of the invention comprises a nanofiber layer combined with a scrim layer, a high efficiency substrate layer and a second nanofiber layer. Lastly, a final aspect of the invention comprises a nanofiber layer combined with a substrate layer and a scrim layer. In these aspects, the nanofiber or fine fiber layer can be spun onto any convenient spinnable substrate and combined with the other layers in the active filter media as desired. Alternatively, the fine fiber or nanofiber layer can be spun onto the next adjacent layer for media or filter manufacture. In any of the above aspects, the recitation of a single nanofiber, scrim or substrate layer can connote multiple layers of that material in the high efficiency structure. Such a structure, each layer in a combined (e.g.) substrate layer can have a lower single layer efficiency, however, in combination with other substrate layers, can have an efficiency substantial enough to be a high efficiency substrate as defined in the invention. Additionally, multiple layers of nanofiber or fine fiber can be used as well as multiple layers of scrim depending on the design philosophy of the media or filter unit.

BRIEF DESCRIPTION OF THE DRAWINGS

FIGS. 4 through 6 show that the layered media of the invention (FIG. 4) showed excellent dust removal at the conditions of the experiment, but could be cleaned and returned essentially to new conditions repeating the excellent filtration characteristics of the original material. The fiberglass HEPA filter shown in FIG. 5 and the PTFE media shown in FIG. 6, both failed to both obtain excellent cleanability and to return to high filter characteristics after three cleaning cycles.

DETAILED DESCRIPTION OF THE INVENTION

Figure 1:
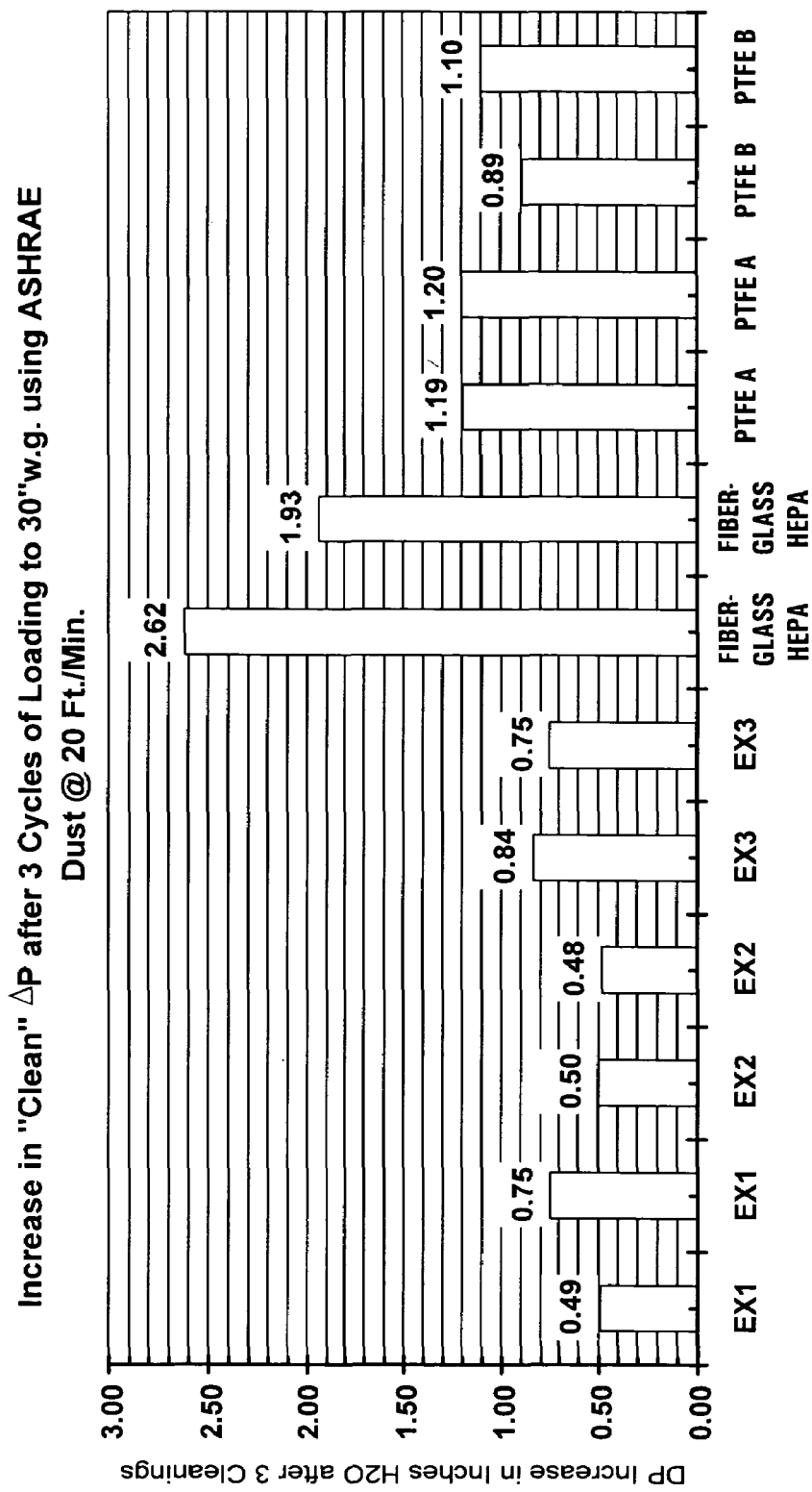
FIG. 1 shows the graphical data demonstrating the increase in resistance to air flow after repeated cleanings of the filter material compared to other filter materials. The added fine fiber layer in the flat panel structure exemplified in the application significantly enhances the cleanability of the glass fiber material. The smaller increase in the "clean" pressure drop indicates that significantly greater amounts of dust and dirt are removed from the fiber of the invention when cleaned.

The layered media includes at least a fine fiber or nanofiber web layer in combination with a high efficiency substrate material in a mechanically stable structure. The fine fiber layer must be sufficiently mechanically and chemically stable to obtain surface loading of dust and dirt with no substantial harm or deterioration to the layers in the filter during use or cleaning. The filter media of the invention are manufactured by spinning fine fiber onto a layer and then forming an interlocking web of microfiber on a high efficiency substrate. In the spinning process the fiber can form physical bonds between fibers to interlock the fiber mat into an integrated layer on the substrate. The layered media can include a coarse non-woven scrim.

The invention relates to polymeric compositions with improved properties that can be used in the formation of nanofibers, fiber webs, fibrous mats, etc. in a filter media, flat panel or cartridge. The fine fibers that comprise the micro- or nanofiber containing layer of the invention can be fiber and can have a diameter of about 0.05 to 0.5 micron. The thickness of the typical fine fiber layer ranges from about 1 to 100 times the fiber diameter (i.e. about 0.05 to 50 microns) with a basis weight ranging from about $3\times10^{-7}$ to $6\times10^{-5}$ grams-cm$^{-2}$.

The polymer materials that can be used in the fine fiber or the polymeric fiber layers, in the filters of the invention include both addition polymer and condensation polymer materials such as polyolefin, polyacetal, polyamide, polyester, cellulose ether and ester, polyalkylene sulfide, polyarylene oxide, polysulfone, modified polysulfone polymers and mixtures thereof. Preferred materials that fall within these generic classes include polyethylene, polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. One class of polyamide condensation polymers include nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of epsilon caprolactam in the presence of a small amount of water. This reaction forms a nylon-6 (made from a cyclic lactam—also known as episilon-aminocaproic acid) that is a linear polyamide. Further, nylon copolymers are also contemplated. Copolymers can be made by combining various diamine compounds, various diacid compounds and various cyclic lactam structures in a reaction mixture and then forming the nylon with randomly positioned monomeric materials in a polyamide structure. For example, a nylon 6,6-6,10 material is a nylon manufactured from hexamethylene diamine and a $C_6$ and a $C_{10}$ blend of diacids. A nylon 6-6,6-6,10 is a nylon manufactured by copolymerization of epsilonaminocaproic acid, hexamethylene diamine and a blend of a $C_6$ and a $C_{10}$ diacid material.

Block copolymers are also useful in the process of this invention. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene (ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, can be solution spun with relative ease because they are soluble at low pressures and temperatures. However, highly crystalline polymer like polyethylene and polypropylene require high temperature, high pressure solvent if they are to be solution spun. Therefore, solution spinning of the polyethylene and polypropylene is very difficult. Electrostatic solution spinning is one method of making nanofibers and microfiber.

We have also found a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material. Further, differing species of a general polymeric genus can be blended. For example, a high molecular weight styrene material can be blended with a low molecular weight, high impact polystyrene. A Nylon-6 material can be blended with a nylon copolymer such as a Nylon-6; 6,6; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinlced using crosslinking agents that are reactive with the nitrogen atom in the amide linkage. Polyvinylalcohol materials can be crosslinked using hydroxyl reactive materials such as monoaldehydes, such as formaldehyde, ureas, melamine-fonnaldehyde resin and its analogues, boric acids and other inorganic compounds, dialdehydes, diacids, urethanes, epoxies and other known crosslinking agents. Crosslinking technology is a well known and understood phenomenon in which a crosslinking reagent reacts and forms covalent bonds between polymer chains to substantially improve molecular weight, chemical resistance, overall strength and resistance to mechanical degradation.

The fine fiber can be made of a polymer material or a polymer plus additive. One preferred mode of the invention is a polymer blend comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning Calorimeter analysis reveals a single polymeric material. Such a material, when combined with a preferred additive material, can form a surface coating of the additive on the microfiber that provides oleophobicity, hydrophobicity or other associated improved stability when contacted with high temperature, high humidity and difficult operating conditions. The fine fiber of the class of materials can have a diameter of about 0.01 to 5 microns. Such microfibers can have a smooth surface comprising a discrete layer of the additive material or an outer coating of the additive material that is partly solubilized or alloyed in the polymer surface, or both. Preferred materials for use in the blended polymeric systems include nylon 6; nylon 66; nylon 6-10; nylon (6-66-610) copolymers and other linear generally aliphatic nylon compositions. A preferred nylon copolymer resin (SVP-651) was analyzed for molecular weight by the end group titration. (J. E. Walz and G. B. Taylor, determination of the molecular weight of nylon, Anal. Chem. Vol. 19, Number 7, pp 448–450 (1947). A number average molecular weight ($M_n$) was between 21,500 and 24,800. The composition was estimated by the phase diagram of melt temperature of three component nylon, nylon 6 about 45%, nylon 66 about 20% and nylon 610 about 25%. (Page 286, Nylon Plastics Handbook, Melvin Kohan ed. Hanser Publisher, New York (1995)).

Reported physical properties of SVP 651 resin are:

| Property | ASTM Method | Units | Typical Value |
| --- | --- | --- | --- |
| Specific Gravity | D-792 | — | 1.08 |
| Water Absorption (24 hr immersion) | D-570 | % | 2.5 |
| Hardness | D-240 | Shore D | 65 |
| Melting Point | DSC | ° C.(° F.) | 154 (309) |
| Tensile Strength @ Yield | D-638 | MPa (kpsi) | 50 (7.3) |
| Elongation at Break | D-638 | % | 350 |
| Flexural Modulus | D-790 | MPa (kpsi) | 180 (26) |
| Volume Resistivity | D-257 | ohm-cm | $10^{12}$ |

We have found that additive materials can significantly improve the properties of the polymer materials in the form of a fine fiber. The resistance to the effects of heat, humidity, impact, mechanical stress and other negative environmental effect can be substantially improved by the presence of additive materials. We have found that while processing the microfiber materials of the invention, that the additive materials can improve the oleophobic character, the hydrophobic character and can appear to aid in improving the chemical stability of the materials. We believe that the fine fibers of the invention in the form of a microfiber are improved by the presence of these oleophobic and hydrophobic additives as these additives form a protective layer coating, ablative surface or penetrate the surface to some depth to improve the nature of the polymeric material. We believe the important characteristics of these materials are the presence of a strongly hydrophobic group that can preferably also have oleophobic character. Strongly hydrophobic groups include fluorocarbon groups, hydrophobic hydrocarbon surfactants or blocks and substantially hydrocarbon oligomeric compositions. These materials are manufactured in compositions that have a portion of the molecule that tends to be compatible with the polymer material affording typically a physical bond or association with the polymer while the strongly hydrophobic or oleophobic group, as a result of the association of the additive with the polymer, forms a protective surface layer that resides on the surface or becomes alloyed with or mixed with the polymer surface layers. For 0.2-micron fiber with 10% additive level, the surface thickness is calculated to be around 50 Å, if the additive has migrated toward the surface. Migration is believed to occur due to the incompatible nature of the oleophobic or hydrophobic groups in the bulk material. A 50 Å thickness appears to be reasonable thickness for protective coating. For 0.05-micron diameter fiber, 50 Å thickness corresponds to 20% mass. For 2 microns thickness fiber, 50 Å thickness corresponds to 2% mass. Preferably the additive materials are used at an amount of about 2 to 25 wt. %. Oligomeric additives that can be used in combination with the polymer materials of the invention include oligomers having a molecular weight of about 500 to about 5000, preferably about 500 to about 3000 including fluoro-chemicals, nonionic surfactants and low molecular weight resins or oligomers. A useful material for use as an additive material in the compositions of the invention is tertiary butylphenol oligomers. Such materials tend to be relatively low molecular weight aromatic phenolic resins. Such resins are phenolic polymers prepared by enzymatic oxidative coupling. The absence of methylene bridges result in unique chemical and physical stability. These phenolic resins can be crosslinked with various amines and epoxies and are compatible with a variety of polymer materials. Examples of these phenolic materials include Enzo-BPA, Enzo-BPA/phenol, Enzo-TBP, Enzo-COP and other related phenolics were obtained from Enzymol International Inc., Columbus, Ohio.

An extremely wide variety high efficiency media materials exist for different applications. These substrate media can include HEPA, ULPA, HEPA fiberglass, 95% DOP, melt blown layers, electret fiber layers, and cellulose/meltblown layered media. The durable nanofibers and microfibers described in this invention can be added to any of these media. These media can be woven or non-woven. The fabrics can be single layer or multilayer. Each layer can comprise a single component woven or non-woven fiber or a blended, woven or non-woven fiber. The layers can be combined with other layers such as scrim, or with other useful filter layers. The substrate can be inherently hydrophilic or hydrophobic or can be treated to acquire such a character. The substrate can be treated to include antimicrobial, virucidal or other capacity to reduce the populations of infectious agents The construction according to the invention includes a first layer of fine fiber. The fine fiber is secured to a surface of a layer of media. The microfiber or nanofiber of the unit can be formed by the common electrostatic spinning process. Barris, U.S. Pat. No. 4,650,506, details the apparatus and method of the electro spinning process and is expressly incorporated herein by reference. Apparatus used in such process includes a reservoir in which the fine fiber forming polymer solution is contained, a pump and a rotary type emitting device or emitter to which the polymeric solution is pumped and applied. The emitter generally consists of a rotating portion. The rotating portion then obtains polymer solution from the reservoir, and as it rotates in the electrostatic field, the electrostatic field, as discussed below, accelerates a droplet of the solution toward the collecting fabric surface. Facing the emitter, but spaced apart therefrom, is a substantially planar grid upon which the collecting surface (i.e. fabric or multilayer of multifiber fabric is positioned. Air can be drawn through the grid. The collecting surface is positioned adjacent opposite ends of grid. A high voltage electrostatic potential is maintained between emitter and grid by means of a suitable electrostatic voltage source.

In use, the polymer solution is pumped to the rotating portion from reservoir. The electrostatic potential between grid and the emitter imparts a charge to the material that cause liquid to be emitted therefrom as thin fibers which are drawn toward grid where they arrive and are collected on substrate fabrics. In the case of the polymer in solution, solvent is evaporated off the fibers during their flight to the grid; therefore, the fibers arrive at the fabric. The fine fibers bond to the fabric fibers first encountered at the grid. Electrostatic field strength is selected to ensure that the polymer material as it is accelerated from the emitter to the fabric; the acceleration is sufficient to render the material into a very thin microfiber or nanofiber structure. Increasing or slowing the advance rate of the collecting fabric can deposit more or less emitted fibers on the forming fabric, thereby allowing control of the thickness of each layer deposited thereon.

The nanofiber layer can have a fiber size of about 0.01 to 2 microns or 0.05 to 0.5 micron, a basis weight of about $3\times10^{-7}$ to $6\times10^{-5}$ grams-cm$^{-2}$, a pore size of about 0.01 to 100 microns. The substrate similarly has a preferred basis weight of about 0.2 oz-yd$^{-2}$ to 350 lb-3000 ft$^{-2}$, thickness of about 0.001 to 0.2 inches. The fiber media is typically pleated and formed into the cartridge using a frame and adhesive materials to adhere the filter media into the panel or cartridge frame structure. The overall filter cartridge has an efficiency in removing a 0.1 micron particle at 10 ft-min$^{-1}$ of about 35 to 99.99995% and an efficiency in removing a 0.76 micron particle at 10 ft-min$^{-1}$ of about 80 to greater than 98% or about 80 to 99.99995% tested according to ASTM 1215. The cartridges can typically flow air and efficiently remove particulate at a rate from about 5 to about $10^4$ cubic feet per minute. These properties are unique and are an in important aspect of the robust filters of the invention.

The filters of the invention can be made by forming at least a nanofiber or fine fiber layer on a base media or substrate layer. That multilayered structure can include other filtration and non-filtration layers as needed. The base media layer can comprise a HEPA, ULPA, 95% DOP grade, a melt blown, cellulose/melt blown layered, or an electret media as long as the media is a high efficiency media. For purposes of this patent application, "high efficiency media" means a particulate efficiency exceeding 80% when tested in accordance with ASTM 1215.

The base media or substrate layer can comprise a HEPA (High Efficient Particle Arrester) filter, say, of class 100 (allowing less than 100 particles of sizes greater than 0.5 microns per cubic foot). An ULPA (Ultra Low Particle Arrester) of class 10 (allowing less than 10 particles of sizes greater than 0.3 microns per cubic foot) may be substituted, depending on the circumstances.

One example of a useful base filter media or substrate layer is a base filter media that allows less than 5% to 0.0005% of particle penetration (efficiency of 95% to 99.9995%) when measured using the DOP aerosol penetration tests. Such base filter media are typically woven or non-woven filtration media made from staple fibers including both natural and synthetic fibers. Fibers that can be used in the base media of the invention include fiberglass fibers, metallic fibers, elastomeric fibers, non-elastomeric polymers, polyurethanes, polyesters, polyamides, and others.

The base media of the invention can also comprise a non-woven fabric, particularly a melt blown, non-woven fabric preferred due to the micro size of the filters and fiber, i.e. micro porosity, and the random collection of the fibers resulting in small pore size, high efficiency and resistance to particle penetration. The melt blown, non-woven fabrics exhibit filtration properties at reasonable pressure drop. Such melt blown fabrics can be made by a variety of known melt driven, fiber blowing techniques. Common thermoplastic materials can be used in the manufacture of the non-woven, melt blown materials of the invention. Typical melt blown polymers include polyolefins such as polyethylene and polypropylene, polyesters, polyamide nylons and other non-wovens of reasonable Tm. Thermoplastic, melt blown, spun bonded, man-made, non-woven fiber of the invention can have a relatively light weight, between about 0.05 to about 10 oz-yd$^{-2}$.

The base layer of the multilayer structure of the invention can include an electret or tribo electret system. The term "electret" or "tribo electret" charging technique results from a structure in the polymer make-up of the substrate, media or non-woven material of the invention that results in an electrostatic charge forming permanently on the fibers. This tribo electric or electrostatic or static electric charge results from an imbalance of electrons on a material fiber. Such charges generally can be formed on non-conductive surface materials including both synthetic and non-synthetic, organic and inorganic fibrous materials. The non-woven fabric of the invention can be formed into a tribo electret form by creating a tribo electret effect through coating, spinning in a strong electrostatic field by coextruding different materials. Creating an electret or tribo electret effect is a well known aspect of non-woven formation and is discussed in a variety of U.S. patents. Electret or tribo electret fibers can include a synthetic material such as polyolefins, polyesters, polyamides, acrylonitriles, vinyl polymers, vinylidene polymers, polyvinylidene polymers, modified polymers, alloys, semi-synthetic materials such as cellulose acetate and PTFE. Such fibers may also include natural materials such as rubber, latex, cotton, cotton blends, wool blends, cellulose, cellulose derivatives, etc. Once converted into a tribo electret or electret form, the sheets may induce a total or increased static voltage of greater than about 500 volts, often in the range of about 500 to 1000 volts.

The HEPA base layer or substrate is preferably constructed of an fiber glass material. One example is synthetic glass fiber filter medium, coated or uncoated and corrugated to enhance performance. The media has a face velocity of at least 0.1 ft/min., no greater than 200 ft-min$^{-1}$, and typically about 1 to 100 ft.-min$^{-1}$. The pleat depth is no less than 0.25 in., no greater than 3 in., and typically about 0.5–2 in. The pleat length is at least 1 in., no greater than 20 in., and typically 3–10 in. The pleated media has an upstream media surface area of at least 2 ft$^2$ and preferably about 3–5 ft$^2$. There are at least 30 pleats, no greater than about 150 pleats, and typically about 60–100 pleats. The synthetic glass fiber filter media may be coated with a low surface energy material, such as an aliphatic fluorocarbon material, available from 3M of St. Paul, Minn.

In one preferred mode of the invention, the filter media is made by forming a multilayered structure having the high performance, high efficiency substrate at the center followed by one or more coarse, non-woven spacer or scrim layers followed by one or more nanofiber or fine fiber layers. In this mode, the fine fiber material can be electrospun onto the coarse, non-woven or scrim in a prespinning step prior to combination with the high efficiency substrate layer. Alternatively, the scrim layer or layers can be combined with the high efficiency layer and then the nanofiber or fine fiber layer can be added to the premade scrim substrate laminate. The scrim can be treated to include anti-microbial, virucidal or other capacity to reduce the populations of infectious agents.

In general, commercially available fibrous scrims can be used as the coarse support. Polyester, nylon, and other suitable materials can be used as the mesh or scrim. Preferably, the material comprises a scrim having an efficiency of about 10% or less or 4% or less for 0.78 micron particles when tested in accordance with ASTM 1215, to which sufficient fine fibers have been applied to provide a composite efficiency of at least 10% or more for 0.78 micron particles as described above. In such arrangements, preferably the coarse fiber scrim is a material having a permeability, without the fine fiber layer applied thereto, of less than 2000 ft$^3$-min$^{-1}$, often in the range of about 10 to 100 ft$^3$-min$^{-1}$ when tested in accordance with ASTM D-737. One such scrim is Reemay 2011, commercially available from Reemay Co. of Old Hickory, Ind. 37138. In general, it comprises 0.7 oz/yd$^2$., spunbonded polyester. Alternatively, Veratec grade 9408353, spun bonded polypropylene can be used. The coarse support comprises a matrix of polyester fibers of 25 to 35 microns in diameter.

DETAILED DESCRIPTION OF CERTAIN DRAWINGS

FIG. 1 shows the graphical data demonstrating the increase in resistance to air flow after repeated cleanings of the filter material compared to other filter materials. The added fine fiber layer in the flat panel structure exemplified in the application significantly enhances the cleanability of the glass fiber material. The smaller increase in the "clean" pressure drop indicates that significantly greater amounts of dust and dirt are removed from the fiber of the invention when cleaned.

Figure 2:
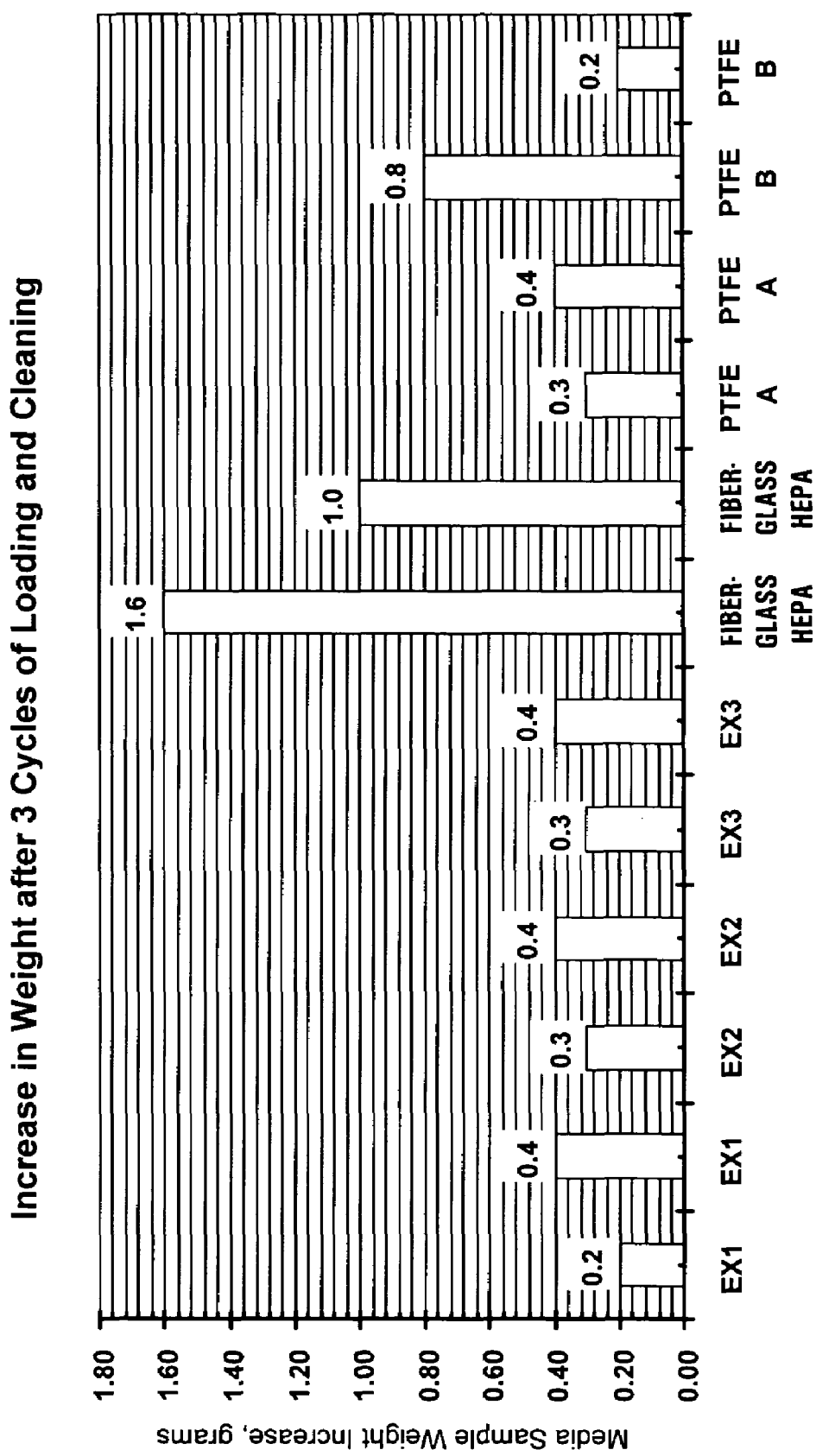
FIG. 2 shows that dust and dirt retention of the media can be returned to a low level after repeated use and cleaning. After three cycles of loading and cleaning of dust and dirt in the experiment of the invention, the HEPA material held significantly more dust than the fine fiber HEPA layer and than the PTFE material. The fine fiber layered material achieved a surface loading and because the dust and dirt resides substantially on the surface of the fine fiber layer, the dirt is easily removed resulting in exceptional cleanability.

FIG. 2 shows that dust and dirt retention of the media can be returned to a low level after repeated use and cleaning. After three cycles of loading and cleaning of dust and dirt in the experiment of the invention, the HEPA material held significantly more dust than the fine fiber HEPA layer and than the PTFE material. The fine fiber layered material achieved a surface loading and because the dust and dirt resides substantially on the surface of the fine fiber layer, the dirt is easily removed resulting in exceptional cleanability.

Figure 3:
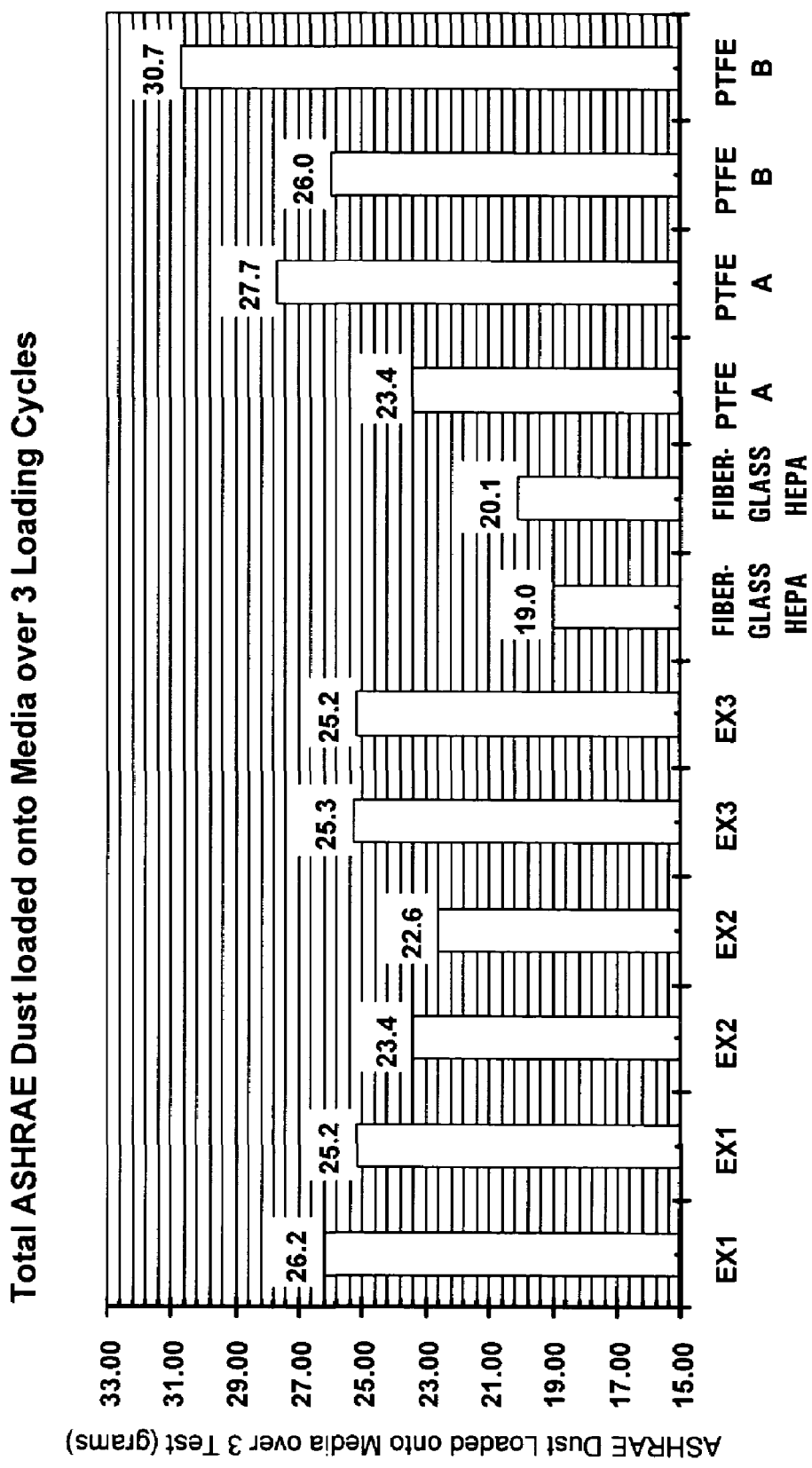
FIG. 3 shows the cleaning capacity or dust load of the materials of the invention compared to other filter materials over repeated cycles. Both the fine fiber layered media of the invention and the PTFE materials captured substantially more dust and dirt than the HEPA glass fiber materials before reaching the terminal pressure drop of the test. In other words, a lower cost alternative using fine fiber on a high efficiency media achieved comparable dust removal to the more expensive PTFE material.

FIG. 3 shows the cleaning capacity or dust load of the materials of the invention compared to other filter materials over repeated cycles. Both the fine fiber layered media of the invention and the PTFE materials captured substantially more dust and dirt than the HEPA glass fiber materials before reaching the terminal pressure drop of the test. In other words, a lower cost alternative using fine fiber on a high efficiency media achieved comparable dust removal to the more expensive PTFE material.

Figure 4:
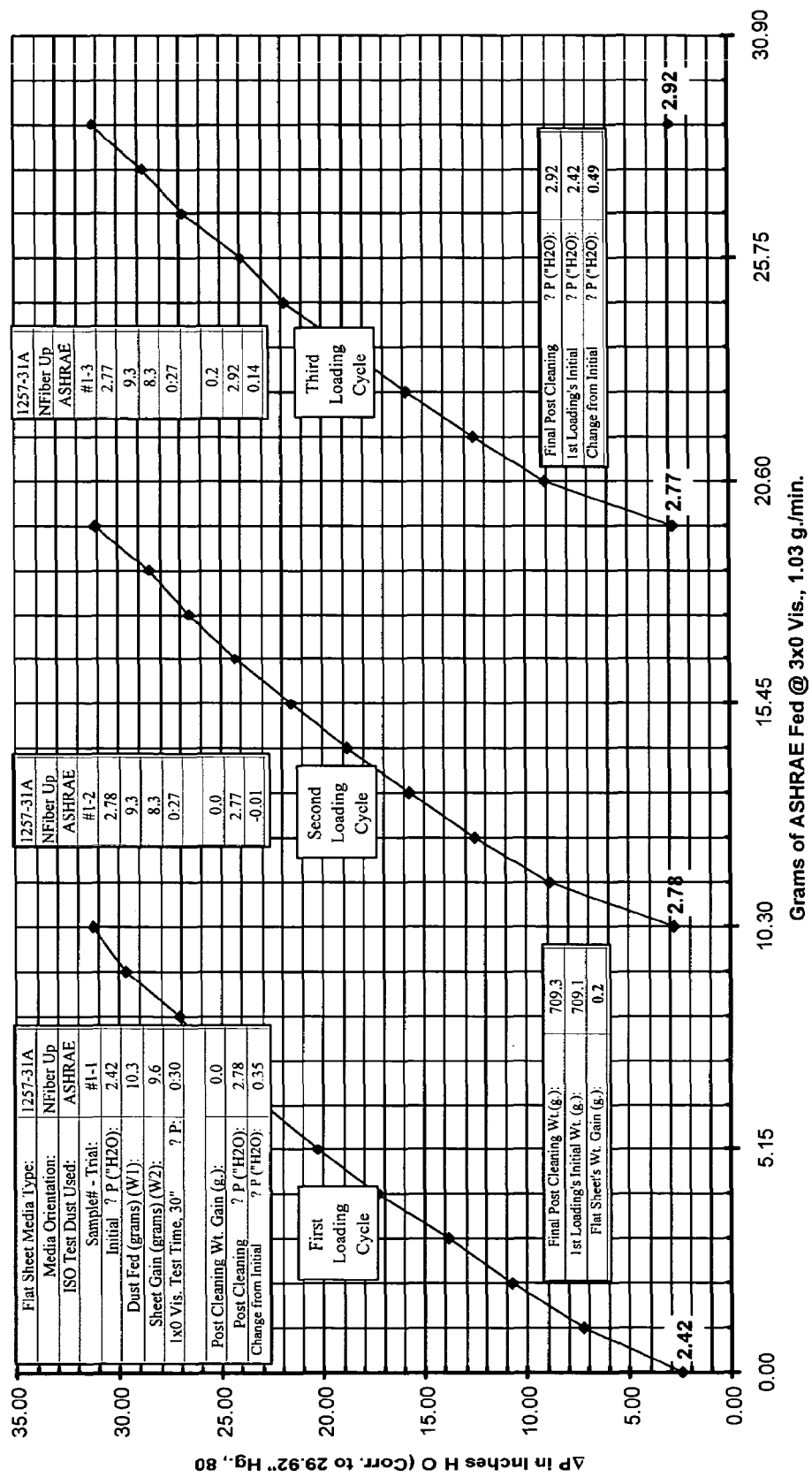
FIG. 4 shows graphical data demonstrating that the multilayer media of the invention can be cleaned and returns to excellent filtration properties.

FIG. 4 shows graphical data demonstrating that the multilayer media of the invention can be cleaned and returns to excellent filtration properties.

Figure 5:
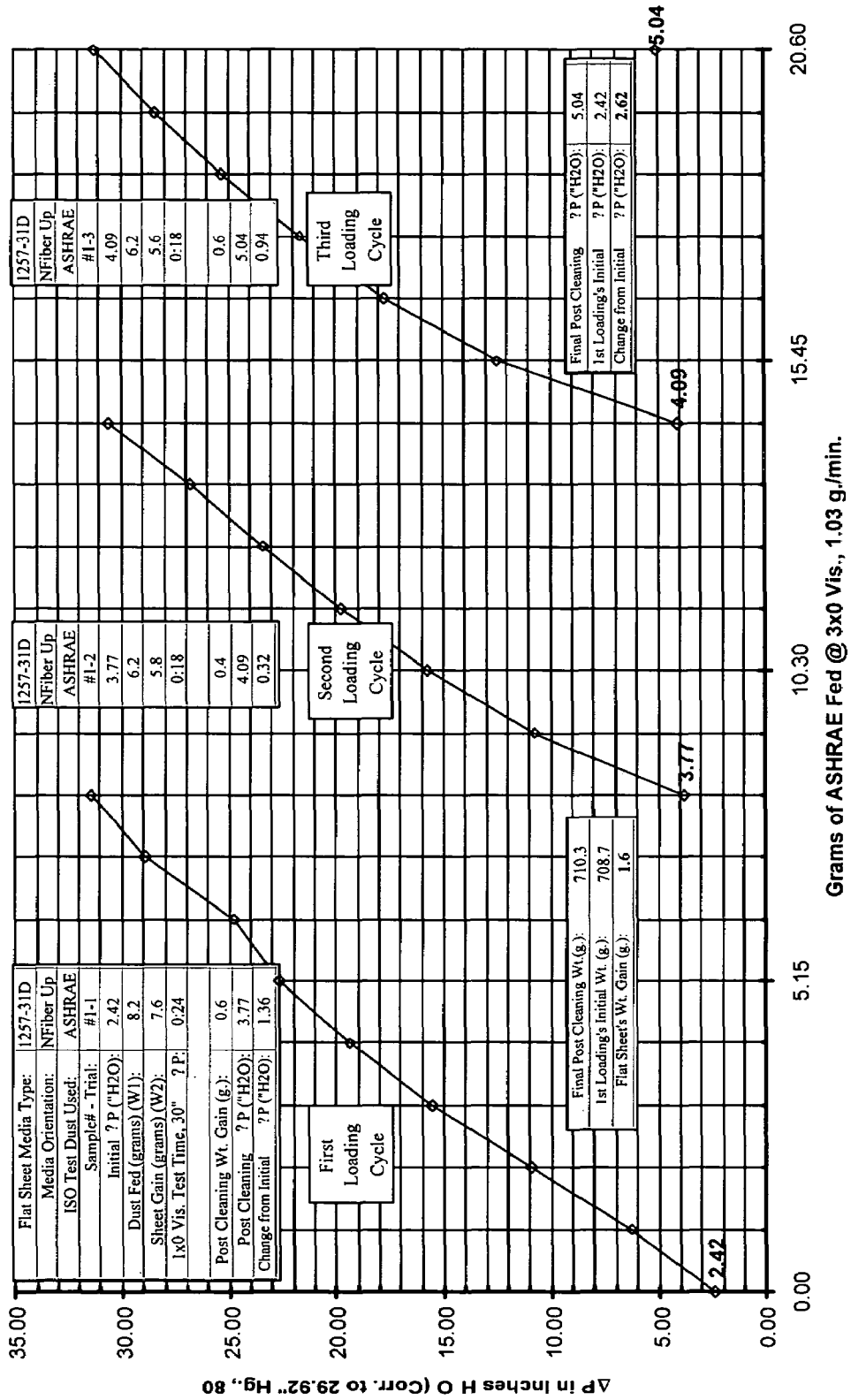
FIG. 5 shows graphical data showing the HEPA glass fiber media is not as good as the multilayer media in returning to original condition.

FIG. 5 shows graphical data showing the HEPA glass fiber media is not as good as the multilayer media in returning to original condition.

Figure 6:
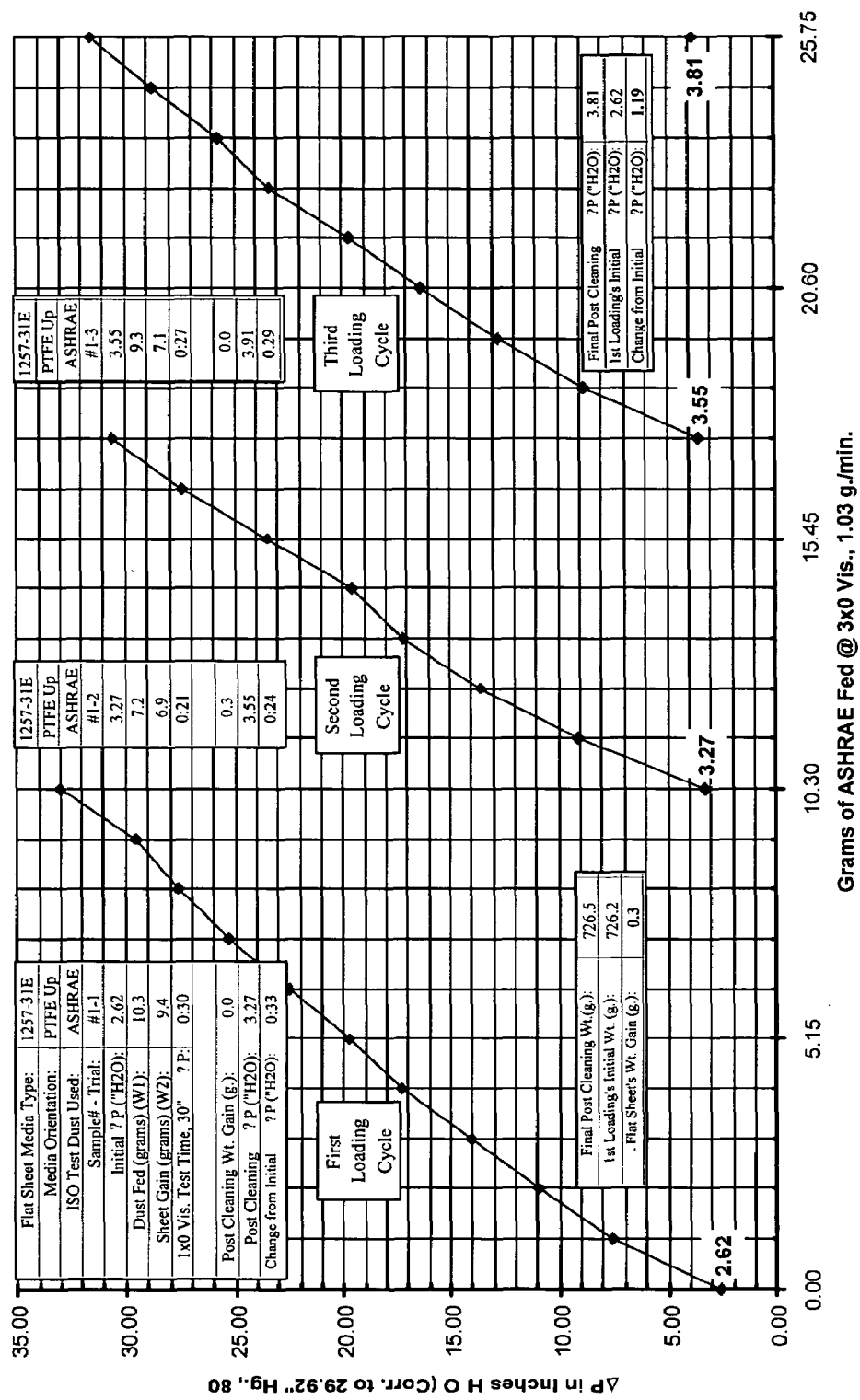
FIG. 6 shows graphical data showing the PTFE glass fiber media is not as good as the multilayer media in returning to original condition.

FIG. 6 shows graphical data showing the PTFE glass fiber media is not as good as the multilayer media in returning to original condition. FIGS. 4 through 6 show that the layered media of the invention (FIG. 4) showed excellent dust removal at the conditions of the experiment, but could be cleaned and returned essentially to new conditions repeating the excellent filtration characteristics of the original material. The fiberglass HEPA filter shown in FIG. 5 and the PTFE media shown in FIG. 6, both failed to both obtain excellent cleanability and to return to high filter characteristics after three cleaning cycles.

Figure 7:
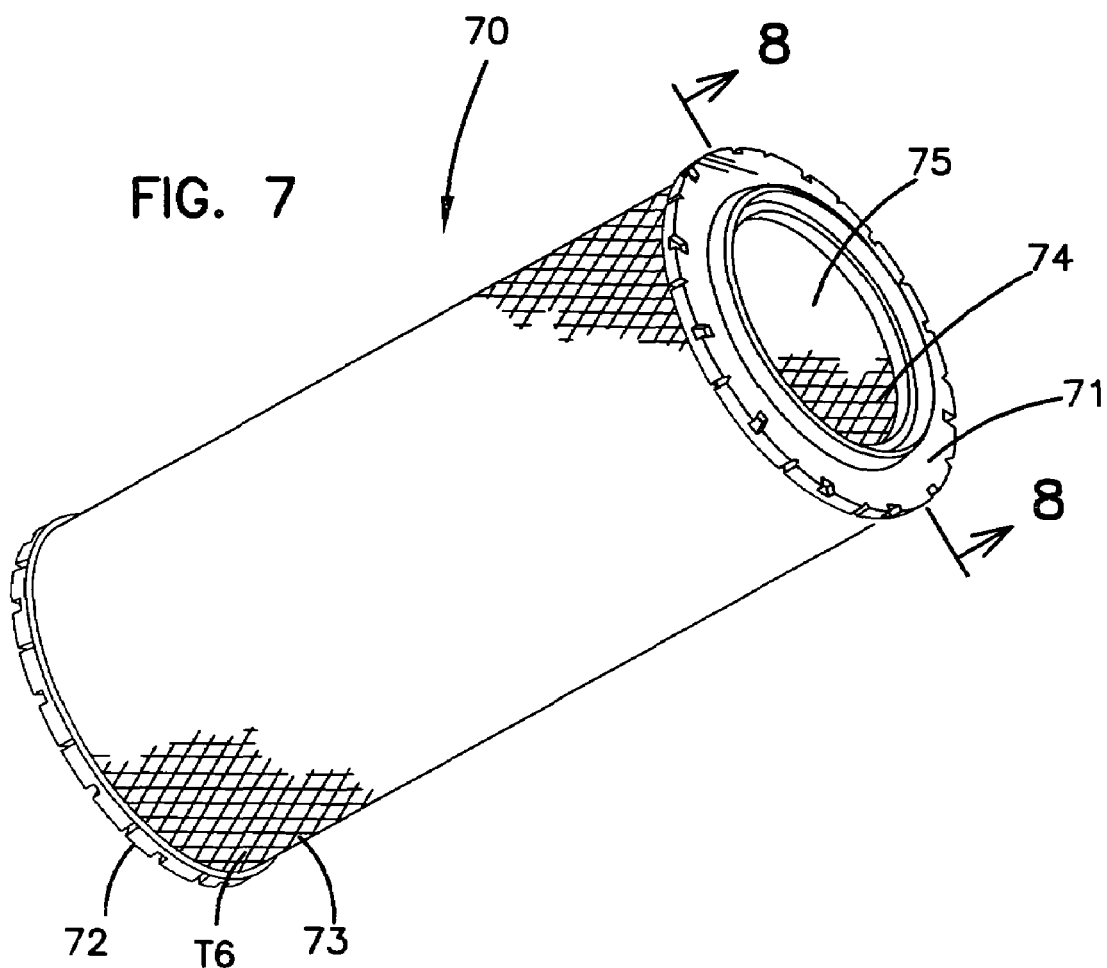
FIG. 7 is a schematic, perspective view of a cylindrical filter element.
Figure 8:
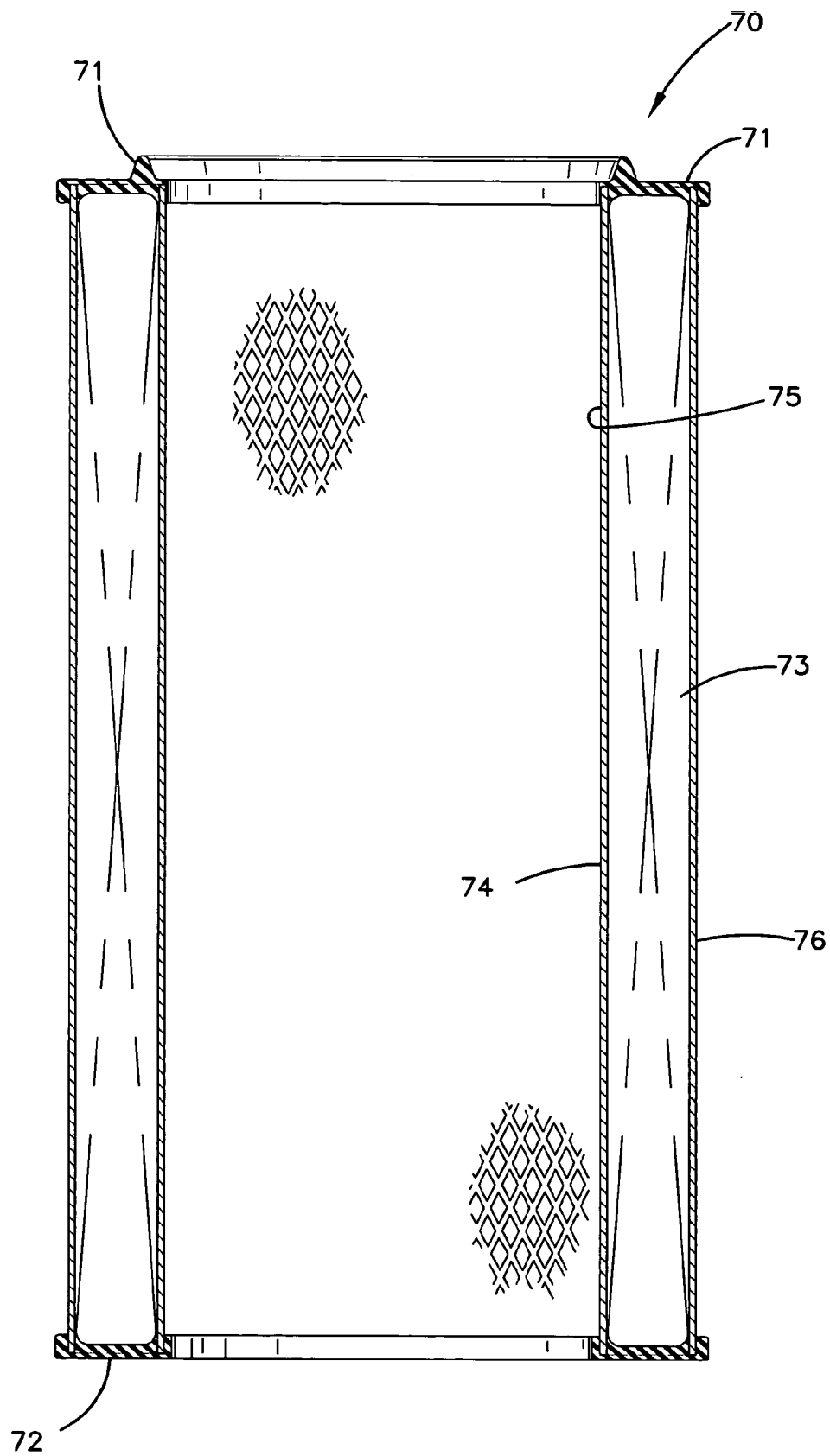
FIG. 8 is a schematic, cross-sectional view of the filter element of FIG. 7, taken along the line 8—8 of FIG. 7.

In reference to FIGS. 7 and 8, one of the filter elements 70 is shown in perspective view and cross-sectional view. In general, filter element 70 includes first and second opposing end caps 71, 72 with the tubular, preferably cylindrical, construction of filter media 73 extending therebetween. The media construction defines an open filter interior 74, which also corresponds to a clean air conduit or plenum, in use. The tubular construction of corrugated filter media 73 is secured or bonded to the end caps 71, 72. In the filter element 70 depicted, there is also an inner support tube or liner 75 and an outer support tube or liner 76. Each of the liners 75, 76 helps to provide structural integrity or support to the media 73.

Figure 9:
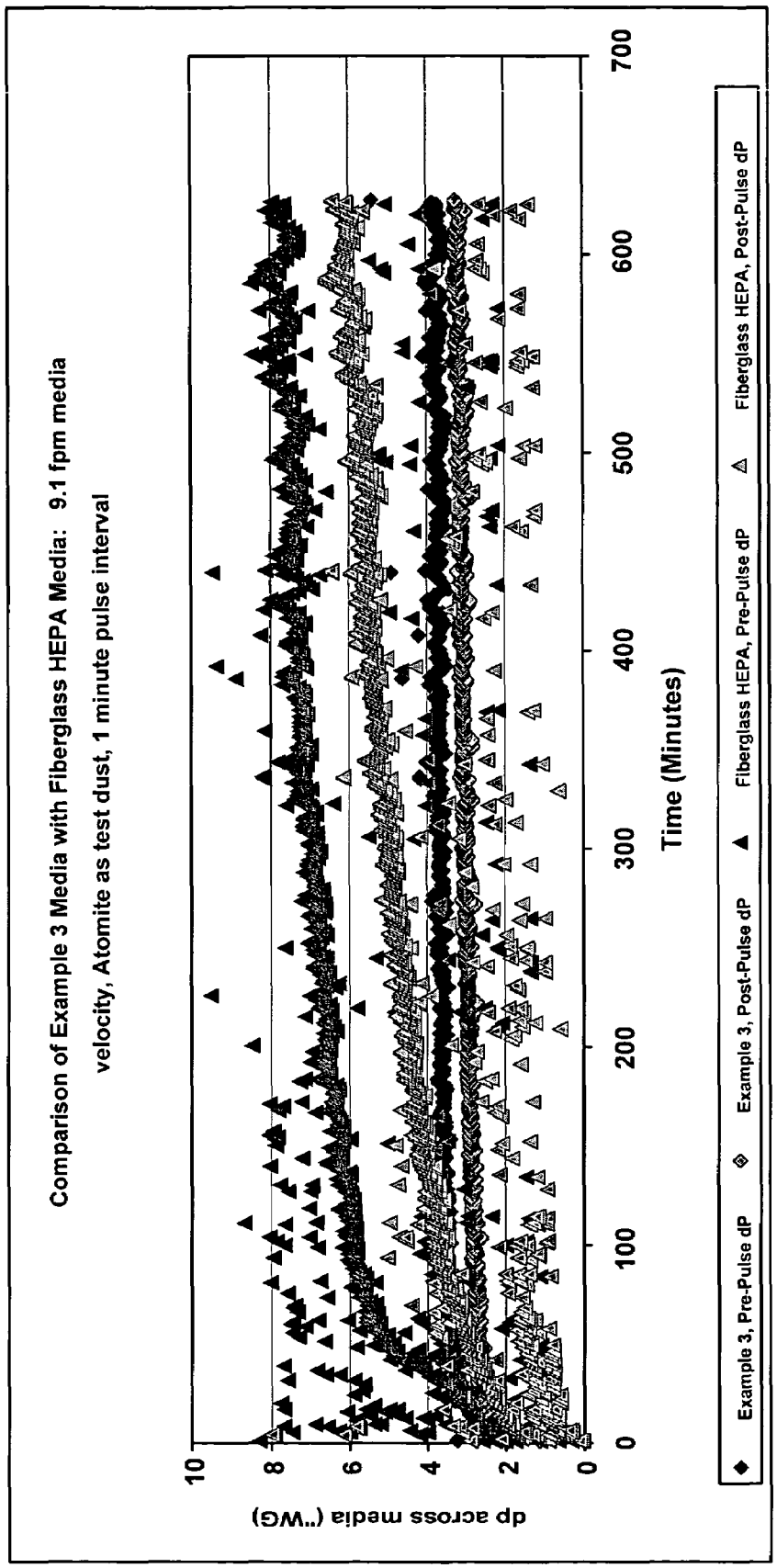
FIG. 9 is a graph of data showing the pre- and post pulse cleanability and life time of a cleanable unit of the invention compared to a similar structure within the fine fiber.

In reference to FIG. 9, the Figure shows that the addition of a fine fiber layer to the structures provides substantial decrease in pressure drop after use and a reverse pulse-cleaning step. The lower the pressure drop the better lifetime and filtration properties are shown.

Figure 10:
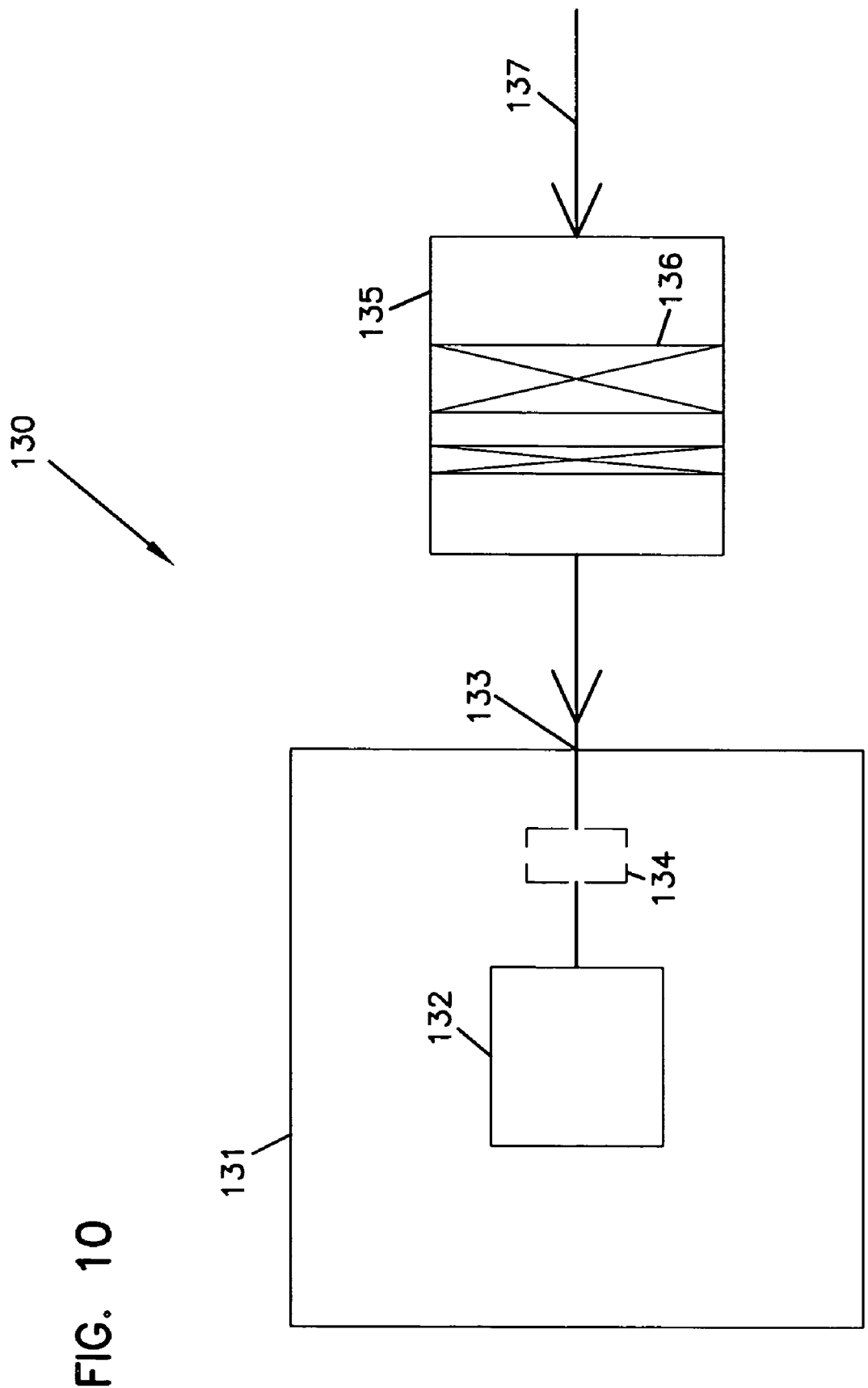
FIG. 10 is a schematic view of an engine system in which air cleaners according to the present disclosure may be utilized.

In FIG. 10, a schematic view of a system is shown generally at 130. System 130 is one example type of system in which air cleaner arrangements and constructions described herein is usable. In FIG. 10, equipment 131, such as a vehicle, having an engine 132 with some defined rated air flow demand, for example, at least 370 cfm, is shown schematically. Equipment 131 may comprise a bus, an over the highway truck, an off-road vehicle, a tractor, or marine application such as a power boat. Engine 132 powers equipment 131, through use of an air, fuel mixture. In FIG. 10, air flow is shown drawn into engine 132 at an intake region 133. An optional turbo 134 is shown in phantom, as optionally boosting the air intake into the engine 132. An air cleaner 135 having a media pack 136 is upstream of the engine 132 and turbo 134. In general, in operation, air is drawn in at arrow 137 into the air cleaner 135 and through media pack 136. There, particles and contaminants are removed from the air. The cleaned air flows at arrow 137 into the intake 133. From there, the air flows into engine 132, to power vehicle 131.

In engine systems, during operation of the engine, the temperature, under the hood, typically is at least 120° F., and often is in the range of 140° F.–220° F. or more depending on operating conditions. The temperature may adversely affect the operating efficiency of the filter element. Regulations on emissions can increase the restriction on the engine exhaust, causing further increased temperatures. As explained below, constructing the filter media in the form of a composite of a barrier media and at least a single layer, and in some instances, multiple layers of "fine fiber" can improve the performance (the operating efficiency, in particular) of the filter element over prior art filter elements that are not constructed from such media composites.

Figure 11:
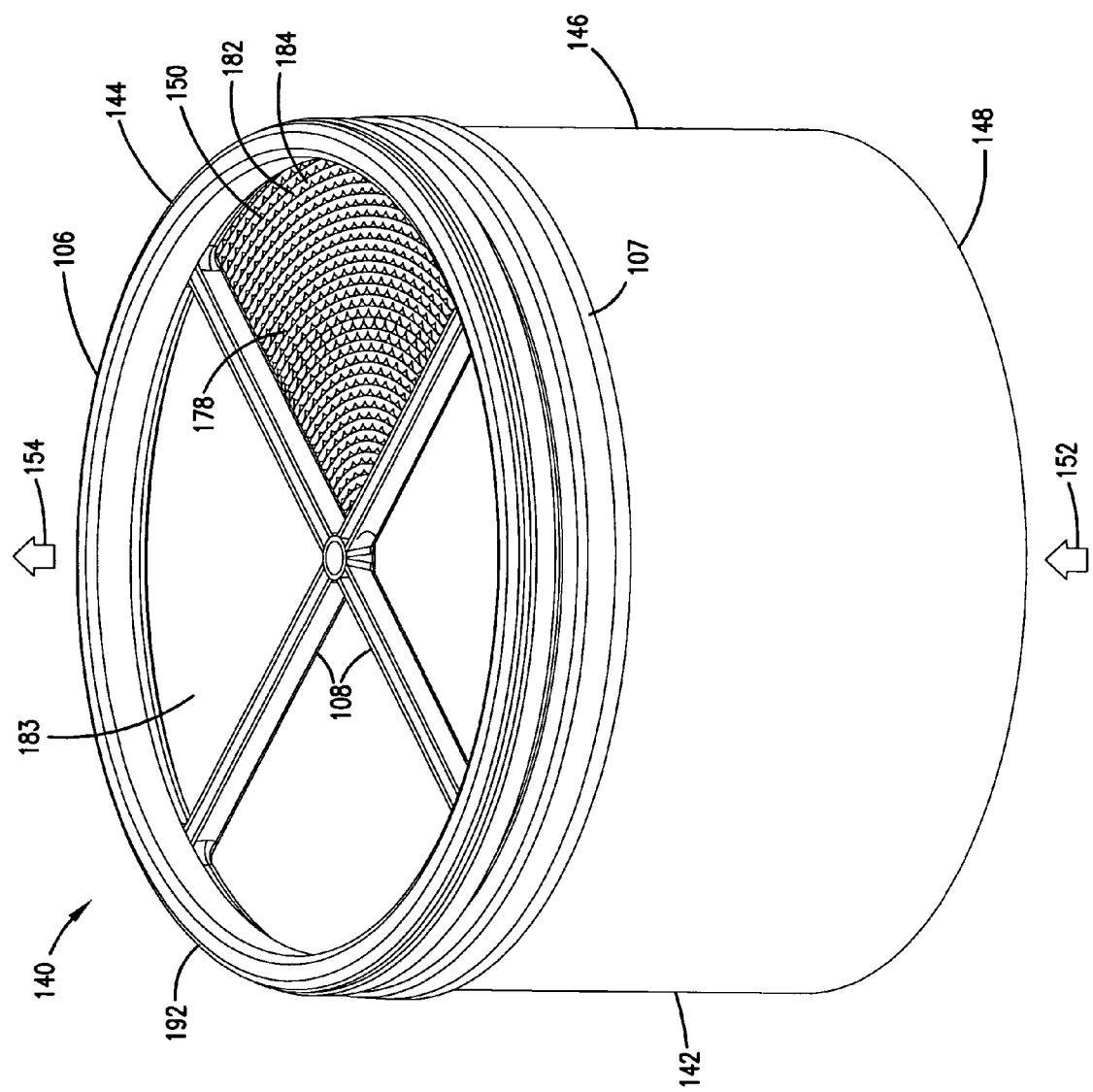
FIG. 11 is a schematic, perspective view of one embodiment of a filter element that may be utilized in the system depicted in FIG. 10.
Figure 13:
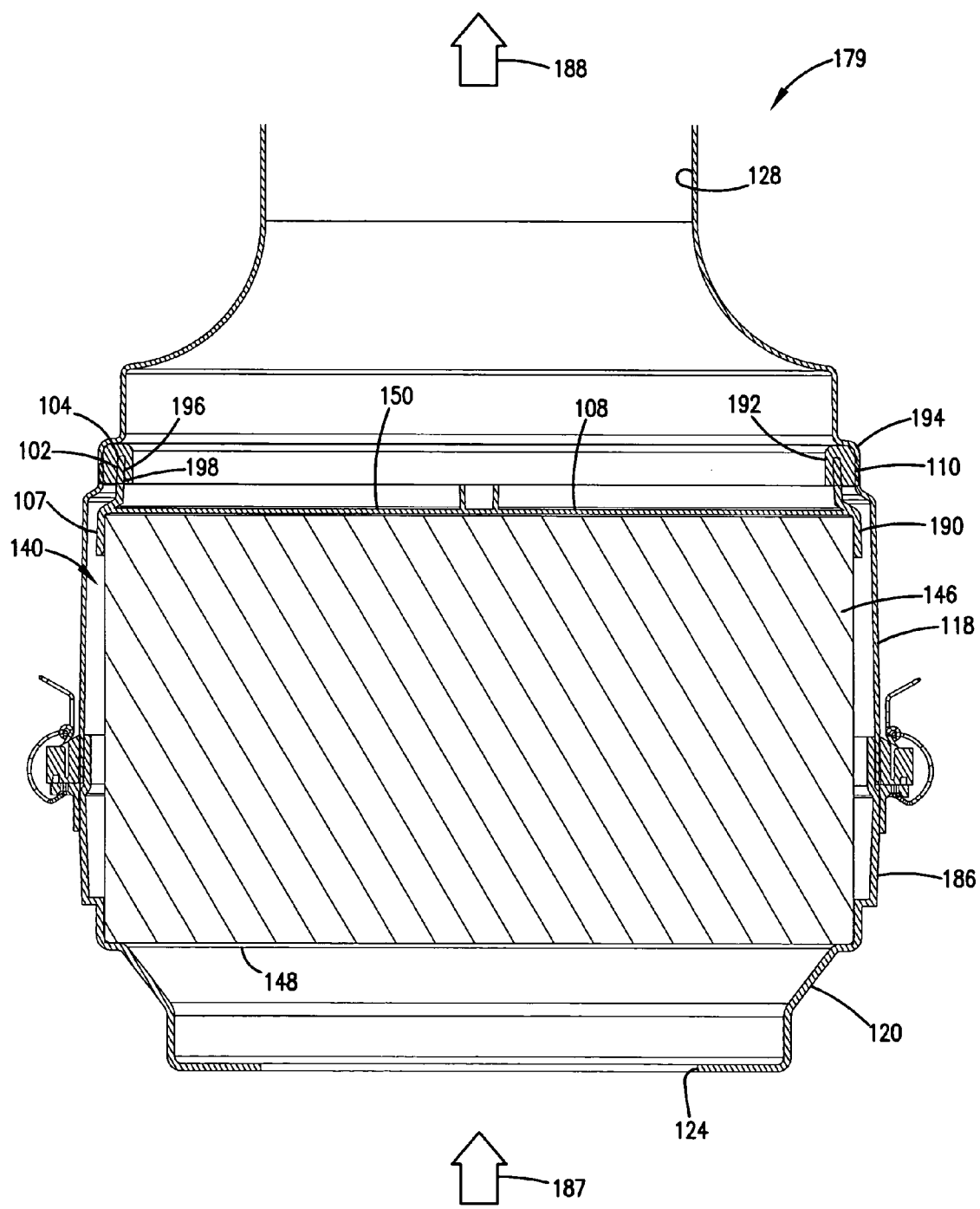
FIG. 13 is a schematic, cross-sectional view of the filter element depicted in FIG. 11 installed within a housing.

Attention is directed to FIG. 11. FIG. 11 is a perspective view of a first embodiment of a media pack 140. The preferred media pack 140 depicted includes filter media 142 and a sealing system 144. In preferred constructions, the filter media 142 is designed to remove particulates from a fluid, such as air, passing through the filter media 142, while the sealing system 144 is designed to seal the media pack 140 against a sidewall of a housing or duct, as shown in FIG. 13.

This media pack 140 of FIGS. 11–14 is generally described in U.S. Pat. No. 6,190,432, which is incorporated by reference herein.

In certain preferred arrangements, the filter media 142 will be conFigured for straight-through flow. By "straight-through flow," it is meant that the filter media 142 is conFigured in a construction 146 with a first flow face 148 (corresponding to an inlet end, in the illustrated embodiment) and an opposite, second flow face 150 (corresponding to an outlet end, in the illustrated embodiment), with fluid flow entering in one direction 152 through the first flow face 148 and exiting in the same direction 154 from the second flow face 150. When used with an inline-flow housing, in general, the fluid will enter through the inlet of the housing in one direction, enter the filter construction 146 through the first flow face 148 in the same direction, exit the filter construction 146 in the same direction from the second flow face 150, and exit the housing through the housing outlet also in the same direction.

In FIG. 11, the first flow face 148 and the second flow face 150 are depicted as planar and as parallel. In other embodiments, the first flow face 148 and the second flow face 150 can be non-planar, for example, frusto-conical. Further, the first flow face 148 and second flow face 150 need not be parallel to each other.

Generally, the filter construction 146 will be a wound construction. That is, the construction 146 will typically include a layer of filter media that is turned completely or repeatedly about a center point. Typically, the wound construction will be a coil, in that a layer of filter media will be rolled a series of turns around a center point. In arrangements where a wound, coiled construction is used, the filter construction 146 will be a roll of filter media, typically permeable fluted filter media.

Figure 12:
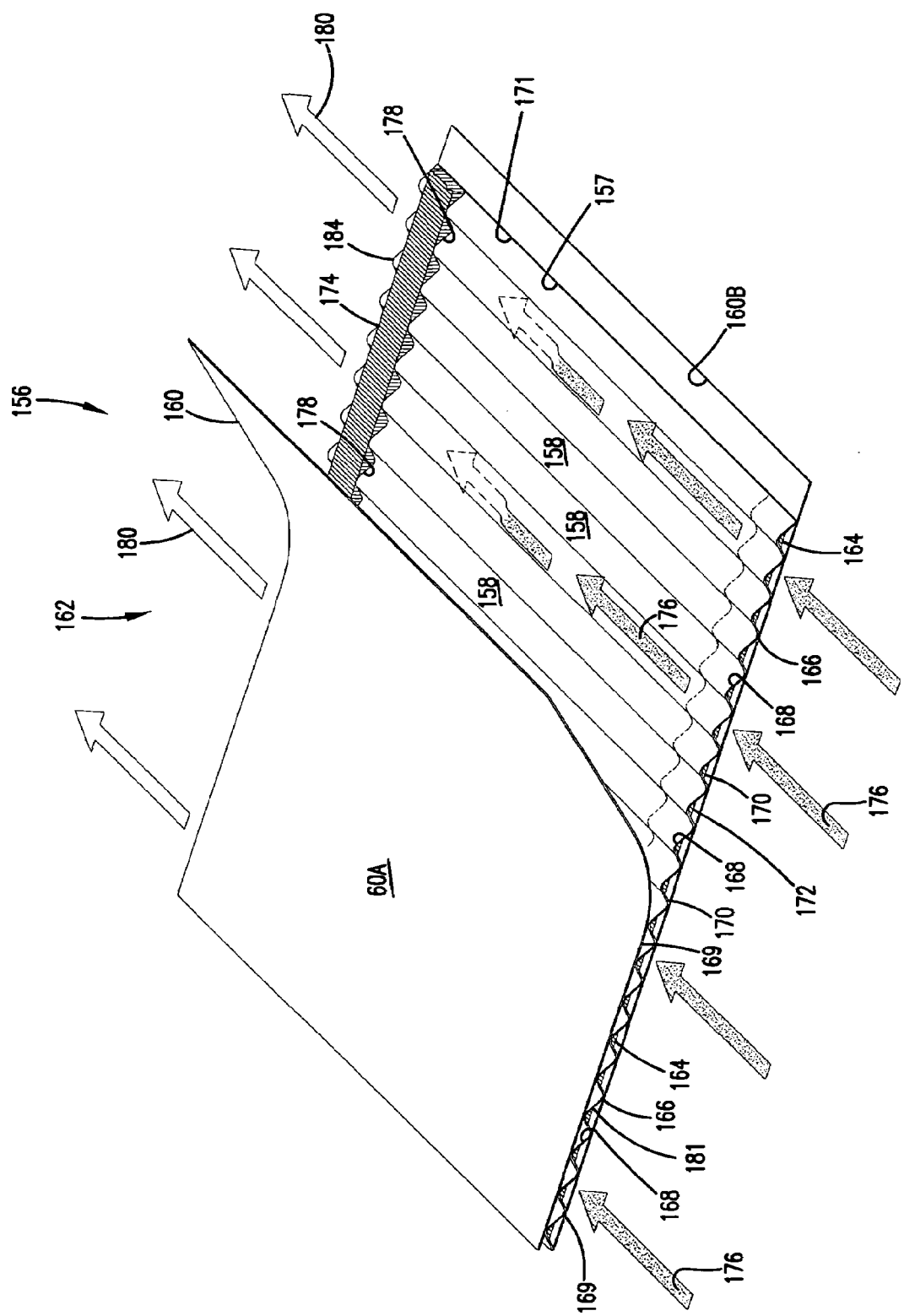
FIG. 12 is a schematic, perspective view of a portion of filter media (Z-media) useable in the arrangement of FIG. 11.

Attention is now directed to FIG. 12. FIG. 12 is schematic, perspective view demonstrating the principles of operation of certain preferred media usable in the filter constructions herein. In FIG. 12, a fluted construction of Z-media is generally designated at 156. Preferably, the fluted construction 156 includes: a layer 157 of corrugations having a plurality of flutes 158 and a face sheet 160. The FIG. 11 embodiment shows two sections of the face sheet 160, at 160A (depicted on top of the corrugated layer 157) and at 160B (depicted below the corrugated layer 157). Typically, the preferred media construction 162 used in arrangements described herein will include the corrugated layer 157 secured to the bottom face sheet 160B. When using this media construction 162 in a rolled construction, it typically will be wound around itself, such that the bottom face sheet 160B will cover the top of the corrugated layer 157. The face sheet 160 covering the top of the corrugated layer is depicted as 160A. It should be understood that the face sheet 160A and 160B are the same sheet 160.

When using this type of media construction 162, the flute chambers 158 preferably form alternating peaks 164 and troughs 166. The troughs 166 and peaks 164 divide the flutes into an upper row and lower row. In the particular configuration shown in FIG. 12, the upper flutes form flute chambers 168 closed at the downstream end 178, while flute chambers 170 having their upstream end 181 closed form the lower row of flutes. The fluted chambers 170 are closed by a first end bead 172 that fills a portion of the upstream end 181 of the flute between the fluting sheet 171 and the second facing sheet 160B. Similarly, a second end bead 174 closes the downstream end 178 of alternating flutes 168.

When using media constructed in the form of media construction 162, during use, unfiltered fluid, such as air, enters the flute chambers 168 as indicated by the shaded arrows 176. The flute chambers 168 have their upstream ends 169 open. The unfiltered fluid flow is not permitted to pass through the downstream ends 178 of the flute chambers 168 because their downstream ends 178 are closed by the second end bead 174. Therefore, the fluid is forced to proceed through the fluting sheet 171 or face sheets 160. As the unfiltered fluid passes through the fluting sheet 171 or face sheets 160, the fluid is cleaned or filtered. The cleaned fluid is indicated by the unshaded arrow 180. The fluid then passes through the flute chambers 170 (which have their upstream ends 181 closed) to flow through the open downstream end 184 out the fluted construction 156. With the configuration shown, the unfiltered fluid can flow through the fluted sheet 171, the upper facing sheet 160A, or lower facing sheet 160B, and into a flute chamber 170.

Figure 23:
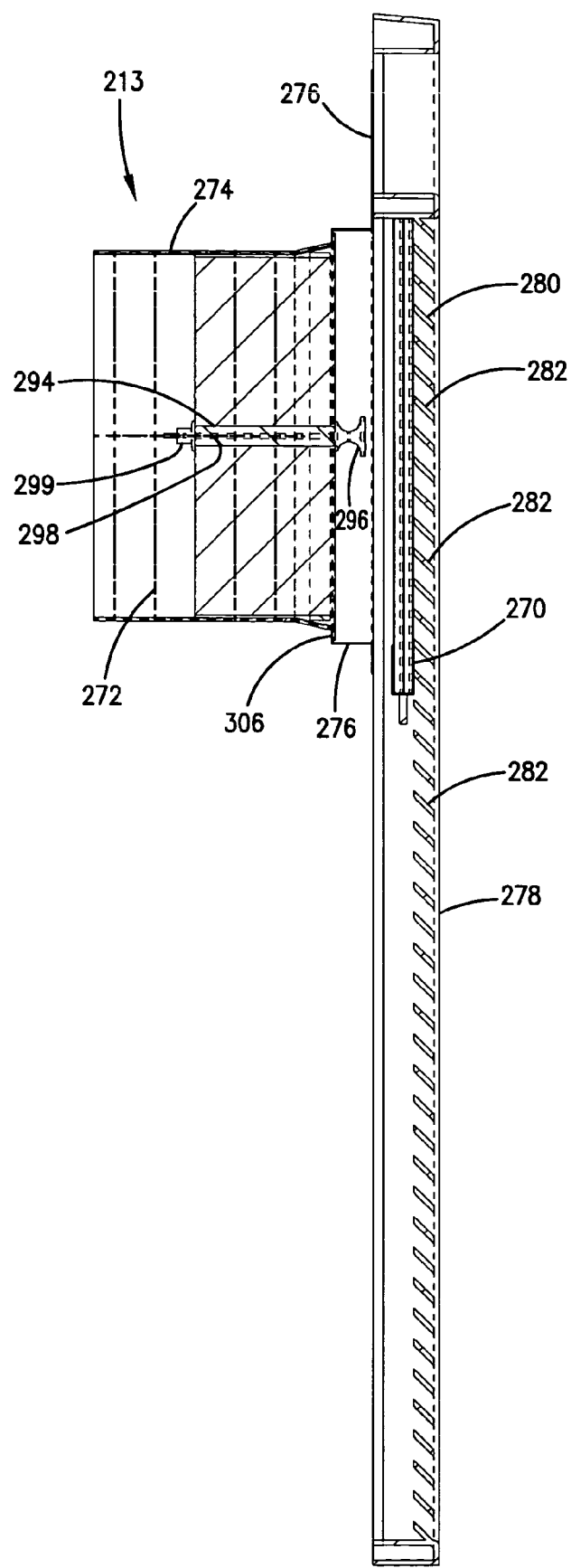
FIG. 23 is a schematic, cross-sectional view of a filter element in an operable installation to clean intake air in a gas turbine system, the cross-section being taken along the line 14—14 of FIG. 24, but in an assembled state.

Typically, the media construction 162 will be prepared and then wound to form a rolled construction 146 of filter media. When this type of media is selected for use, the media construction 162 prepared includes the sheet of corrugations 157 secured with the end bead 172 to the bottom face sheet 160B (as shown in FIG. 23, but without the top face sheet 160A).

Attention is again directed to FIG. 11. In FIG. 11, the second flow face 150 is shown schematically. There is a portion at 182 in which the flutes including the open ends 184 and closed ends 178 are depicted. It should be understood that this section 182 is representative of the entire flow face 50. For the sake of clarity and simplicity, the flutes are not depicted in the other remaining portions 183 of the flow face 150. Top and bottom plan views, as well as side elevational views of a media pack 140 usable in the systems and arrangements described herein are depicted in copending and commonly assigned U.S. patent application Ser. No. 29/101,193, filed Feb. 26, 1999, and entitled, "Filter Element Having Sealing System," herein incorporated by reference.

Turning now to FIG. 13, the filter construction 146 is shown installed in a housing 186 (which can be part of an air intake duct into an engine or turbo of an air cleaner 179). In the arrangement shown, air flows into the housing 186 at 187, through the filter construction 146, and out of the housing 186 at 188. When media constructions such as filter constructions 46 of the type shown are used in a duct or housing 186, the sealing system 144 will be needed to ensure that air flows through the media construction 146, rather than bypass it.

The particular sealing system 144 depicted includes a frame construction 190 and a seal member 192. When this type of sealing system 144 is used, the frame construction 190 provides a support structure or backing against which the seal member 192 can be compressed against to form a radial seal 194 with the duct or housing 186.

Still in reference to FIG. 13, in the particular embodiment shown, the frame construction 190 includes a rigid projection 196 that projects or extends from at least a portion of one of the first and second flow faces 148, 150 of the filter construction 146. The rigid projection 196, in the particular arrangement shown in FIG. 13, extends axially from the second flow face 150 of the filter construction 146.

The projection 196 shown has a pair of opposite sides 198, 102 joined by an end tip 104. In preferred arrangements, one of the first and second sides 198, 102 will provide a support or backing to the seal member 192 such that seal 194 can be formed between and against the selected side 198 or 102 and the appropriate surface of the housing or duct. When this type of construction is used, the projection 196 will be a continuous member forming a closed hoop structure 106 (FIG. 11).

When this type of construction is used, a housing or duct may circumscribe the projection 196 and hoop structure 106 including the seal member 192 to form seal 194 between and against the outer side 102 of the projection 196 and an inner surface 110 of the housing or duct.

In the particular embodiment shown in FIG. 13, the seal member 192 engages the end tip 104 of the projection 196 as well, such that the seal member 192 covers the projection 196 from the exterior side 102, over the end tip 104, and to the interior side 198.

Referring now to FIGS. 11 and 13, the frame 190 has a band, skirt, or depending lip 107 that is used to secure the frame 190 to the media construction 146. The depending lip 107 depends or extends down a first distance from cross braces 108.

During use of frames 190 of the type depicted herein, inward forces are exerted around the circumference of the frame 190. Cross braces 108 support the frame 190. By the term "support," it is meant that the cross braces 108 prevent the frame 190 from radially collapsing under the forces exerted around the circumference of the frame 190.

The tip portion 104 provides support for the compressible seal member 192. The compressible seal member 192 is preferably constructed and arranged to be sufficiently compressible to be compressed between the tip portion 104 of the frame 190 and sidewall 110 of a housing or duct. When sufficiently compressed between the tip portion 104 and the sidewall 110, radial seal 194 is formed between the media pack 140 and the sidewall 110.

Figure 14:
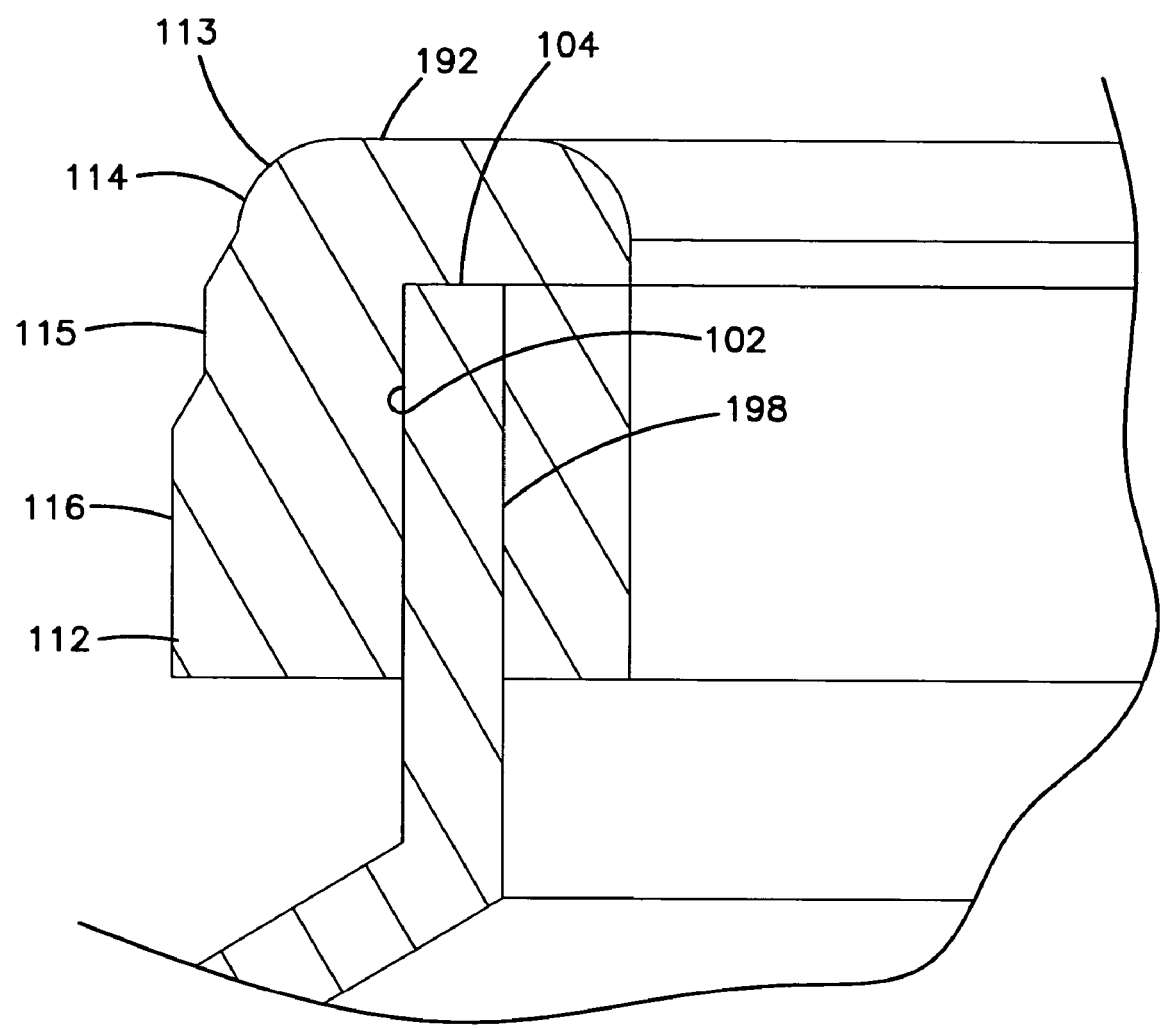
FIG. 14 is a fragmented, enlarged, schematic view of one embodiment of a compressible seal member utilized in a sealing system for the filter element of FIG. 11.

One preferred configuration for seal member 192 is shown in FIG. 14. The tip portion 104 of the frame 190 defines a wall or support structure between and against which radial seal 194 may be formed by the compressible seal member 192. The compression of the compressible seal member 192 at the sealing system 144 is preferably sufficient to form a radial seal under insertion pressures of no greater than 80 lbs., typically, no greater than 50 lbs., for example, about 20–40 lbs., and light enough to permit convenient and easy change out by hand.

In the preferred embodiment shown in FIG. 14, the seal member 192 is a stepped cross-sectional configuration of decreasing outermost dimensions (diameter, when circular)

from a first end 112 to a second end 113, to achieve desirable sealing. Preferred specifications for the profile of the particular arrangement shown in FIG. 14 are as follows: a polyurethane foam material having a plurality of (preferably at least three) progressively larger steps conFigured to interface with the sidewall 110 and provide a fluid-tight seal.

The compressible seal member 192 defines a gradient of increasing internal diameters of surfaces for interfacing with the sidewall 110. Specifically, in the example shown in FIG. 14, the compressible seal member 192 defines three steps 114, 115, 116. The cross-sectional dimension or width of the steps 114, 115, 116 increases the further the step 114, 115, 116 is from the second end 113 of the compressible seal member 192. The smaller diameter at the second end 113 allows for easy insertion into a duct or housing. The larger diameter at the first end 112 ensures a tight seal.

In general, the media pack 140 can be arranged and conFigured to be press-fit against the sidewall 110 of the housing 186 or duct. In the specific embodiment shown in FIG. 13, the compressible seal member 192 is compressed between the sidewall 110 and the tip portion 104 of the frame 190. After compression, the compressible seal member 192 exerts a force against the sidewall 110 as the compressible seal member 192 tries to expand outwardly to its natural state, forming radial seal 94 between and against the tip portion 104 and the sidewall 110.

A variety of housings are usable with the media pack 140. In the particular embodiment depicted in FIG. 13, the housing 186 includes a body member or a first housing compartment 118 and a removable cover or second housing compartment 120. In some arrangements, the first housing compartment 118 is affixed to an object, such as a truck. The second housing compartment 120 is removably secured to the first housing compartment 118 by a latching device 122.

In the illustrated embodiment in FIG. 13, the second end 150 of the media pack 140 with the attached frame 190 and compressible seal member 192 is inserted into the first housing compartment 118. The media pack 140 is press-fit into the first housing compartment 118 such that the compressible seal member 192 is compressed between and against the tip portion 104 of the frame 190 and the sidewall 110 of the first housing compartment 118, to form radial seal 194 therebetween.

During use of the arrangement depicted in FIG. 13, the fluid enters the housing assembly 185 at the inlet region 124 of the second housing compartment 120, in the direction shown at 187. The fluid passes through the filter construction 146. As the fluid passes through the filter construction 146, contaminants are removed from the fluid. The fluid exits the housing assembly 185 at the outlet region 128, in the direction of 188. The compressible seal member 192 of the sealing system 144 forms radial seal 194 to prevent contaminated fluid from exiting the housing assembly 185, without first passing through the filter construction 146.

Figure 15:
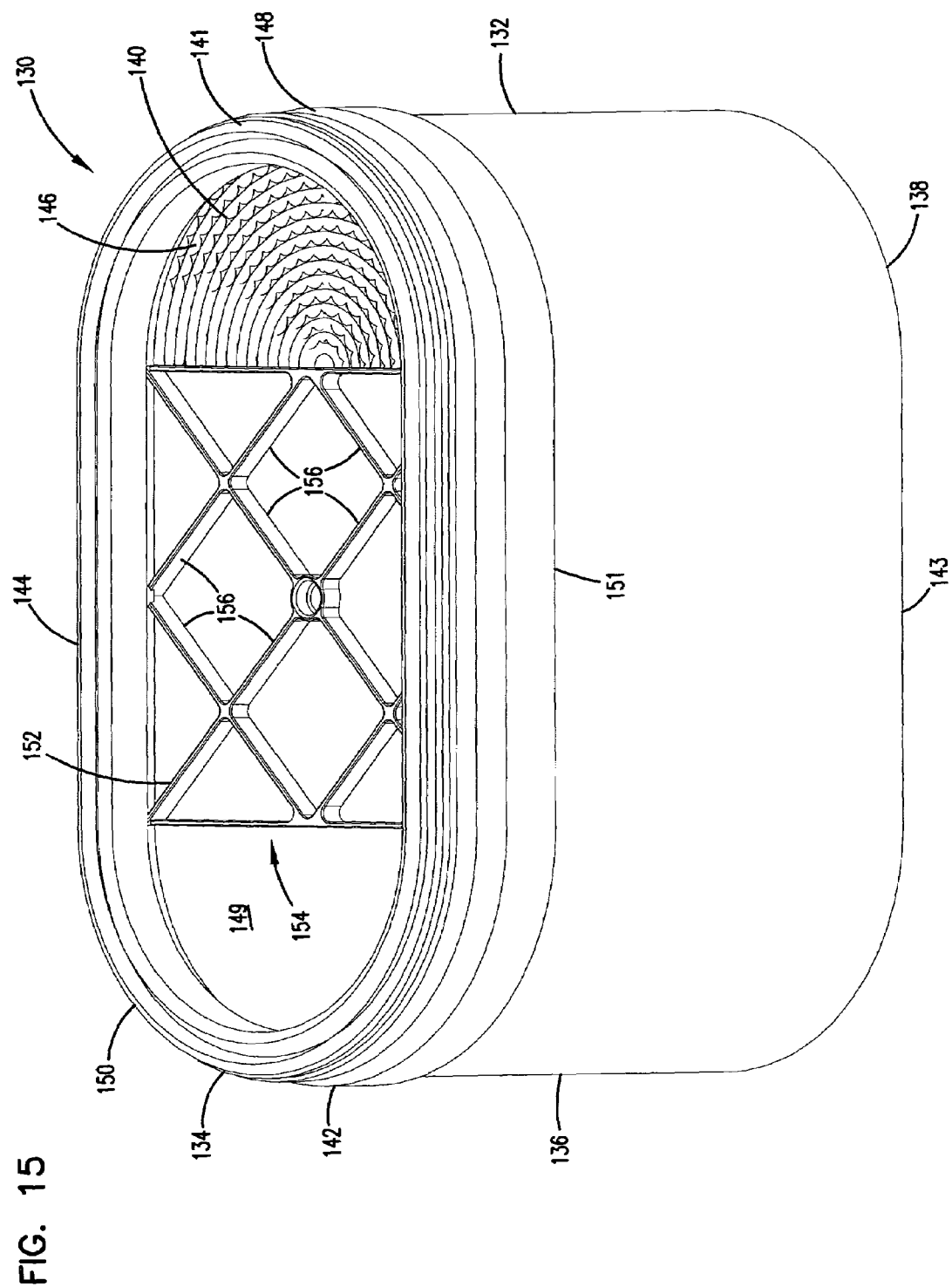
FIG. 15 is a schematic, perspective view of another embodiment of a filter element that may be utilized in the engine system of FIG. 12.

FIG. 15 is a perspective view of another embodiment of a media pack 130. In the construction depicted, the media pack 130 includes filter media 132 and a sealing system 134. The filter media 132 is designed to remove contaminants from a fluid, such as air, passing through the filter media 132. The sealing system 134 is designed to seal the filter media 134 to a housing or duct.

Figure 16:
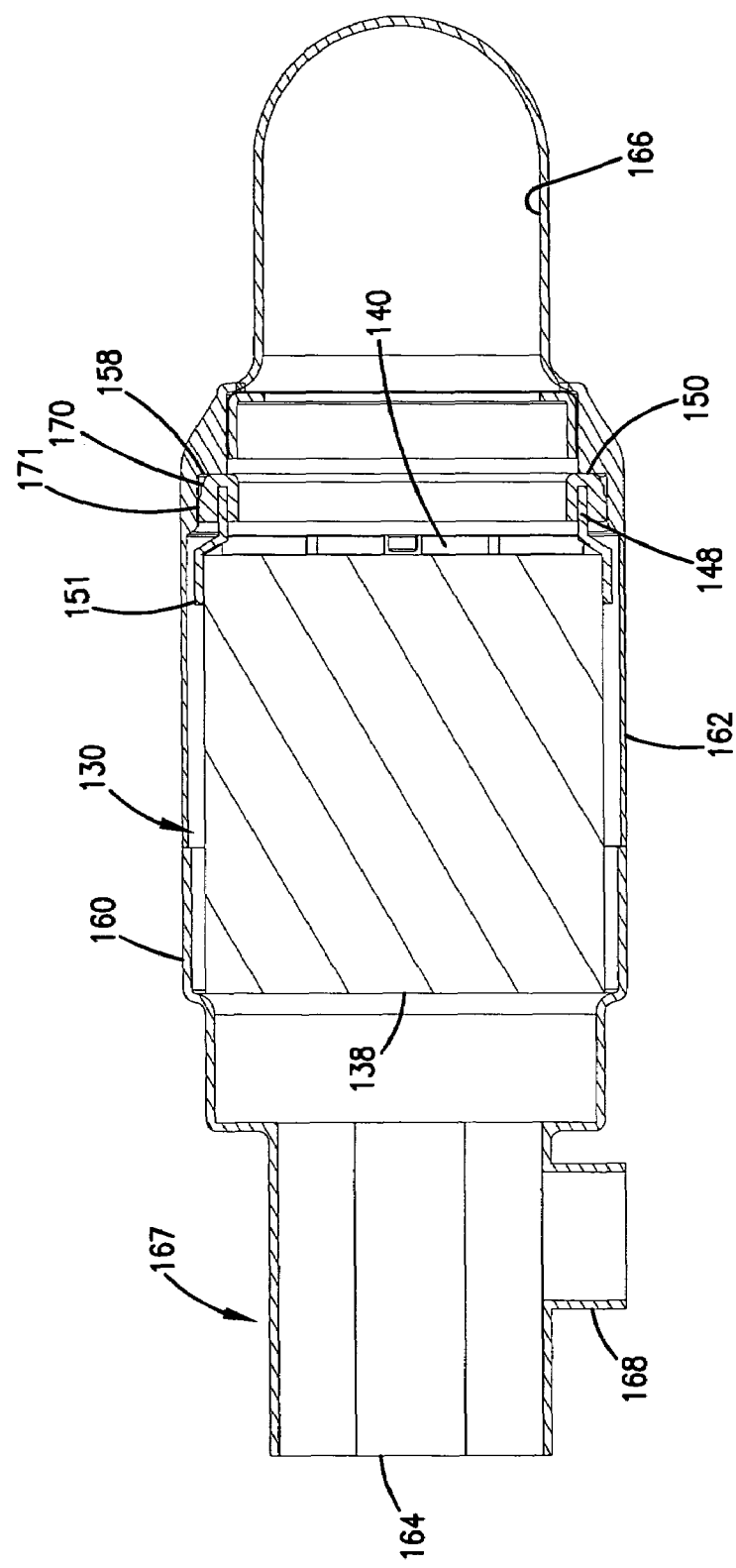
FIG. 16 is a schematic, cross-sectional view of the filter element of FIG. 15 installed within a housing.

The construction and geometry of the media pack 130 of FIGS. 15–16, with the exception of preferred media formulations given in Section H below, is described in U.S. Pat. No. 6,190,432, which is incorporated by reference herein.

In certain preferred arrangements, the filter media 132 will be conFigured in a filter construction 136 with a first flow face 138 and an opposite, second flow face 140.

The filter construction 136 can have a variety of configurations and cross-sectional shapes. In the particular embodiment illustrated in FIG. 15, the filter construction 136 has a non-circular cross-section. In particular, the FIG. 15 embodiment of the filter construction 136 has an ob-round or "racetrack" cross-sectional shape. By "racetrack" cross-sectional shape, it is meant that the filter construction 136 includes first and second semicircular ends 141, 142 joined by a pair of straight segments 143, 144.

In FIG. 15, certain portions 146 are depicted showing the flutes, including the open and closed ends. It should be understood that this portion or section 146 is representative of the entire flow face 140 (as well as the first flow face 138). For the sake of clarity and simplicity, the flutes are not depicted in the other remaining portions 149 of the flow face 140. Top and bottom plan views, as well as side elevational views of the media pack 130 usable in the systems and arrangements described herein are depicted in copending and commonly assigned U.S. patent application Ser. No. 29/101,193, filed Feb. 26, 1999, and entitled, "Filter Element Having Sealing System," herein and incorporated by reference.

As with the embodiment of FIG. 11, the media pack 130 includes sealing system 134. In preferred constructions, the sealing system 134 includes a frame 148 and a seal member 150.

The frame 148 has a non-circular, for example, obround (partially round and oblong) and in particular, a racetrack shape and is arranged and conFigured for attachment to the end of the filter media 132. In particular, the frame 148 has a band or skirt or depending lip 151 that is generally racetrack shaped. The depending lip 151 depends or extends down a distance from cross braces 152 and is used to secure the frame 148 to the media pack 130.

Figure 26:
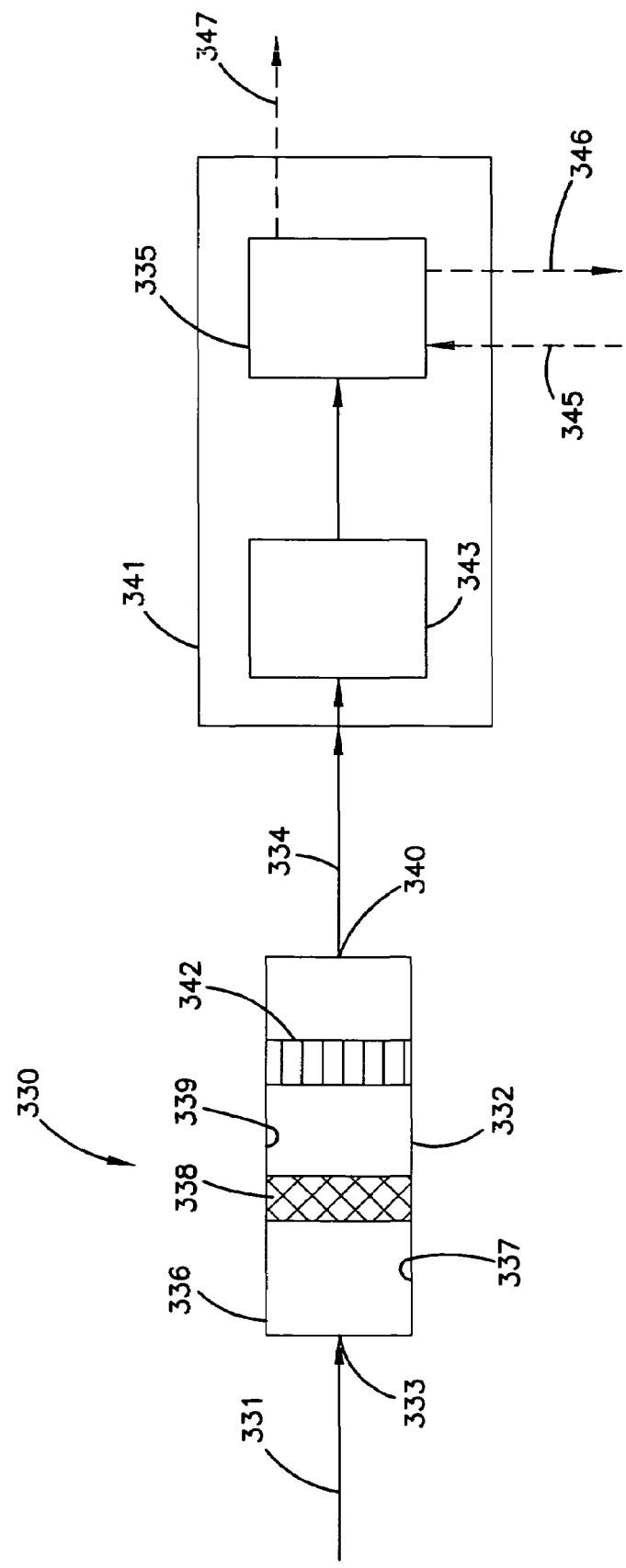
FIG. 26 is a schematic view of an air intake for a fuel cell system, which may utilize filter elements disclosed herein.

During use of the arrangements depicted, inward forces are exerted around the circumference of the frame 148. Inward forces exerted against the semicircular ends 141, 142 can cause the straight segments 143, 144 to bow or bend. Cross braces 152 are provided to provide structural rigidity and support to the straight segments 143, 144. As can be seen in FIG. 26, the particular cross braces 152 depicted form a truss system 154 between the opposing straight segments 143, 144. The truss system 154 includes a plurality of rigid struts 156, preferably molded as a single piece with the remaining portions of the frame 148.

The frame 148 is constructed analogously to the frame 90. As such, the frame 148 includes a tip portion 158 (FIG. 16). In preferred arrangements, the tip portion 158 acts as an annular sealing support.

Preferably, the media pack 130 will be installed in a duct or an air cleaner housing. In FIG. 16, the housing depicted is a two-piece housing including a cover 160 and a body member 162. The cover 160 defines an airflow inlet 164. The body member 162 defines an airflow outlet 166. The housing further includes a pre-cleaner arrangement 167 upstream of the media pack 130, such as that described in U.S. Pat. Nos. 2,887,177 and 4,162,906, incorporated by reference herein. In the one depicted, the pre-cleaner arrangement 167 is in the cover 160. The cover 160 includes a dust ejector 168 that expels dust and debris collected in the pre-cleaner 167.

The compressible seal member 150 is compressed between the sidewall 170 and the tip portion 158 of the frame 150. As the media pack 130 is press-fit, the compressible seal member 150 is compressed between and against the frame 148 (specifically, in the particular embodiment shown, the tip portion 158) and the sidewall 170. After compression, the compressible seal member 150 exerts a force against the sidewall 170 as the compressible seal member 150 tries to expand outwardly to its natural state, forming a radial seal 171 with the sidewall 170.

Preferred formulations for media 132 are described below.

Figure 17:
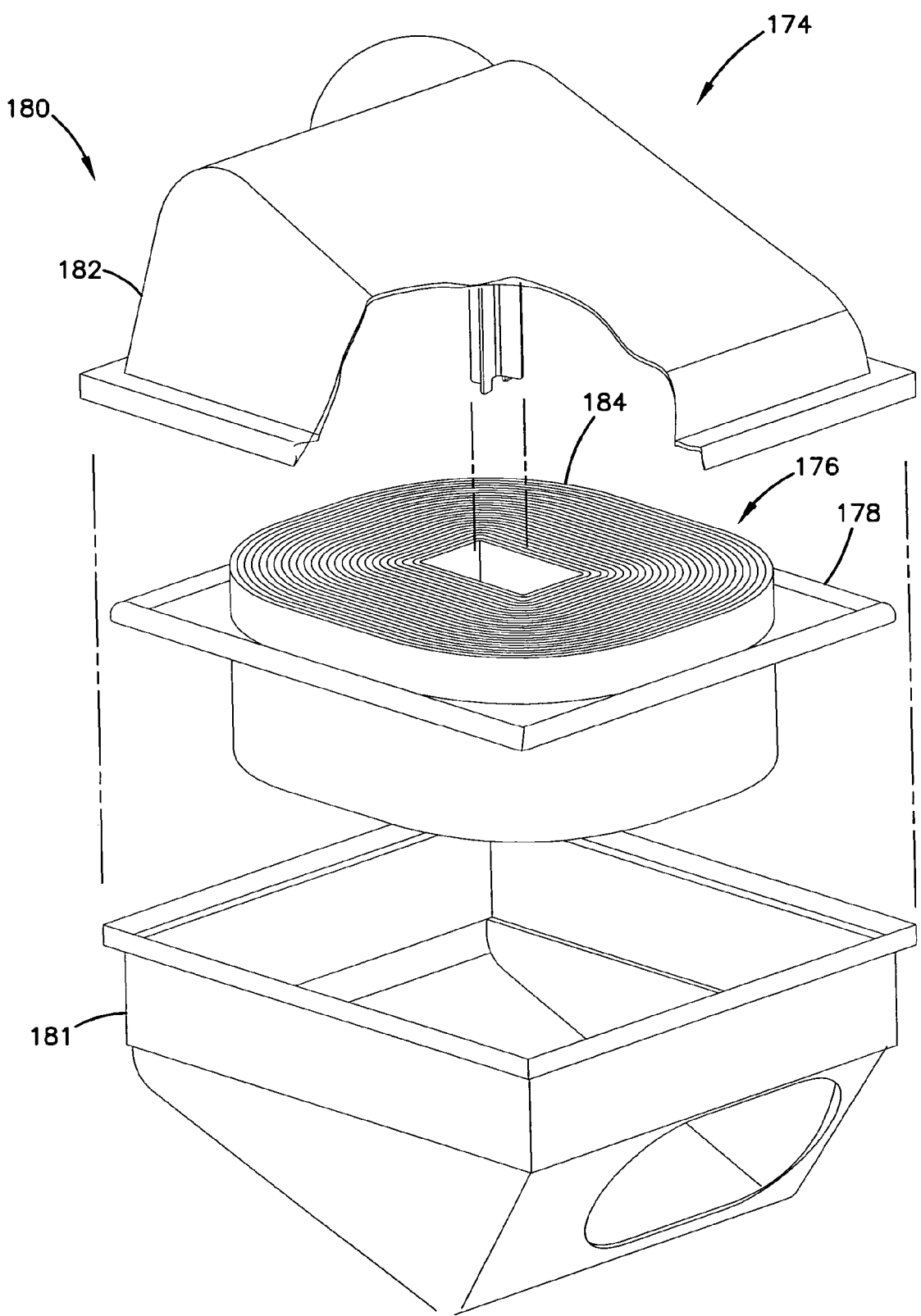
FIG. 17 is a schematic, exploded, perspective view of another embodiment of a filter element and housing that may be utilized in the engine system of FIG. 10.

Another filter arrangement is shown in FIG. 17, generally at 174. With the exception of preferred media formulations described below, the filter arrangement 174 is described in U.S. Pat. No. 5,820,646, incorporated by reference herein.

The filter arrangement 174 includes a media pack 176 mounted in, held by and supported by a panel construction 178. Filter arrangement 174 also includes a housing 180, which includes a body 181 and a removable cover member 182. The panel construction 178 holding the media pack 176 seals within the housing 180, and is removable and replaceable therefrom.

The media pack 176 includes fluted filter media 184 constructed as described above with respect to FIG. 22.

Figure 18:
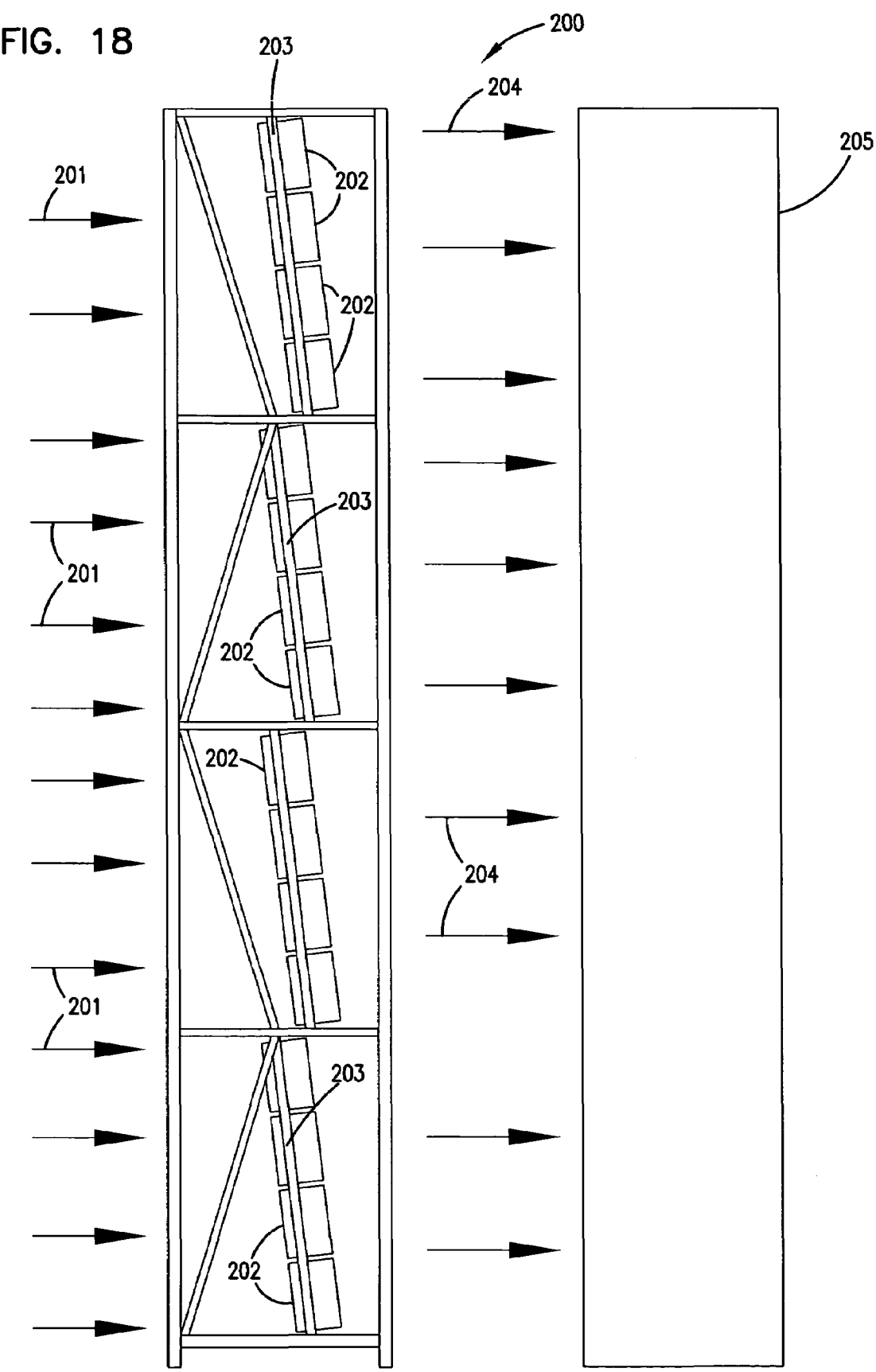
FIG. 18 is a schematic depiction of a gas turbine system in which filter elements according to the present disclosure may be utilized.

In FIG. 18, the air intake of a gas turbine system is shown generally at 200. Airflow is shown drawn into an air intake system 200 at arrows 201. The air intake system 200 includes a plurality of air filter arrangements 202 generally held in a tube sheet 203. In preferred systems, the tube sheet 203 will be constructed to hold the filter arrangements 202 at an angle, relative to a vertical axis. Preferred angles will be between 5–25°, for example, about 7°. This permits liquid to drain from the filter arrangements 202 when the system 200 is not operating.

The air is cleaned in the air filter arrangements 202, and then it flows downstream at arrows 204 into gas turbine generator 205, where it is used to generate power.

Figure 22:
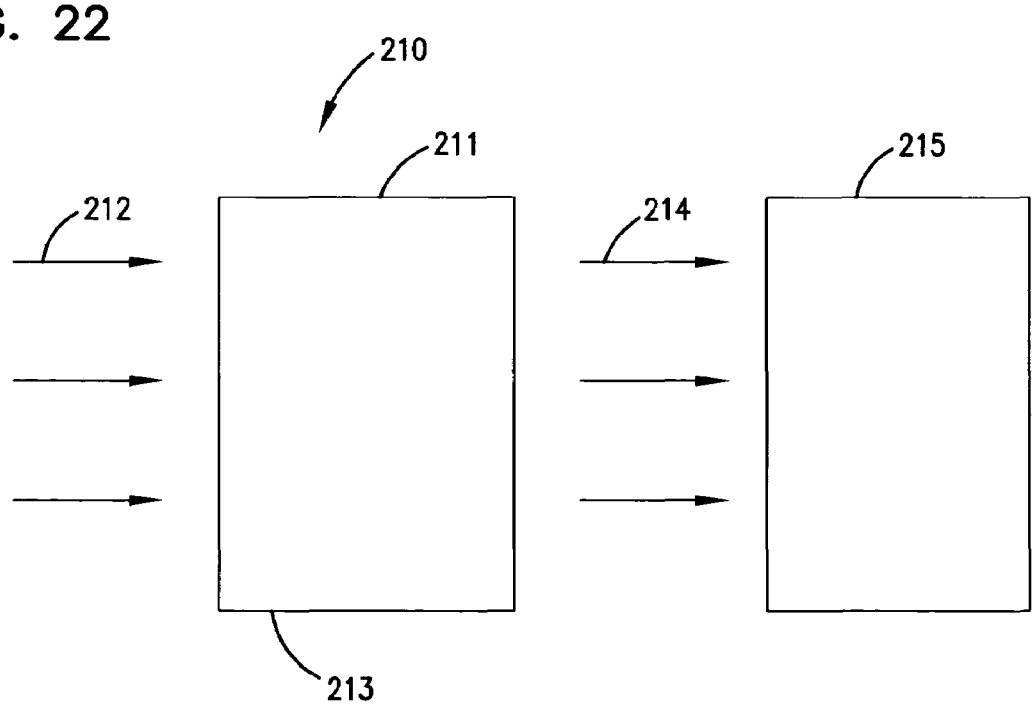
FIG. 22 is a schematic view of an air intake system for a microturbine system, in which filter elements of the present disclosure may be utilized.

In FIG. 22, an example of the air intake of a microturbine is illustrated generally at 210. In general, microturbines are smaller versions of gas turbines typically used as stand-by generators. In some instances, such microturbines are approximately 24 inches by 18 inches and have electrical power output typically between 30 kilowatts and 100 kilowatts. These systems typically have air flow between 1000 cfm and 10,000 cfm.

In FIG. 22, airflow is shown drawn into an air intake system 211 at arrows 212. The air intake system 211 includes a filter arrangement 213. As the air is drawn through the filter arrangement 213, the air is cleaned in the air filter arrangement 213, and then flows downstream at arrows 214 into a gas turbine 215. The gas turbine then typically powers an electrical generator, a fluid compressor, or a fluid pump. As explained below, constructing the filter arrangement in the form of a composite of a barrier media and at least a single layer, and in some instances, multiple layers of "fine fiber" can improve the performance (the operating efficiency, in particular) of the filter arrangement over prior art filters that are not constructed from such media composites.

Figure 19:
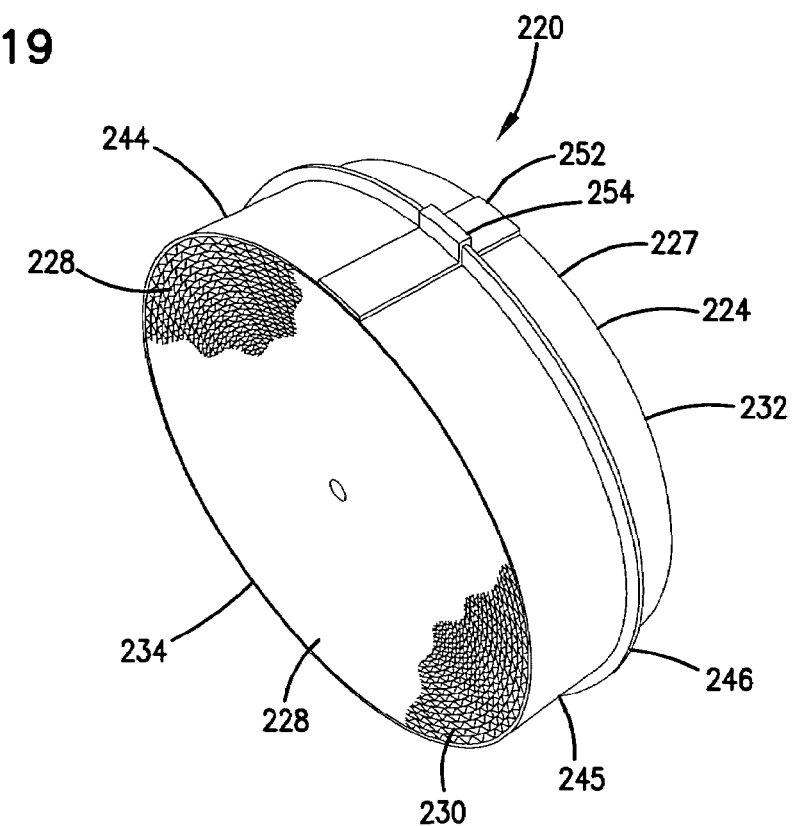
FIG. 19 is a schematic, perspective view of one embodiment of a filter element that may be useable in gas turbine air intake systems depicted in FIG. 18.
Figure 20:
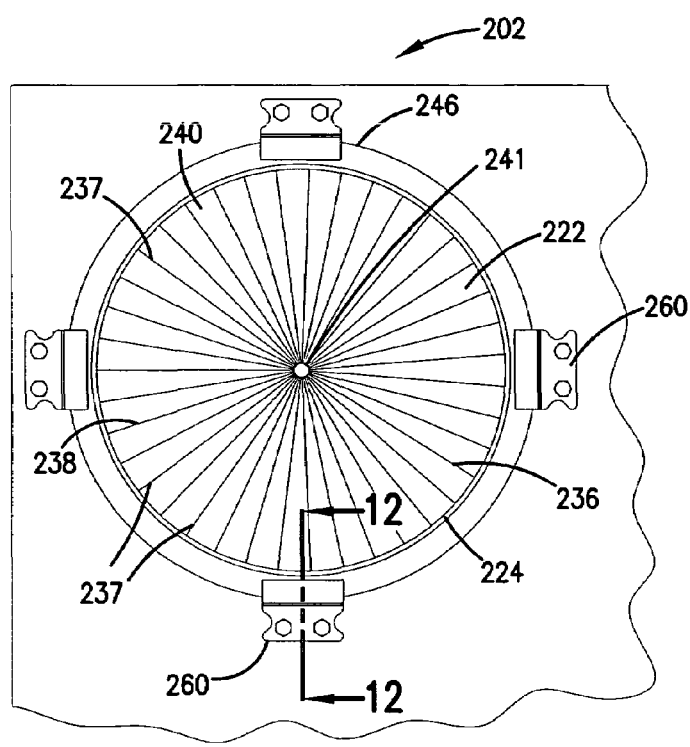
FIG. 20 is a rear elevational view of the filter element depicted in FIG. 19 installed within a tube sheet, and having a prefilter installed upstream of the filter element of FIG. 19.
Figure 21:
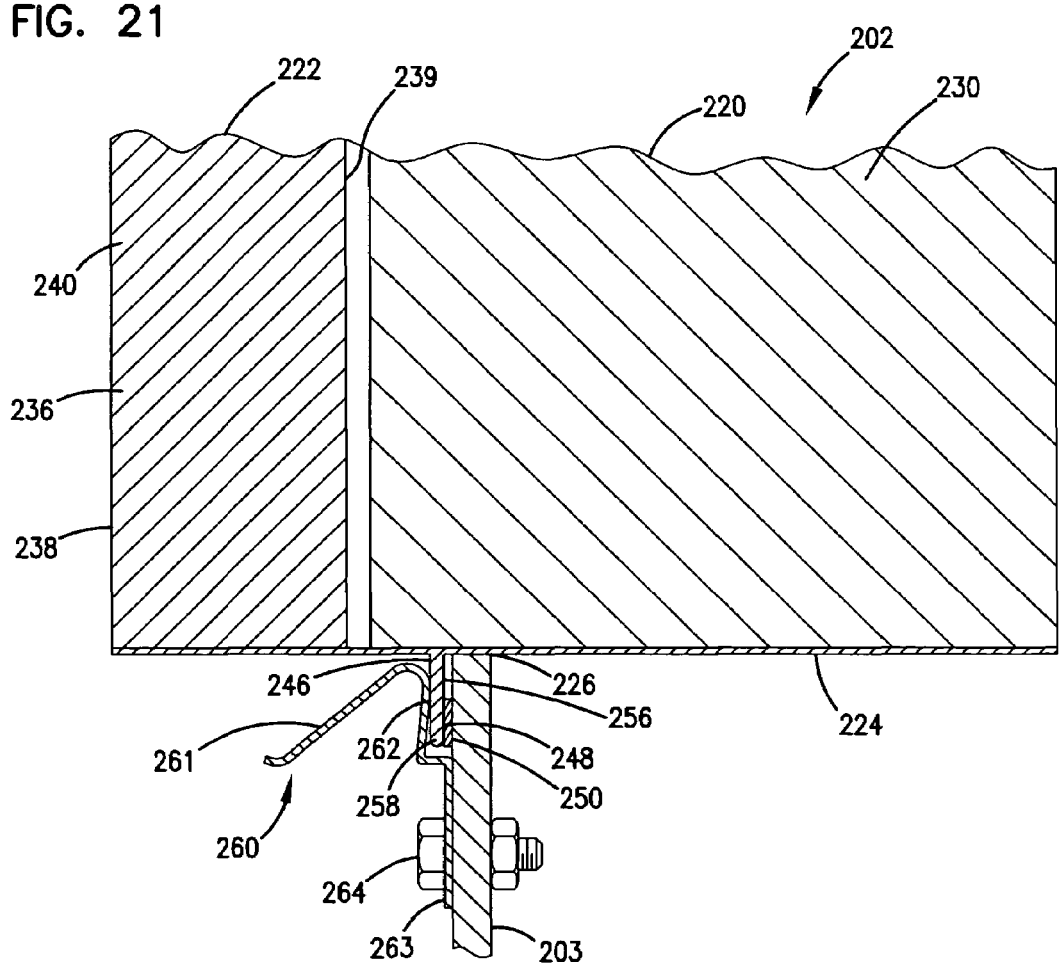
FIG. 21 is an enlarged, schematic, fragmented, cross-sectional view of the air filter arrangement of FIG. 19, taken along the line 12—12 of FIG. 19.

One example of an air filter arrangement 202 usable in system 200 or system 210 is shown in FIGS. 19–21. The air filter arrangement 202 is described in commonly assigned U.S. Ser. No. 09/437,867, filed Nov. 10, 1999, incorporated by reference herein. In general, the air filter arrangement 202 includes a first, or primary filter element 220 (FIGS. 19 and 21) and a second filter element 222 (FIGS. 20 and 21), which acts as a prefilter. By the term "prefilter", it is meant a separator that is positioned upstream of the main, primary filter element 220, that functions to remove large particles from the gas stream. The primary filter element 220 and the prefilter element 222 are preferably secured within a sleeve member 224 that is removably mountable in an aperture 226 in tube sheet 203. In general, air flow is taken into the system 200 and flows first through the prefilter element 222 and then through the primary filter element 220. After exiting the primary filter element 220, the air is directed into the generator 205.

In general, the element 220 is constructed from fluted or z-shaped media 230, as described above in connection with FIGS. 2 and 3. In FIG. 19, it should be understood that the outlet face 228 is shown schematically. That is, only a portion of the face 228 is shown with flutes. It should be understood that, in typical systems, the entire face 228 will be fluted.

The filter element 220 has a first end 232 and an opposite, second end 234. In the arrangement depicted in FIG. 19, the first end 232 will correspond to an upstream end inlet face 227, while the second end 234 will correspond to a downstream end outlet face 228. The straight through flow allows gas to flow into the first end 232 and exit the second end 234, such that the direction of the air flow into the first end 232 is the same direction of air flow that is exiting the second end 234. Straight through flow patterns can reduce the amount of turbulence in the gas flow.

The media 230 can be a polyester synthetic media, a media made from cellulose, or blends of these types of materials and treated with fine fiber.

Preferably, the prefilter element 222 is a pleated construction 236 comprising a plurality of individual pleats 237. The pleats 237 are arranged in a zig-zag fashion. Preferred prefilter elements 222 will have a generally circular cross-section.

The prefilter element 222 is conFigured to permit straight through flow. In other words, the air flows directly through the prefilter element 222, entering at an inlet face 238 and exiting at an oppositely disposed outlet face 239, wherein the direction of fluid flow entering the inlet face 238 is in the same direction of fluid flow exiting the outlet face 239.

In certain preferred embodiments, there will be at least 15 pleats 237, no greater than 80 pleats 237, and typically 30–50 pleats 237. The pleated construction 236 is made from a media 240 that is folded in the form of pleats 237 centered around a central core 241. Useable types of media 240 includes fiberglass, or alternatively, an air laid media. Specific properties of usable media 240 include: a dry laid filter medium made from polyester fibers randomly oriented to form a web having a weight of 2.7–3.3 oz./yd$^3$ (92–112 g/m$^3$); a free thickness (i.e., thickness at 0.002 psi compression) of 0.25–0.40 in. (6.4–10.2 mm); and a permeability of at least 400 ft./min (122 m/min).

In general, the prefilter element 222 is removably and replaceably mountable in the sleeve member 224. The sleeve member 224 is described in further detail below. In certain systems, the prefilter element 222 is held within the sleeve member 224 by squeezing or compressing end tips of the media 240 against the inside wall of the sleeve member 224.

Preferred filter arrangements 202 constructed according to principles herein will have sleeve member 224 secured to and circumscribing the primary filter element 220. In general, the sleeve member 224 functions to hold the primary element 220 in place in the system 200. Preferred sleeve members 224 will also hold the prefilter element 222 in place upstream of the primary element 220.

As can be seen in FIGS. 19 and 20, the sleeve member 224 preferably has a cross-section that matches the cross-section of the primary filter element. The sleeve member 224 includes a surrounding wall 244 that is curved in a form to result in a surrounding ring 245. The sleeve member 224 is preferably oriented relative to the primary filter element 220 to extend at least 30% of the axial length of the primary filter element 220. In many typical arrangements, the sleeve member 224 will extend greater than 50% of the axial length of the primary filter element 220. Indeed, in most preferred arrangements, the sleeve member 224 will extend at least the entire length (that is, 100%) of the axial length of the primary filter element 220. In many typical applications, the sleeve member 224 will have a radius of at least 10 inches, typically 15–30 inches, and in some instances, no greater than 50 inches.

The sleeve member 224 is preferably constructed and arranged with a sealing system to allow for securing the primary filter element 220 to the tube sheet 203, to inhibit air from bypassing the primary element 220. In the illustrated embodiment, the sleeve member 224 includes a seal member pressure flange 246. The flange 246 at least partially, and in many embodiments fully, circumscribes the wall 244 of the sleeve member 224. The seal member pressure flange 246 operates as a backstop to support a seal member 248 in order to create a seal 250 between and against the flange 246 and the tube sheet 203. The flange 246 extends radially from the wall 244 of the sleeve member 224 and fully circumscribes the seal member 224. The flange 246 will extend radially from the wall 244 a distance sufficient to support the seal member 248.

A patch or retaining clip 252 (FIG. 19) extends over a joint 254 to secure the sleeve member 224 in its final configuration Preferably, the retaining clip 252 is secured in a permanent way to the sleeve member 224; for example, by ultrasonic welding.

Attention is directed to FIG. 21. It can be seen that the flange 246 supports the seal member 248 on the axial side 256. The seal member 248 generally comprises a circular gasket 258. The gasket 258 is preferably secured to the flange 246, by adhesive between the gasket 258 and the side 256 of the flange 246. The gasket 258 is positioned on the flange 246, such that the gasket 258 completely circumscribes the wall 244 and the primary element 220.

Figure 32:
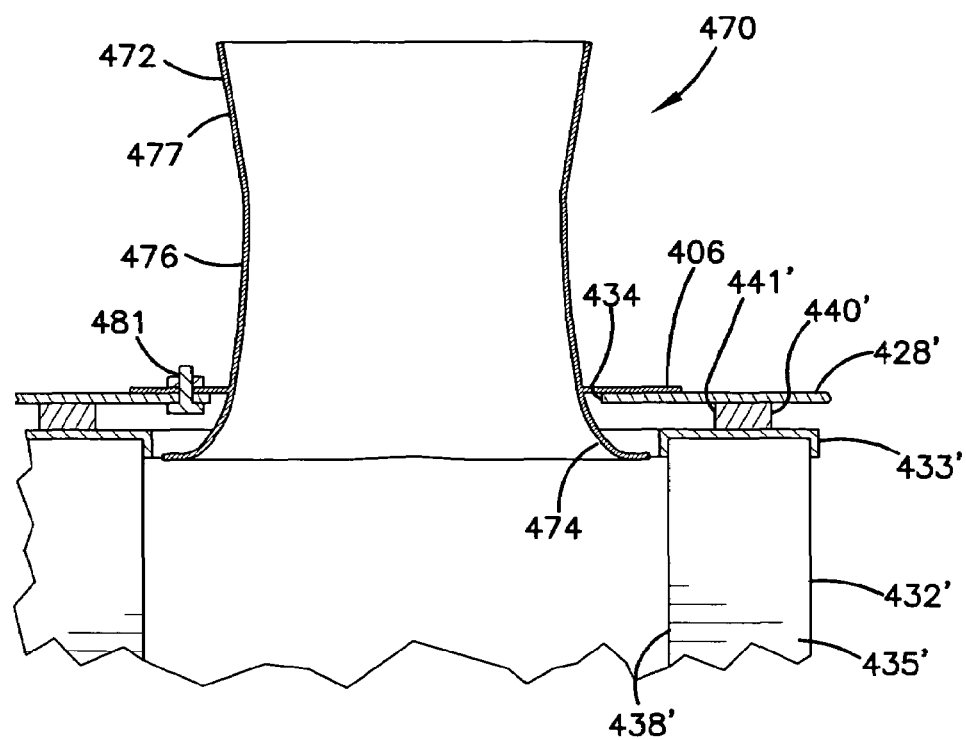
FIG. 32 is a partial cross-sectional view of an embodiment of a filter element with a Venturi element mounted thereon, and usable in the system of FIG. 30.

The arrangement depicted also includes a system for clamping the sleeve member 224 to the tube sheet 203. In the illustrated embodiment, the clamping system includes a plurality of latches or clamps 260. There should be enough latches or clamps 260 to form a good, tight seal 250 between the flange 246 and the tube sheet 203, when the sleeve member 224 is operably installed in the tube sheet 203; for example, illustrated is 4 clamps 260. In FIG. 32, the clamp 260 is shown in cross-section. Each of the clamps 260 includes a lever 261, a nose 262, and a plate 263. The plate 263 includes apertures for accommodating a fastener, such as a bolt 264 to secure the clamp 260 to the tube sheet 203. The nose 262 operates to apply pressure to the flange 246 and compress the seal member 248 against the tube sheet 203. The lever 261 operates to selectively move the nose 262 toward and away from the tube sheet 203. In other embodiments, the clamps 260 can be hand-tightened, such as using wing nuts.

In typical operation, there is an overall pressure drop across the filter arrangement 202 of about 0.6–1.6 inches of water. This includes both the primary filter element 220 and the prefilter 222. Typically, the pressure drop across the prefilter 222 alone will be about 0.2–0.6 inches of water, while the pressure drop across the primary element 220 alone will be about 0.4–1 inch of water.

Figure 24:
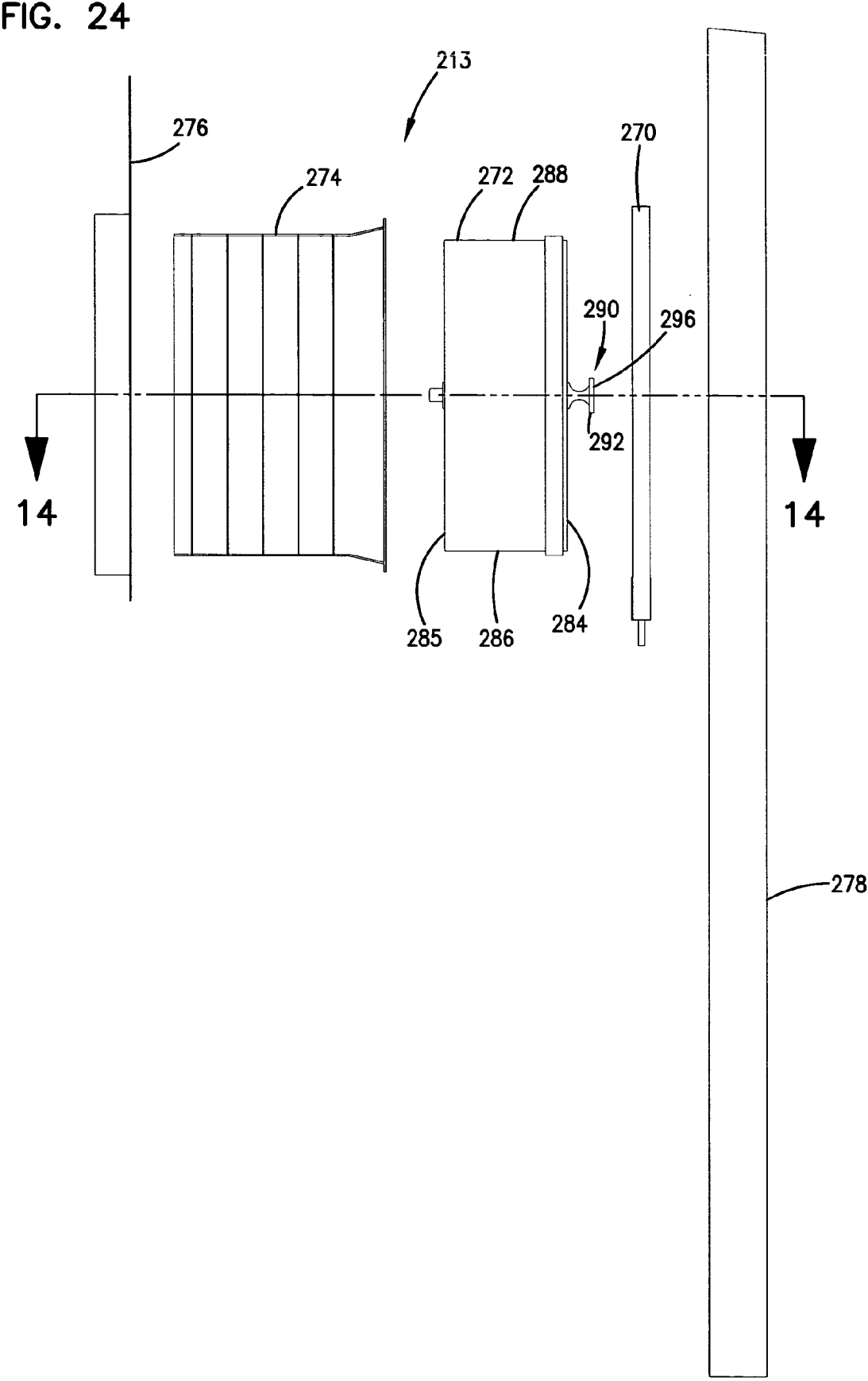
FIG. 24 is an exploded, side elevational view of the filter arrangement of FIG. 23, and in an unassembled state.
Figure 25:
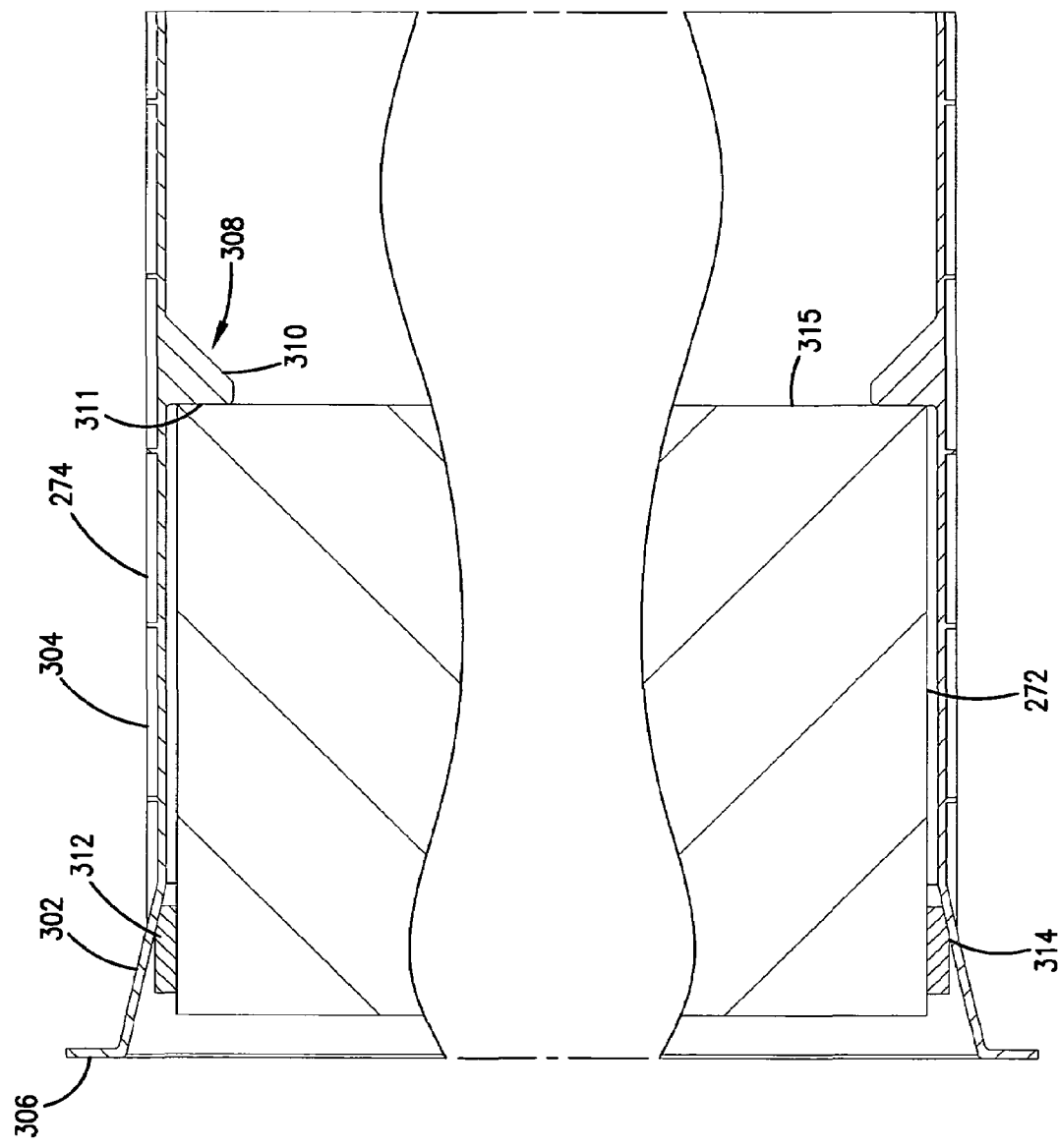
FIG. 25 is a fragmented, schematic, cross-sectional view showing the filter element sealed within a filter housing.

Another example of an air filter arrangement 213 usable in the system 304 or system 302 is shown in FIGS. 23–25. With the exception of preferred media formulations provided below, the air filter arrangement is described in commonly assigned U.S. patent application Ser. No. 09/593,257 filed Jun. 13, 2000, incorporated by reference herein.

FIG. 24 illustrates the filter arrangement 213 in an exploded, unassembled form, while FIG. 14 illustrates the filter arrangement 213 assembled for use. In general, the air filter arrangement 213 includes a moisture separator 270, a filter assembly 272, and a filter housing 274. The filter housing 274 is typically secured within a tube sheet 276 when assembled for use. Preferably, the filter housing 274 is secured within the tube sheet 276 by welding the housing 274 to the tube sheet 276 or by bolting the housing 274 to the tube sheet 276.

An access door 278 provides access to the filter arrangement 213 when assembled and allows air to be drawn into the system 302. In general, the access door 278 is designed and constructed to fit the particular housing of the system, such as the system 302, of FIG. 33, it is to be installed in and to provide access to the filter arrangement 213, when assembled. The access door 278 is also designed and constructed to allow air to enter the system 210, FIG. 22.

The access door 278 preferably includes an air flow resistance arrangement 280. In general, the air flow resistance arrangement 280 directs air flow into the filter arrangement 213 in a particular direction to reduce resistance through the system 302. The air flow resistance arrangement 280 also aids in noise attenuation. In the embodiment depicted in FIG. 34, the air flow resistance arrangement is depicted as a plurality of louvers 282. The louvers 282 also aid in protecting the system 210 from entry of large objects and moisture into the system 302, FIG. 22. The louvers 282 further aid in noise attenuation.

Moisture in the incoming air stream can damage the integrity of the filter assembly 272, and damage, i.e. contribute to rusting, the internal mechanisms of the system 302. To address this, the filter arrangement includes moisture separator 270. In general, the moisture separator 270 separates and collects moisture from the incoming air stream prior to reaching the filter assembly 272. In one embodiment, the moisture separator 270 includes a plurality of flat screens, e.g., wire mesh.

Figure 33:
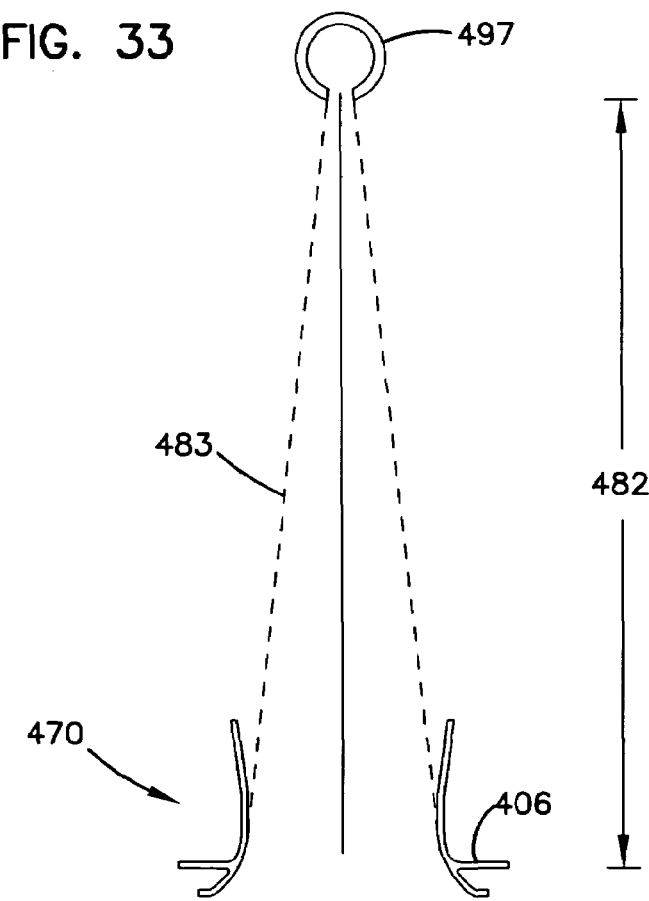
FIG. 33 is a plan view of a pulse jet cleaning system and a Venturi element.

In general, the filter assembly 272 removes contaminants from the incoming air stream 212, FIG. 33, prior to entry into the internal mechanisms of the system 302. Preferably, the filter assembly 272 is conFigured to permit straight through flow directly through the filter assembly 272, entering at an inlet face 284 and exiting at an oppositely disposed outlet face 285, wherein the direction of fluid flow entering the inlet face 284 is in the same direction of fluid flow exiting the outlet face 285.

The filter assembly 272 includes a media pack 286 formed from fluted media 288 rolled into a cylinder, as explained above in connection with FIGS. 11 and 23. The media 288 can be a polyester synthetic media, a media made from cellulose, or blends of these types of materials and treated with a coating or a layer of fine fiber. Preferred media formulations are given below.

The filter assembly 272 depicted includes a pull mechanism 290. The pull mechanism 290 is constructed to allow a user to easily remove the filter assembly 272 from the filter housing 274. In the one shown, the pull mechanism 290 includes a handle 292 and a retention mechanism 294 (FIG. 23). Typically, the handle 292 is a knob 296. In the one shown in FIG. 23, the retention mechanism 294 includes a bolt 298 attached to the knob 296 and a nut 299 at the other end of the bolt. Alternatively, the pull mechanism and the core of the filter media could be one integrated unit.

In general, the filter housing 274 is constructed to receive and hold the filter assembly 272 and to facilitate sealing with the filter assembly 272. In the one shown in FIG. 16, the filter housing 274 includes a transition area 302 angled from an outer wall 304 at an angle of at least 10 degrees, preferably between 10 and 210 degrees, and most preferably about 15 degrees. The transition area 302 aids in sealing the filter assembly 272 as will be explained in more detail below.

The filter housing 274 further includes a mounting flange 306. The mounting flange 306 secures the filter housing 274 to the tube sheet 276 through a fastener arrangement (e.g., bolts). The housing 274 also includes a stopping arrangement 308. The stopping arrangement 308 seats the filter assembly 272 within the housing 274 to prevent the filter assembly 272 from being pushed too far into the housing 274. The stopping arrangement 308 also helps in ensuring a proper seal between the filter assembly 272 and the housing 274.

The stopping arrangement 308 includes a stop 310. Preferably, the stop 310 projects from the outer wall 304 a distance sufficient to prevent the filter assembly 272 from bypassing the stop 310. During use, the filter assembly 272 rests upon a top surface 311 of the stop 310.

The filter assembly 272 also includes a sealing gasket 312. The sealing gasket 312 seals the filter assembly 272 in the filter housing 274, inhibiting air from entering the system 302 between the filter assembly 272 and the filter housing 274 and bypassing the filter assembly 272. This ensures that the air stream goes substantially through the filter assembly 272. In the one illustrated, the sealing gasket 312 extends circumferentially around the radial edge of the filter assembly 272. In one embodiment, the sealing gasket 312 comprises closed cell foam; of course, the sealing gasket 312 can comprise other suitable material.

During use, the sealing gasket 312 seals a joint 314 between the filter assembly 272 and the filter housing 274. During installation, the filter assembly 272 is inserted into the housing 274 until an end 315 rests against the stop 310. As the filter assembly 272 is installed, the sealing gasket 312 is compressed in the transition area 302 between the filter assembly 272 and the housing 274, sealing the joint 314.

During assembly, the filter housing 274 is slid into the tube sheet 276 until the mounting flange 306 of the filter housing 274 is seated against the tube sheet 276. Next, the filter assembly 272 is seated within the filter housing 274. The filter assembly 272 is slid into the filter housing 274 until the end 315 of the filter assembly 272 rests against the stop 310. The sealing gasket 312 is partially compressed and the filter assembly 272 is snugly held with the filter housing 274.

In operation, the filter arrangement 213 is used as follows: Air to be filtered in the system 302 is directed at arrows 212 into the intake system 211. The air flows through the filter assembly 272. The air enters at the inlet face 284, passes through the fluted construction 288, and exits through the outlet face 285. From there, the air is taken into the turbine or generator 215.

A fuel cell air intake is shown schematically in FIG. 26 at 330. As depicted in FIG. 26, atmospheric or ambient air 331 enters filter assembly 332 via an inlet 333. Prior to entering filter assembly 332, atmospheric air 331 is dirty air having various physical (e.g., particulate) and chemical contaminants. Filter assembly 332 is constructed to remove various contaminants from the dirty air to provide clean air 334 that exits from filter assembly 332. Clean air 334 is the intake air for a fuel cell 335, used to generate power.

Referring still to FIG. 26, atmospheric air 331 enters filter assembly 332 as dirty air through inlet 333 in housing 336 and progresses to dirty air side 337 of filter element 338. As the air passes through filter element 338 to clean air side 339, contaminants are removed by filter element 338 to provide filtered air 334. Filtered air 334 exits filter assembly 332 through outlet 340 of housing 336 and is used by equipment 341.

Filter assembly 332 also optionally includes a noise suppression element 342 to reduce or suppress the level of noise or sound emanating from equipment 341. Suppression element 342 may be positioned within housing 336, and in some embodiments, suppression element 342 is defined by housing 336.

Equipment 341 includes a compressor 343 that provides air to fuel cell 335 to use in its catalytic reaction. Compressor 343 emits noise, typically in the range of 3 Hertz to 30,000 Hertz, sometimes as high as 50,000 Hertz, at a level of 85 to 110 dB at one meter. Suppression element 342, reduces the level of sound traveling upstream from compressor 343 by at least 3 dB, typically by at least 6 dB, and preferably by at least 25 dB.

The fuel cell 335 takes in hydrogen fuel 345, emits a by-product of water and carbon dioxide 346, and generates power 347. In general, fuel cells are devices consisting of two electrodes (an anode and a cathode) that sandwich an electrolyte. A fuel containing hydrogen flows to the anode, where the hydrogen electrons are freed, leaving positively charged ions. The electrons travel through an external circuit in which the ions diffuse through the electrolyte. At the cathode, the electrons combine with the hydrogen ions and oxygen to form water and carbon dioxide, by-products. A common oxygen source is air. To speed the cathodic reaction, a catalyst is often used. Examples of catalysts often used in the fuel cell reaction include nickel, platinum, palladium, cobalt, cesium, neodymium, and other rare earth metals. The reactants in the fuel cell are the hydrogen fuel and an oxidizer.

Typically, "low temperature fuel cells" operate at temperatures, typically about 70 to 100° C., sometimes as high as 200° C. High temperature fuel cells are typically not as sensitive to chemical contamination due to their higher operating temperature. High temperature fuel cells are, however, sensitive to particulate contamination, and some forms of chemical contamination, and thus high temperature fuel cells benefit from the filtering features as described herein. One type of low temperature fuel cell is commonly referred to as a "PEM", is named for its use of a proton exchange membrane. Examples of other various types of fuel cells that can be used in combination with the filter assembly of the present invention include, for example, U.S. Pat. Nos. 6,110,611; 6,117,579; 6,103,415; and 6,083,637, the disclosures of which are incorporated here by reference. Various fuel cells are commercially available from, for example, Ballard Power Systems, Inc. of Vancouver, Canada; International Fuel Cells, of Connecticut; Proton Energy Systems, Inc. of Rocky Hill, Conn.; American Fuel Cell Corp. of Massachusetts; Siemans AG of Erlangen, Germany; Energy Partners, L.C. of Florida; General Motors of Detroit, Mich.; and Toyota Motor Corporation of Japan.

The filter assemblies, as described below, remove contaminants from the atmospheric air before the air is used in the fuel cell operation. As explained below, constructing the filter assembly in the form of a composite of a barrier media and at least a single layer, and in some instances, multiple layers of "fine fiber" can enhance the performance (the operating efficiency, in particular) of the filter assembly. The fine fiber treatment is advantageous in improving filter efficiency in most filter geometry and environment. In certain harsh environments with a filter temperature over 120° F., which includes both low temperature and high temperature fuel cells the fine fiber can often survive and provide extended lifetime filtration.

Figure 27:
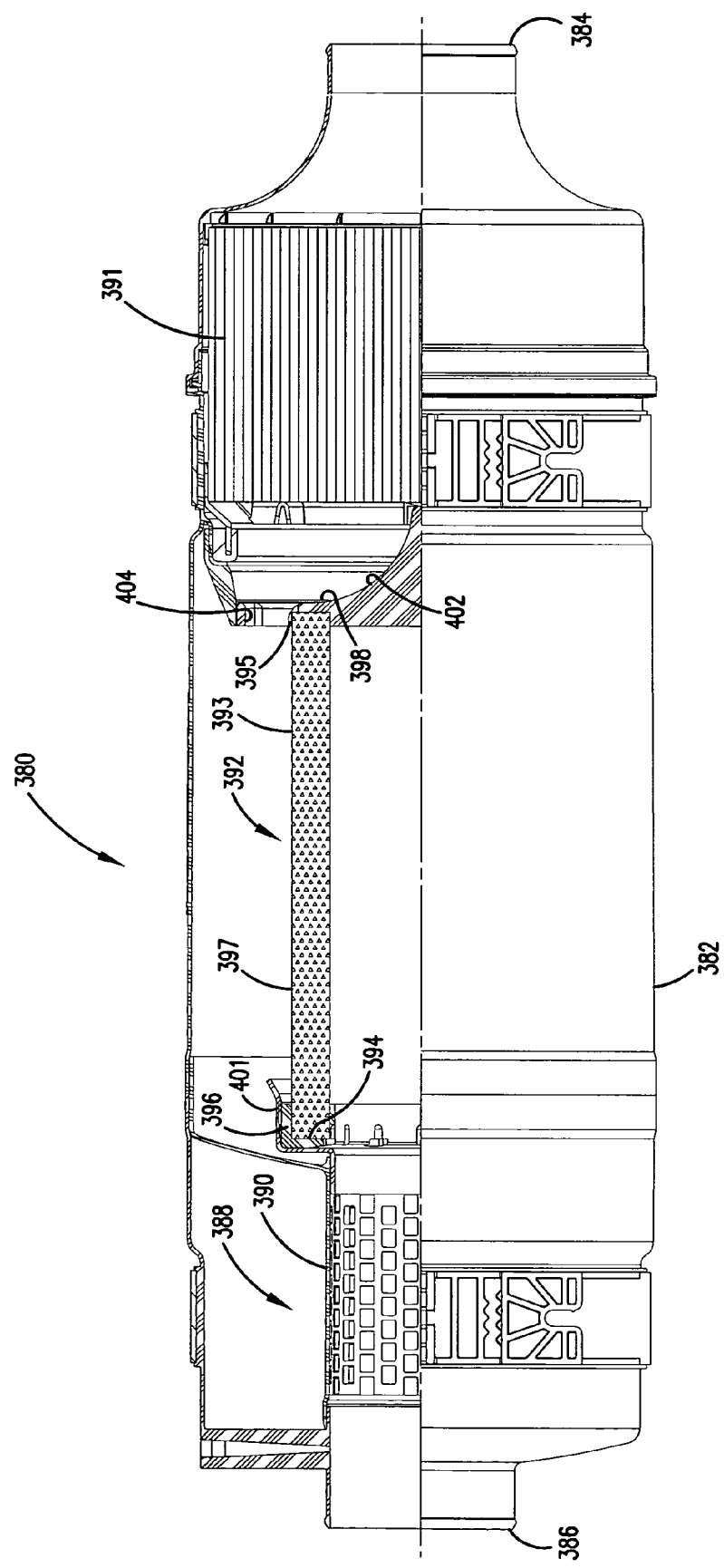
FIG. 27 is a schematic, cross-sectional view of a filter assembly that may be utilized in the fuel cell air intake system of FIG. 26.
Figure 28:
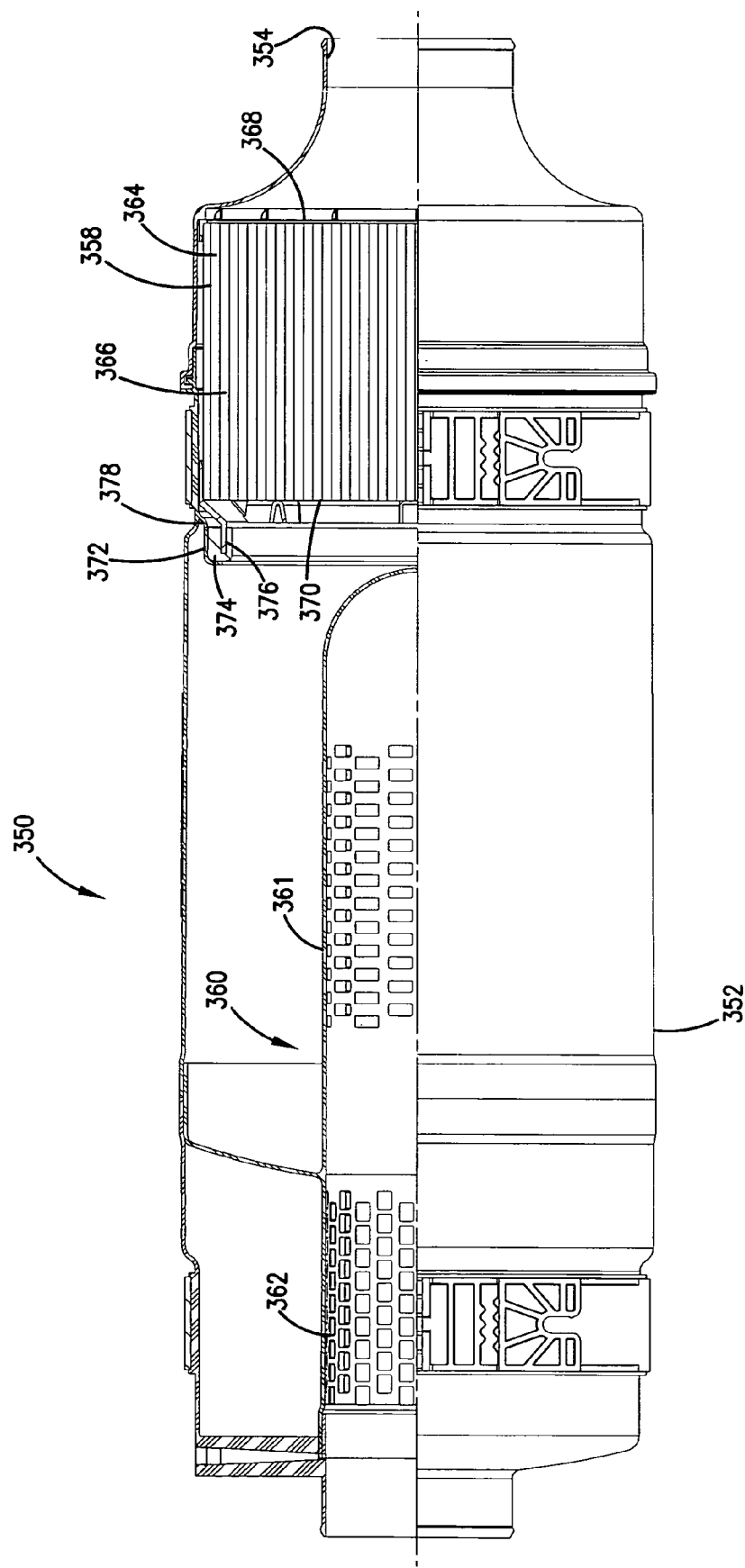
FIG. 28 is a schematic, cross-sectional view of another embodiment of a filter assembly that may be utilized in the air intake for a fuel cell system.

FIG. 27 illustrates a filter assembly 350 usable in the system of FIG. 26. Filter assembly 350 includes a housing 352 which defines an inlet 354 and an outlet 356. Dirty air enters filter assembly 350 via inlet 354, and clean air exits via outlet 356.

Positioned within housing 352 is a filter element 358 and a noise suppression element 360. Suppression element 360 comprises a first resonator 361 and a second resonator 362. First resonator 361 is conFigured to attenuate a peak of about 900 Hz, and second resonator 362 is conFigured to attenuate a peak of about 550 Hz.

Filter element 358 of FIG. 27 is generally constructed analogously as the filter element construction 40 (FIG. 22). As such, it includes a media pack 364 of fluted media 366 (as described with respect to FIG. 3) rolled into filter element 358.

When filter element 358 is used with inline-flow housing 352, the air will enter through inlet 354 of housing 352 in one direction, enter filter element 358 through first flow face 368 in the same direction, exit filter element 358 in the same direction from second flow face 370, and exit housing 352 through outlet 356 also in the same direction.

As with the embodiment of FIGS. 11 and 24, a radial seal 372 is formed by compression of the sealing gasket 374 between and against a frame 376 and an inner sealing surface 378 of the housing.

Filter assembly 350 preferably also includes a portion designed to remove contaminants from the atmosphere by either adsorption or absorption. As used herein, the terms "adsorb", "adsorption", "adsorbent" and the like, are intended to also include the mechanisms of absorption and adsorption.

The chemical removal portion typically includes a physisorbent or chemisorbent material, such as, for example, desiccants (i.e., materials that adsorb or absorb water or water vapor) or materials that adsorb or absorb volatile organic compounds and/or acid gases and/or basic gases. The terms "adsorbent material," "adsorption material," "adsorptive material," "absorbent material," absorption material, "absorptive material," and any variations thereof, are intended to cover any material that removes chemical contaminants by adsorption or absorption. Suitable adsorbent materials include, for example, activated carbon, activated carbon fibers, impregnated carbon, activated alumina, molecular sieves, ion-exchange resins, ion-exchange fibers, silica gel, alumina, and silica. Any of these materials can be combined with, coated with, or impregnated with materials such as potassium permanganate, calcium carbonate, potassium carbonate, sodium carbonate, calcium sulfate, citric acid, or mixtures thereof. In some embodiments, the adsorbent material can be combined or impregnated with a second material.

The adsorbent material typically includes particulates or granulated material and can be present as granules, beads, fibers, fine powders, nanostructures, nanotubes, aerogels, or can be present as a coating on a base material such as a ceramic bead, monolithic structures, paper media, or metallic surface. Typically, the adsorbent materials, especially particulate or granulated materials, are provided as a bed of material.

Alternately, the adsorbent material can be shaped into a monolithic or unitary form, such as a large tablet, granule, bead, or pleatable or honeycomb structure that optionally can be further shaped. In at least some instances, the shaped adsorbent material substantially retains its shape during the normal or expected lifetime of the filter assembly. The shaped adsorbent material can be formed from a free-flowing particulate material combined with a solid or liquid binder that is then shaped into a non-free-flowing article. The shaped adsorbent material can be formed by, for example, a molding, a compression molding, or an extrusion process. Shaped adsorbent articles are taught, for example, in U.S. Pat. No. 5,189,092 (Koslow), and U.S. Pat. No. 5,331,037 (Koslow), which are incorporated herein by reference.

The binder used for providing shaped articles can be dry, that is, in powdered and/or granular form, or the binder can be a liquid, solvated, or dispersed binder. Certain binders, such as moisture curable urethanes and materials typically referred to as "hot melts", can be applied directly to the adsorbent material by a spray process. In some embodiments, a temporary liquid binder, including a solvent or dispersant which can be removed during the molding process, is used. Suitable binders include, for example, latex, microcrystalline cellulose, polyvinyl alcohol, ethylene-vinyl acetate, starch, carboxyl methyl cellulose, polyvinylpyrrolidone, dicalcium phosphate dihydrate, and sodium silicate. Preferably the composition of a shaped material includes at least about 70%, by weight, and typically not more than about 98%, by weight, adsorbent material. In some instances, the shaped adsorbent includes 85 to 95%, preferably, approximately 90%, by weight, adsorbent material. The shaped adsorbent typically includes not less than about 2%, by weight, binder and not more than about 30%, by weight, binder.

Another embodiment of a suitable adsorbent material for use in the chemical removal portion is an adsorbent material that includes a carrier. For example, a mesh or scrim can be used to hold the adsorbent material and binder. Polyester and other suitable materials can be used as the mesh or scrim. Typically, any carrier is not more than about 50% of the weight of the adsorbent material, and is more often about 20 to 40% of the total adsorbent weight. The amount of binder in the shaped adsorbed article with the carrier typically ranges about 10 to 50% of the total adsorbent weight and the amount of adsorbent material typically ranges about 20 to 60% of the total adsorbent weight.

The chemical removal portion can include strongly basic materials for the removal of acid contaminants from the air, or strongly acidic materials for the removal of basic contaminants from the air, or both. Preferably, the basic materials and acidic materials are removed from each other so that they do not cancel each other. In some embodiments, the adsorbent material itself may be the strongly acidic or strong basic material. Examples of such materials include materials such as polymer particulates, activated carbon media, zeolites, clays, silica gels, and metal oxides. In other embodiments, the strongly acidic materials and the strongly basic materials can be provided as surface coatings on carriers such as granular particulate, beads, fibers, fine powders, nanotubes, and aerogels. Alternately or additionally, the acidic and basic material that forms the acidic and basic surfaces may be present throughout at least a portion of the carrier; this can be done, for example, by coating or impregnating the carrier material with the acidic or basic material.

Both basic and acidic materials may be present in the chemical removal portion of the filter element; however, it is preferable that the two types of materials are spaced from each other so that they do not react with and neutralize one another. In some embodiments, the basic material, acidic material, or both, may be spaced from an adsorbent material, such as activated carbon.

Examples of acidic compounds that are often present in atmospheric air and are considered as contaminants for fuel cells include sulfur oxides, nitrogen oxides, hydrogen sulfide, hydrogen chloride, and volatile organic acids and nonvolatile organic acids. Examples of basic compounds that are often present in atmospheric air and are considered as contaminants for fuel cells include ammonia, amines, amides, sodium hydroxides, lithium hydroxides, potassium hydroxides, volatile organic bases and nonvolatile organic bases.

For PEM fuel cells, the cathodic reaction occurs under acidic conditions, thus, it is undesirable to have basic contaminants present. An example of a preferred material for removing basic contaminants, such as ammonia, is a bed of activated carbon granules impregnated with citric acid.

Figure 37:
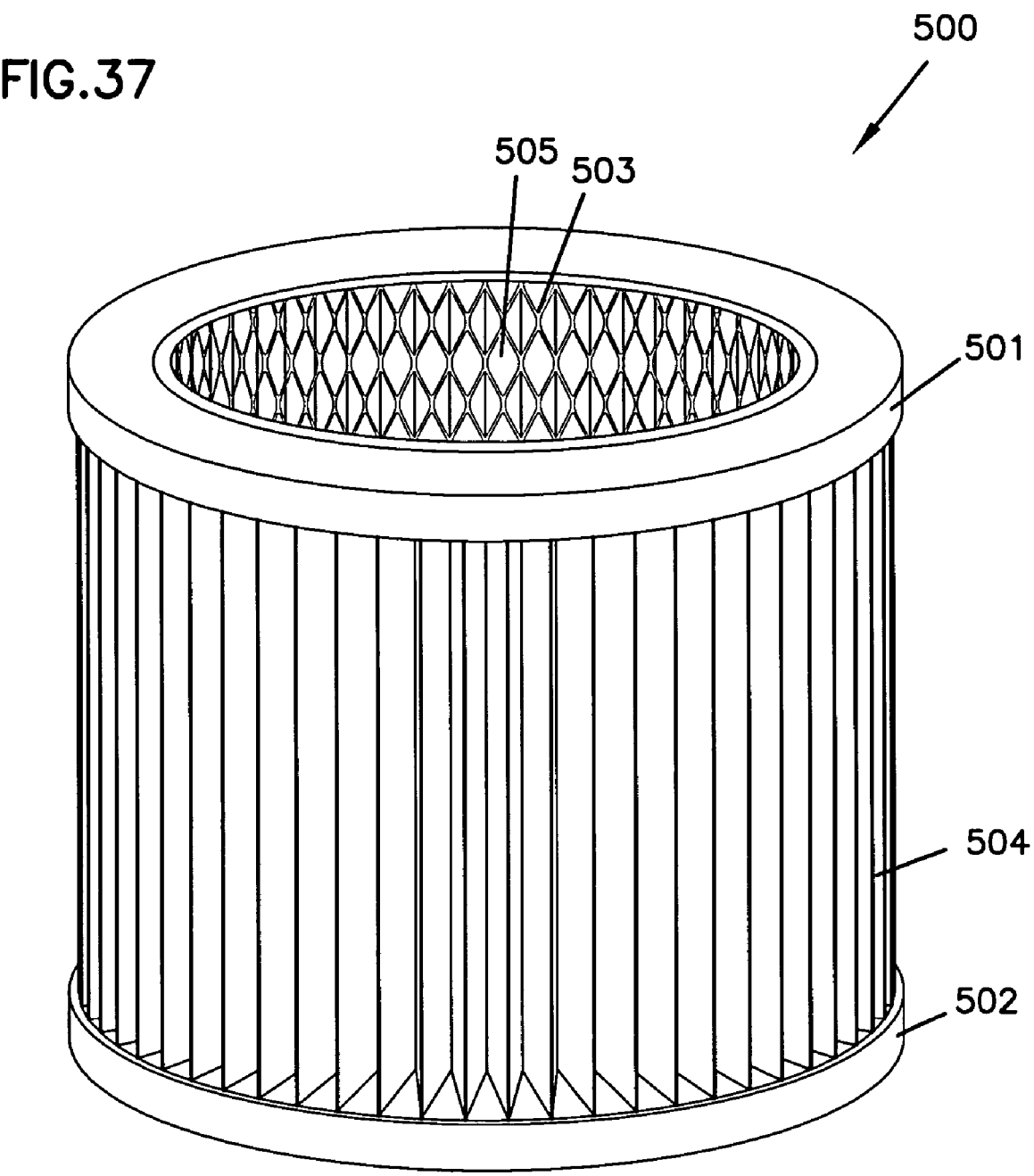
FIGS. 37–40 show preferred filter configurations including a cylindrical cartridge, a cartridge with a seal and a flat panel structure.
Figure 39:
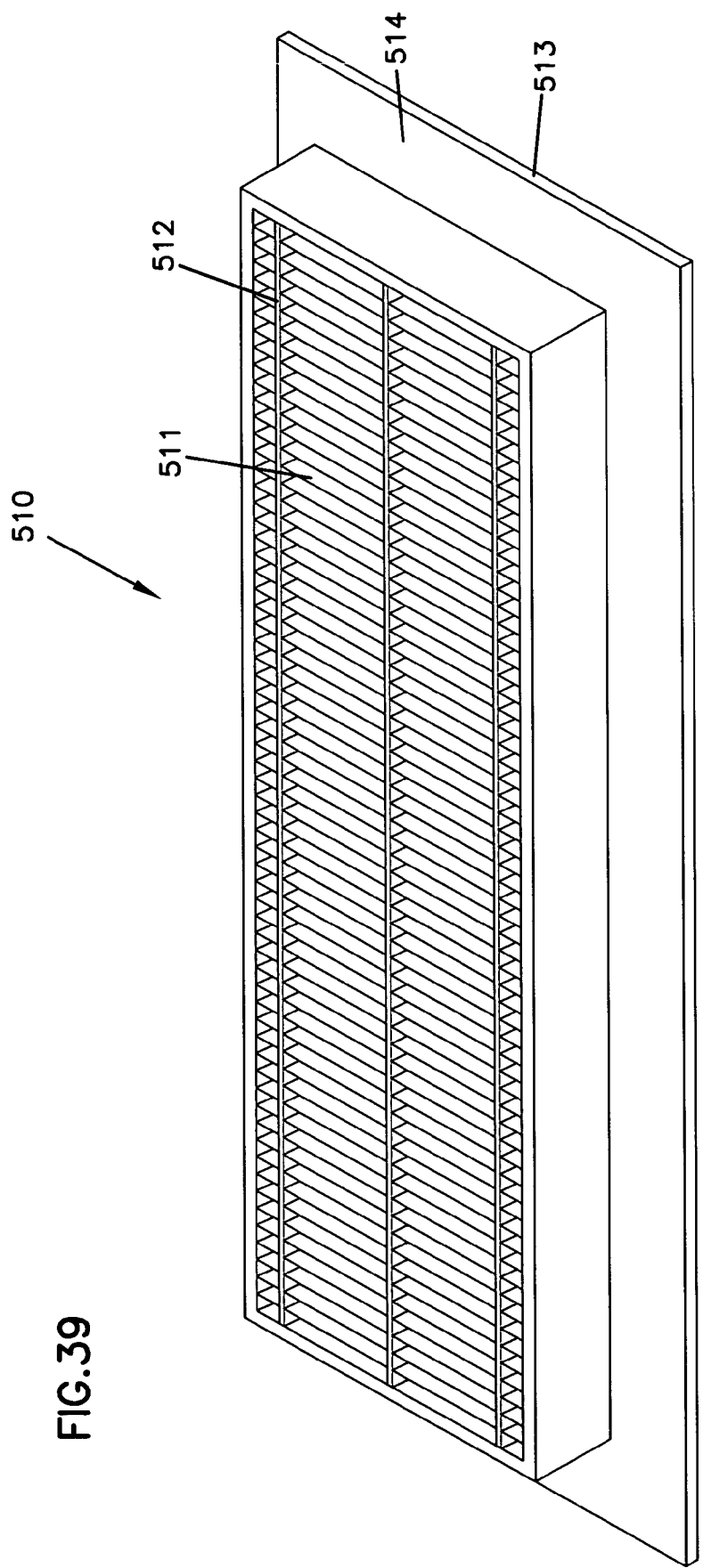

A second example of a filter assembly usable in the system of FIG. 37 is shown in fragmented cross-section in FIG. 39 as a filter assembly 380. Filter assembly 380 includes a housing 382 which defines an inlet 384 and an outlet 386. Dirty air enters filter assembly 380 via inlet 384, and clean air exits via outlet 386. Sound suppression element 388 comprises a resonator 390. A filter element 391 is mounted within the housing 382 and is analogous to filter element 358.

Filter assembly 380 also includes an adsorbent element 392. Adsorbent element 392 comprises a cylindrical mass of carbon 393 between ends 394, 395. In the one depicted, mass of carbon 393 is a hollow, circular extension 397 of activated carbon held together by a thermoplastic binder. Carbon 393 can be produced, for example, by the teacigs of U.S. Pat. No. 5,189,092 (Koslow), and U.S. Pat. No. 5,331,037 (Koslow). Positioned at first end 394 is a sealing system 396 and positioned at second end 395 is a cap 398.

Sealing system 396 provides an air-tight seal between adsorbent element 392 and baffle 401. Sealing system 396 is designed to seal adsorbent element 392 against baffle 401, and, under normal conditions, inhibit air from passing through a region between adsorbent element 392 and the sidewall of housing 382. Sealing system 396 inhibits air flow from avoiding passing through carbon 393 of adsorbent element 392. Sealing system 396 is typically made from a flexible, compressible material, such as polyurethane.

Cap 398 diverts air exiting filter element 358 so that it enters adsorbent element 392 through carbon 393 rather than passing axially through the cylindrical extension of carbon 393. Air from filter element 391 impinges on an exposed surface 402 of cap 398 and is rerouted from its "straight-line" flow to a flow having a radial component. Cap 398 includes apertures 404 therein for passage of air through cap 398 so that the air can reach carbon 393. In addition to managing air flow, cap 398 provides anchoring of absorbent element 392 to filter element 391.

Adsorbent element 392 functions both as a chemical removal portion and as an element of sound suppression element 388. Other arrangements of adsorbent elements and adsorbent materials may also have both a chemical removal quality and a sound suppression quality.

The fine fiber materials of the invention can be used in a variety of filter applications including pulse clean and non-pulse cleaned filters for dust collection, gas turbines and engine air intake or induction systems; gas turbine intake or induction systems, heavy duty engine intake or induction systems, light vehicle engine intake or induction systems; vehicle (train, auto, truck, aircraft, etc.) cabin air; off road vehicle cabin air, disk drive air, photocopier-toner removal; HVAC filters in both commercial or residential filtration applications. As the gases (fluids) pass through the filter, the upstream side of the filter operates through diffusion and interception to capture and retain selected sized particles from the gas (fluid) stream. The particles are collected as a dust cake on the upstream side of the filter. In time, the dust cake also begins to operate as a filter, increasing efficiency. This is sometimes referred to as "seasoning," i.e. development of an efficiency greater than initial efficiency.

A filter construction according to the present invention includes a first layer of high efficiency media or substrate having a first surface. A first layer of fine fiber media is secured to the first surface of the first layer of high efficiency media. A coarse separation layer can be used to separate fine fiber from the high efficiency media. Preferably the permeable coarse fibrous material comprises fibers having an average diameter of at least 10 microns, typically and preferably about 12 (or 14) to 30 microns. Also preferably the first layer of permeable coarse fibrous material comprises a media having a basis weight of no greater than about 200 grams/meter$^2$, preferably about 0.50 to 150 g/m$^2$, and most preferably at least 8 g/m$^2$. Preferably the first layer of permeable coarse fibrous media is at least 0.0005 inch (12 microns) thick, and typically 0.0006 to 0.02 (15 to 500 microns) thick and preferably is about 0.001 to 0.030 inch (25–800 microns) thick.

In preferred arrangements, the layer of permeable coarse fibrous material comprises a material which, if evaluated separately from a remainder of the construction by the Frazier permeability test, would exhibit a permeability of at least 1 meter(s)/min, and typically and preferably about 2–900 meters/min. Herein when reference is made to efficiency, unless otherwise specified, reference is meant to efficiency when measured according to ASTM-1215-89, with 0.78$\mu$ monodisperse polystyrene spherical particles, at 20 fpm (6.1 meters/min) as described herein.

Preferably the layer of fine fiber material is a layer of nano- and microfiber media wherein the fibers have average fiber diameters of no greater than about 2 microns, generally and preferably no greater than about 1 micron, and typically and preferably have fiber diameters smaller than 0.5 micron and within the range of about 0.05 to 0.5 micron. Also, preferably the first layer of fine fiber material secured to the first surface of the first layer of permeable coarse fibrous material has an overall thickness that is no greater than about 30 microns, more preferably no more than 20 microns, most preferably no greater than about 10 microns, and typically and preferably that is within a thickness of about 1–8 times (and more preferably no more than 5 times) the fine fiber average diameter of the layer.

Certain preferred arrangements according to the present invention include filter media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes.

In some applications, media according to the present invention may be used in conjunction with other types of media, for example conventional media, to improve overall filtering performance or lifetime. For example, media according to the present invention may be laminated to conventional media, be utilized in stack arrangements; or be incorporated (an integral feature) into media structures including one or more regions of conventional media. It may be used upstream of such media, for good load; and/or, it may be used downstream from conventional media, as a high efficiency polishing filter.

Certain arrangements according to the present invention may also be utilized in liquid filter systems, i.e. wherein the particulate material to be filtered is carried in a liquid. Also, certain arrangements according to the present invention may be used in mist collectors, for example arrangements for filtering fine mists from air.

Crossflow membrane filtration technology uses a separation of the components of a fluid by semipermeable membranes through the application of pressure and tangential flow to the membrane surface. This includes the processes of R/O, UF, Nanofiltration and Microfiltration. Basically, instead of routing all the liquid to flow through a filter media (dead end flow), the liquid flows past a membrane material; some of the liquid flows through the membrane material (not too much—perhaps 10% or so) thus concentrating the contaminant in the remaining liquid stream. The liquid stream flowing past also dislodges any particles from the surface of the media because membranes (and nanofiber) surface load with debris and the shear force of the flowing liquid is adequate to dislodge the particles. This kind of system is used in a variety of places—sometimes the stream with the concentrated debris is actually the product (biochemical or pharmaceutical processing); in other cases concentrating the debris results in a smaller volume of effluent to treat/store. Sometimes the systems also use reverse pulse or vibratory cleaning technology to dislodge the "solid". These filters are often used to obtain or concentrate valuable salts, proteins, pharmaceuticals etc. and to differentiate and separate by molecule size. Filter life can be extended and costs can be controlled with an appropriate flushing technique. Because membrane filters trap the particles on the source side, it is possible to flush the filter, by reversing the flow direction (backwash). Many membrane filters feature a crossflow, in which most of the fluid travels tangentially to the surface to sweep the contaminants away and avoid fouling the filter. Only a small portion (approximately 10%) of the fluid passes through the filter as the cleaned permeate. With flow-through filters, such as cartridge filters, where the particles are harder to dislodge because they penetrate more to the center of the filter, it is usually more cost effective to dispose of the filter and replace with a new one than to attempt to regenerate it. Operating the filter or filter membrane in crossflow mode is helpful for both contaminant removal and value recovery processes. By doing so, rejected contaminants or valuable materials are continuously carried away from the membrane surface, thereby minimizing the buildup of a concentration layer and leaving the membrane free to reject incoming material maintain high flow and allow free flow of liquid. Although membrane cleaning is periodically required, the self-cleaning nature of crossflow filtration provides the membrane life necessary for economic attractiveness.

Crossflow operations typically fall into one of three categories: ultrafiltration (UF), nanofiltration (NF), and hyperfiltration, more commonly known as reverse osmosis (RO). The most common of the three is reverse osmosis due to the comprehensive capability for dissolved impurity removal or recovery of valuable solids materials. Machines normally include the membrane elements and housings, interconnecting piping, pumps, prefilters and controls and instrumentation necessary for operation.

Since membrane accounts for 15–40% of the price of an RO or UF machine and must be replaced periodically, careful selection is required. Many types are available and each has its unique characteristics. Selection criteria should include chemical tolerance, mechanical suitability, cleanability, separation, and flow performance and price.

As will other mechanical devices, crossflow filtration machines function at their best when design and materials enhance one another. Once the correct membrane is chosen, a design that provides for appropriate crossflow rates, pressures and permeate recoveries is critical. Wastewaters have higher fouling tendencies than typical potable waters, and require more conservative designs. The benefits of good machine design should be consistent operation and separation performance, minimum frequency of membrane cleaning and replacement, reasonable power consumption and minimal need for operation attention.

There is probably no better investment than in equipment that prepares a feedwater for membrane treatment. The equipment is relatively inexpensive yet has tremendous benefits. For example, multi-media filters remove turbidity and oxidized metals (like iron and manganese) very efficiently. Cartridge or bag filters to remove residual insoluble material to about five microns are a must. Chemical pumps are useful for injection of acid or anti-scalants to keep salts soluble or for injection of bio-control agents. Depending on the nature of the feedwater, other equipment such as clarifiers or carbon filters may also be appropriate.

With good pretreatment, the membrane in a crossflow machine will bear no burden greater than what is intended for it. The result is optimum performance, and the lowest overall expenditure on the user's part. How to determine the correct membrane and proper design and pretreatment is to develop the application with an application and pilot-testing program. Application testing, or feasibility testing, is the first step to determining these machine characteristics. Usually conducted on a lab or bench scale level, the application test indicates expected levels of impurity rejection, chemical suitability, and fouling tendencies of test membrane types. Results are normally reliable enough to narrow choices of membrane to no more than two, and predict if any pretreatment equipment will be required.

Information obtained during application testing can then be applied to on-site pilot testing. A pilot test conducted over several hundred hours allows steady-state performance data to be collected and used for full-scale design. Changes in feedwater chemistry, cleaning frequency and technique effectiveness play important roles in determining steady-state operation.

The importance of working with an experienced firm throughout application development and equipment purchase cannot be emphasized enough. Wastewater applications are unique, individualized processes requiring significant evaluation and fine-tuning of process parameters, best achieved in close cooperation between the crossflow filtration technology vendor and customer.

Groundwaters contaminated by years of chemical and mining operations can be cleaned up very effectively by reverse osmosis. At old uranium mine in Texas, for example, underground wells pump water through multi-media filters to an RO machine. RO-purified water is then reinjected into the ground. The concentrated contaminants are hauled for disposal or evaporation.

Waste waters from beverage bottling plants, pulp and paper mills, pharmaceutical facilities and metal fabrication plants usually contain some impurities at levels higher than allowed by regulatory agencies. Ultrafiltration (UF) processes effectively reduce BOD and COD content, while RO processes remove heavy metals and solvents, allowing discharge of purified water. In some cases, the purified water is suitable for reuse in the plant, and may be superior to plant feedwater.

In situations where one constituent makes up the bulk of dissolved solids content, reclamation of that constituent often proves economically attractive. Recovery of nickel or other heavy metals from plating operation streams, fractionation and recovery of protein from daily waste streams, and recovery of paint pigments from electrocoat deposition (ED) operations in automotive factories are common examples. Material recovery either saves the end user thousands of dollars a year in purchases, or provides a product for sale. And, purified water is still available for discharge or reuse, in which case water cycles can be practically closed.

According to the present invention, methods are provided for filtering. The methods generally involve utilization of media as described to advantage, for filtering. As will be seen from the descriptions and examples below, media according to the present invention can be specifically configured and constructed to provide relatively long life in relatively efficient systems, to advantage.

Figure 29:
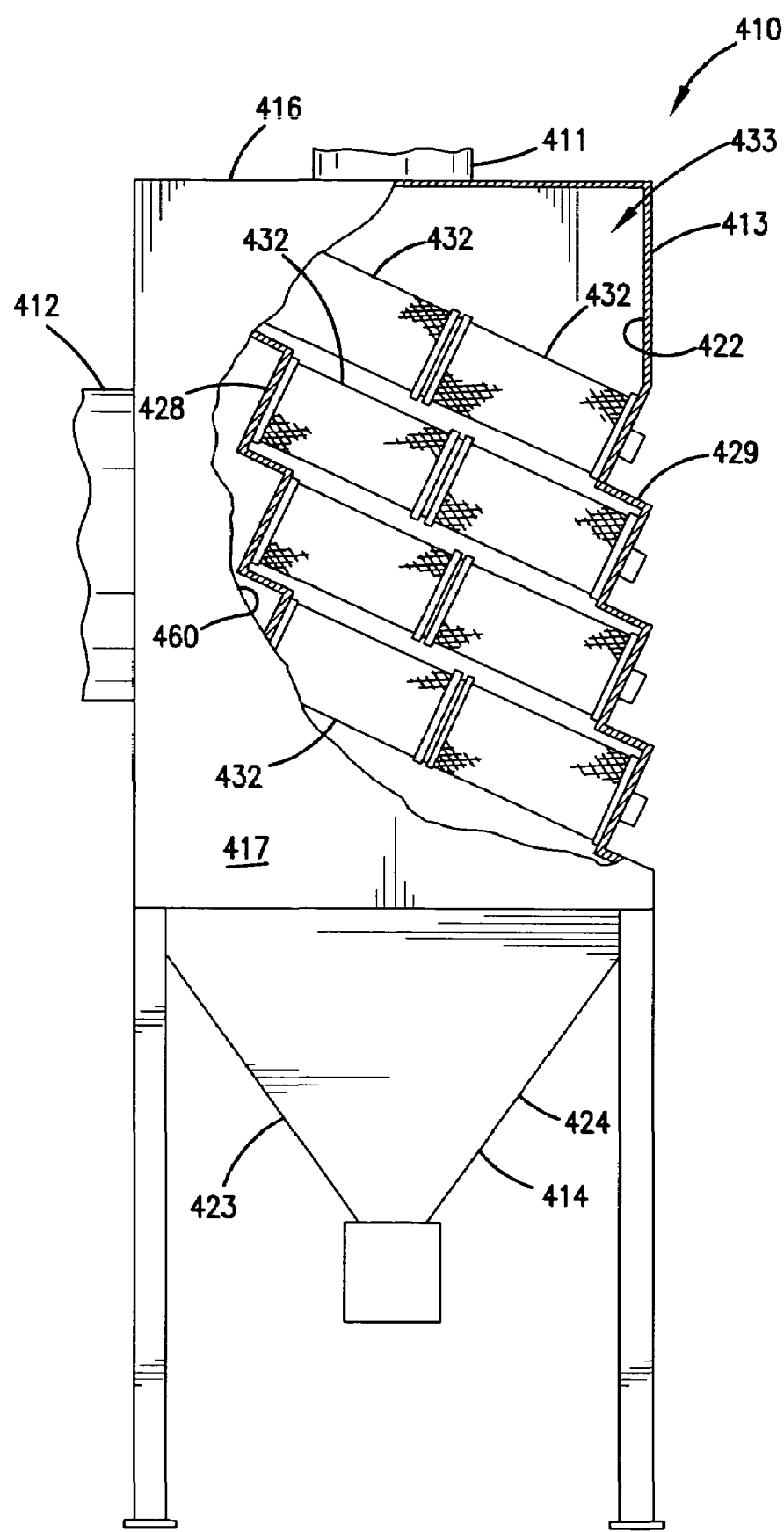
FIG. 29 is a side elevation, partially broken away, view of one embodiment of an air filtration system including filter elements, according to the present invention.

Various filter designs are shown in patents disclosing and claiming various aspects of filter structure and structures used with the filter materials. Engel et al., U.S. Pat. No. 4,720,292, disclose a radial seal design for a filter assembly having a generally cylindrical filter element design, the filter element being sealed by a relatively soft, rubber-like end cap having a cylindrical, radially inwardly facing surface. Kahlbaugh et al., U.S. Pat. No. 5,082,476, disclose a filter design using a depth media comprising a foam substrate with pleated components combined with the microfiber materials of the invention. Stifelman et al., U.S. Pat. No. 5,104,537, relate to a filter structure useful for filtering liquid media. Liquid is entrained into the filter housing, passes through the exterior of the filter into an interior annular core and then returns to active use in the structure. Such filters are highly useful for filtering hydraulic fluids. Engel et al., U.S. Pat. No. 5,613,992, show a typical diesel engine air intake filter structure. The structure obtains air from the external aspect of the housing that may or may not contain entrained moisture. The air passes through the filter while the moisture can pass to the bottom of the housing and can drain from the housing. Gillingham et al., U.S. Pat. No. 5,820,646, disclose a Z filter structure that uses a specific pleated filter design involving plugged passages that require a fluid stream to pass through at least one layer of filter media in a "Z" shaped path to obtain proper filtering performance. The filter media formed into the pleated Z shaped format can contain the fine fiber media of the invention. Glen et al., U.S. Pat. No. 5,853,442, disclose a bag house structure having filter elements that can contain the fine fiber structures of the invention. Berkhoel et al., U.S. Pat. No. 5,954,849, show a dust collector structure useful in processing typically air having large dust loads to filter dust from an air stream after processing a workpiece generates a significant dust load in an environmental air. Lastly, Gillingham, U.S. Des. Pat. No. 425,189, discloses a panel filter using the Z filter design. Referring to FIG. 29, an air filtration system or assembly is depicted generally at 410. The system 410 depicted is shown with three units or modules configured together in side-by-side arrangement. This arrangement can be, for example, of a size that fits into a 6 ft by 10 ft by 10 ft space.

The system 410 in FIG. 29 includes an inlet or conduit 411 for taking in dirty or contaminated air (i.e., with particulate matter). An outlet or conduit 412 is provided for venting clean or filtered air from the filter assembly 410. The interior of the system 410 is accessible through an access door 413.

Still in reference to FIG. 29, one side wall panel 417 is depicted as broken away to illustrate the arrangement of the various elements of the assembly. In this embodiment, the air inlet 411 is positioned in the upper wall panel 416 so that entering dust-laden air or other contaminated fluid is introduced in a downwardly direction into a dirty air chamber 422. This allows the assembly to utilize the forces of gravity in moving the dust through the assembly 410 to a collection area 414. The dirty air chamber 422 is defined by the door 413, the upper wall panel 416, two pairs of opposing side wall panels 417 (which extend downwardly from the upper panel), stepped wall structure 429, and a pair of sloping surfaces 423, 424. The sloping surfaces 423, 424 partially define the collection area or hopper 414 within the base portion of the assembly.

Sealed to a structural frame member along each of the side wall panels 417 is mounted a spacer wall or tube sheet structure 428 having a step-like design to which are mounted separate filter elements 432 of the assembly 410. The tube sheet structure 428 is sealed on all sides to hermetically seal the dirty air chamber 422 from a clean air chamber 460. The filter elements 432 mounted to the stepped, tube sheet structure 428 are positioned in the dirty air chamber 422 in stepped or spaced apart, partially overlapping relationship, in a generally downward direction at an acute angle of inclination with respect to the horizontal plane of the upper surface panel 416. In this manner, a distribution space 433 is defined in the uppermost portion of the filter assembly 410. As the dirty air enters the assembly 410 from the inlet 420, it is received into the distribution space 433 prior to its being filtered.

The individual filter elements 432, as depicted, include pleated media 435 formed into cylindrical tube elements each having ends. Other than preferred media formulations described below, the construction of each element 432 and how it is supported to the tube sheet structure 428 is similar to the filter element of U.S. Pat. No. 4,395,269 and U.S. Pat. No. 5,562,746, each of which is incorporated by reference herein. Details of construction of the filter element and how the filter media is fashioned into stable cylindrical shape and confined with end caps is disclosed in U.S. Pat. No. 4,171, 963 (Schuler), which is incorporated by reference herein.

Figure 31:
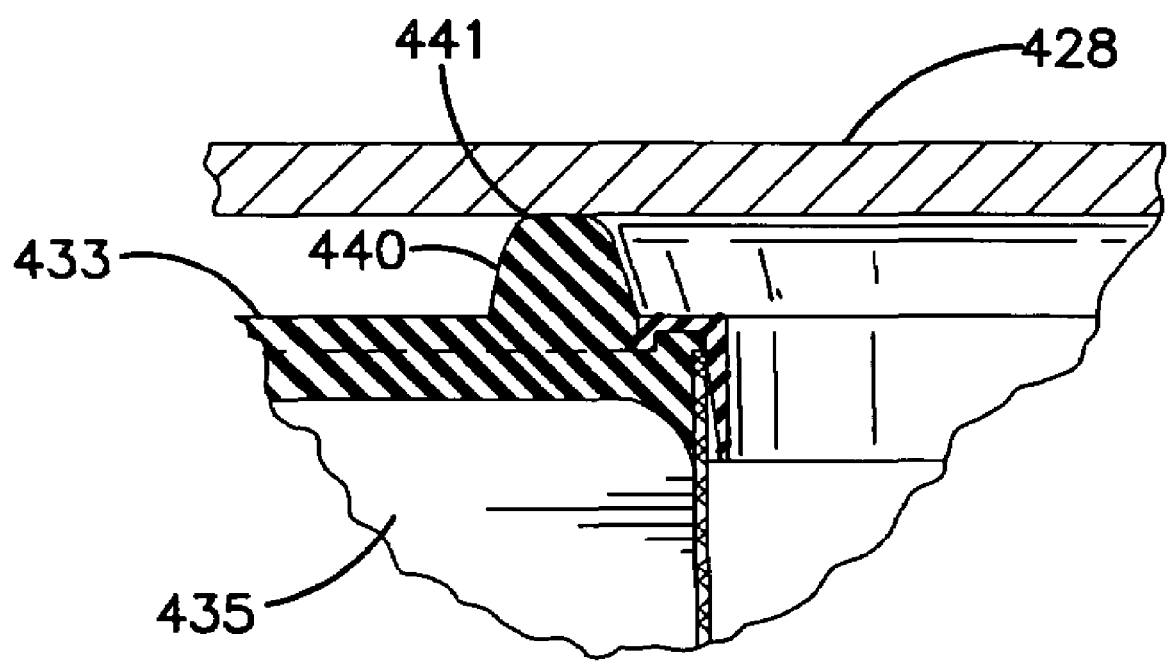
FIG. 31 is an enlarged, schematic, cross-sectional view of the filter element of FIGS. 7 and 8 sealed within the system shown in FIGS. 30 or 31.

FIG. 31 illustrates one example of how the particular filter element 432 depicted seals against the tube sheet 428. In particular, the first end cap 433 includes an axially extending gasket 440. The gasket 440 is compressed against the tube sheet 428 by a yoke assembly, as described in U.S. Pat. No. 5,803,941 to form a seal 441 with the tube sheet 428.

Referring again to FIG. 29, in the arrangement depicted, the filter elements 432 are arranged in pairs, in an end-to-end relationship. Each of the filter elements 432 that is most adjacent to the tube sheet 428 is sealed to the tube sheet 428, while each of the elements 432 that is most adjacent to the stepped panel 429 is sealed to the stepped panel 429 by way of the yoke assembly. Further, each of the filter elements 432 that is adjacent to each other and stacked end-to-end against each other is sealed to the adjacent filter element 432 between the respective end caps.

Figure 30:
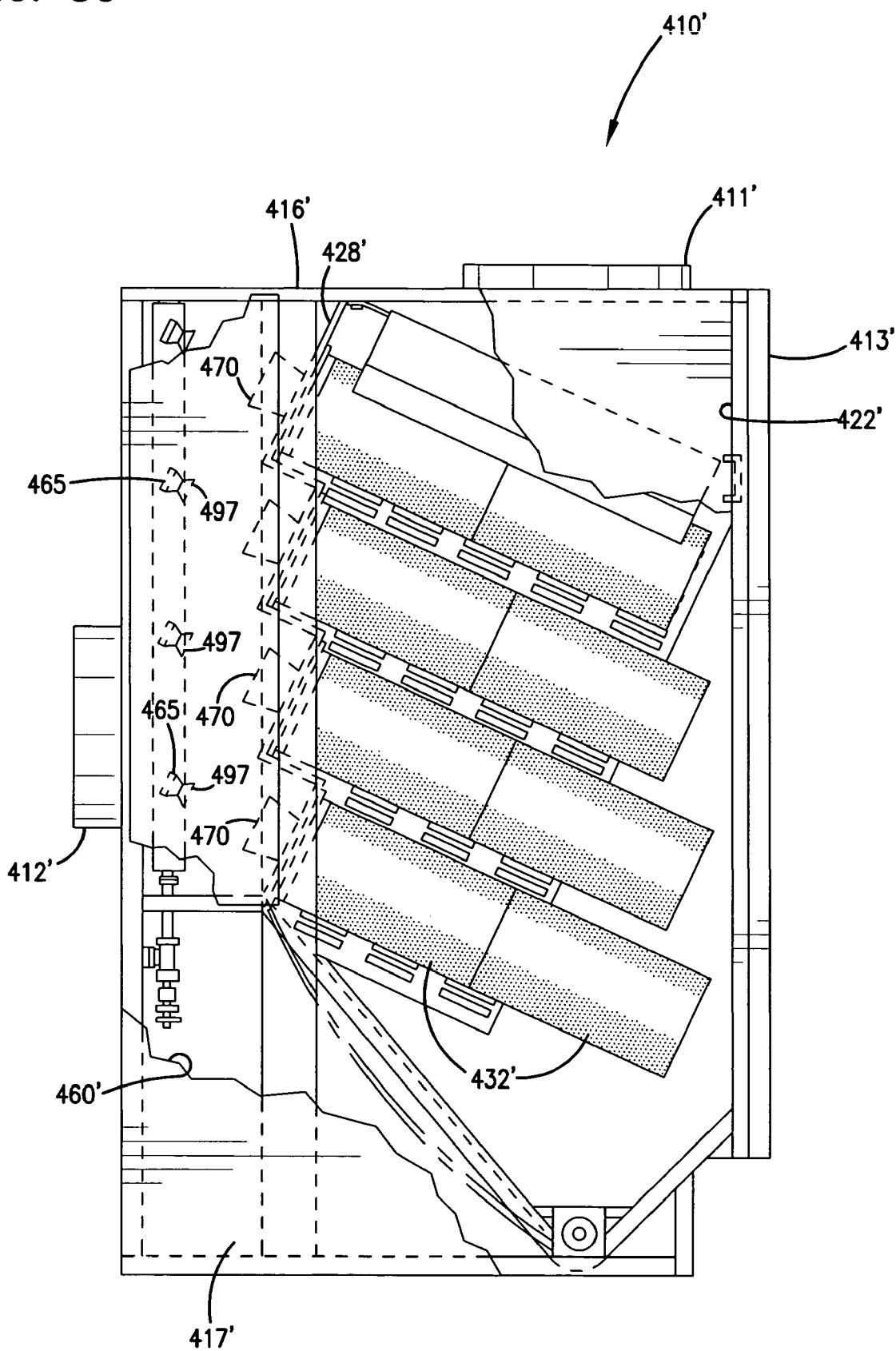
FIG. 30 is a side elevation, partially broken away, view of another embodiment of an air filtration system including filter elements and Venturi elements, according to the present invention.

FIG. 30 illustrates an alternate embodiment of an air filtration system 410'. The arrangement of FIG. 30 includes an inlet 411', an outlet 412', an access door 413', and side panels 416', 417'. Further, there is a dirty air chamber 422', a clean air chamber 460', and a tube sheet 428'. The tube sheet 428' separates the dirty side 422' from the clean air side 460'. Mounted within the air filtration system 410' and against the tube sheet 428' are filter elements 432'. One difference between the system 410' of FIG. 30 and the system 410 of FIG. 29 is the existence of Venturi elements 470, described further below. FIG. 15 illustrates schematically one of the filter elements 432' operably installed within and sealed against the tube sheet 428'. A gasket member 440' on the end cap 433' is compressed against the tube sheet 428' to form a seal 441' with the tube sheet 428'.

A system for cleaning each of the filter elements 432, 432' is also provided in the clean air chamber 460, 460'. In reference to FIG. 30, the system includes a plurality of pulse type valves 465 and nozzles or blow pipes 497. A valve 465 and blow pipe 497 arrangement is positioned directly in-line with an outlet opening 434 (FIG. 15) in the tube sheet structure 428' so as to direct a jet of compressed air into the open interior 438 of a pair of filter elements 432, 432'. The type of pulse type valves (or back pulse valves), blow pipes, piping arrangement to provide pressurized air, and their control and operation are known in the art.

In reference now to FIGS. 32 and 33, each Venturi element 470 depicted includes an inlet bell-mouth-shaped portion (or Venturi inlet portion) 474, and a throat portion 476. In the depicted embodiment, there is also a diffuser portion (or Venturi outlet portion) 472. The throat portion 476 is interposed between and interconnects the diffuser portion 472 and the Venturi inlet portion 474. Air exits the Venturi element 470 through the diffuser 472 into the clean air chamber 460', when air is filtered and passes through the filter element 432' from the dirty air chamber 430' in a normal filtration air flow pattern (i.e., no back-pulsing). The diffuser portion 472 depicted has a diverging (or flaring), essentially straight wall 477 to facilitate pressure recovery during the normal filtration condition. The throat portion 476 may be concave in the direction toward the interior thereof, as disclosed in U.S. Pat. No. 5,562,746; or, in the one depicted in FIG. 15, may be contoured to gradually decrease in diameter from a base line 406 to the outlet portion 472, as described in U.S. Pat. No. 6,090,173.

The Venturi element 470 is positioned on the tube sheet structure 428' in relation to the filter element 432' such that the Venturi inlet portion 474 is disposed in the clean air chamber 460'.

Still in reference to FIG. 32, it can be seen that the Venturi element 470 is secured to the tube sheet 428' by way of a suitable fastener 481 connecting the base line 406 to the tube sheet 428'. Other details of the Venturi element 470 are described in U.S. Pat. Nos. 5,562,746 and 6,090,173, each of which is incorporated herein by reference.

In FIG. 33, the nozzle or blow pipe 497 of the pulse jet system is shown schematically spaced a distance 482 away from the Venturi element 470. As air exits through the blow pipe 497, an asymmetric jet of air is fully turbulent and behaves as a wall-free shear flow. For this type of air flow, the velocity profile spreads out as the jet exits the blow pipes 497 and travels against the incoming air stream as shown at the path 483. Venturi element 470 allows this jet of air from path 83 to enter the interior 438, 438' of filter elements 432, 432' in a manner that results in a uniform distribution of air pressure across the entire length of filter media 435, 435' between end caps 433, 434.

The distance 482 between the blow pipe 497 and the baseline 406 of the Venturi element 470 is typically less than 25 inches, and more than 10 inches. In some arrangements, the distance is about 22–23 inches. In other arrangements, the distance is 20–21 inches, or less. These types of arrangements result in a positive cleaning pressured differential along substantially the entire length of the extension of filter media 435, 435'.

In operation, air or other particulate laden gaseous fluid enters the dirty air chamber 422, 422' through the air inlet 420, 420' and the filtering elements 432, 432'. Particulate matter is removed from the air stream by the filter media 435, 435'. As described below, preferred media formulations are utilized to result in advantageous performance. The cleaned air flows into the open filter interior 438, 438', and into the clean air chamber 460, 460'. If a Venturi element 470 is present, the clean air flows through the Venturi element 470 while exiting the open filter interior 438, 438' and entering the clean air chamber 460, 460'. The cleaned air exits the air cleaner 410, 410' through the outlet 412, 412'.

Figure 34:
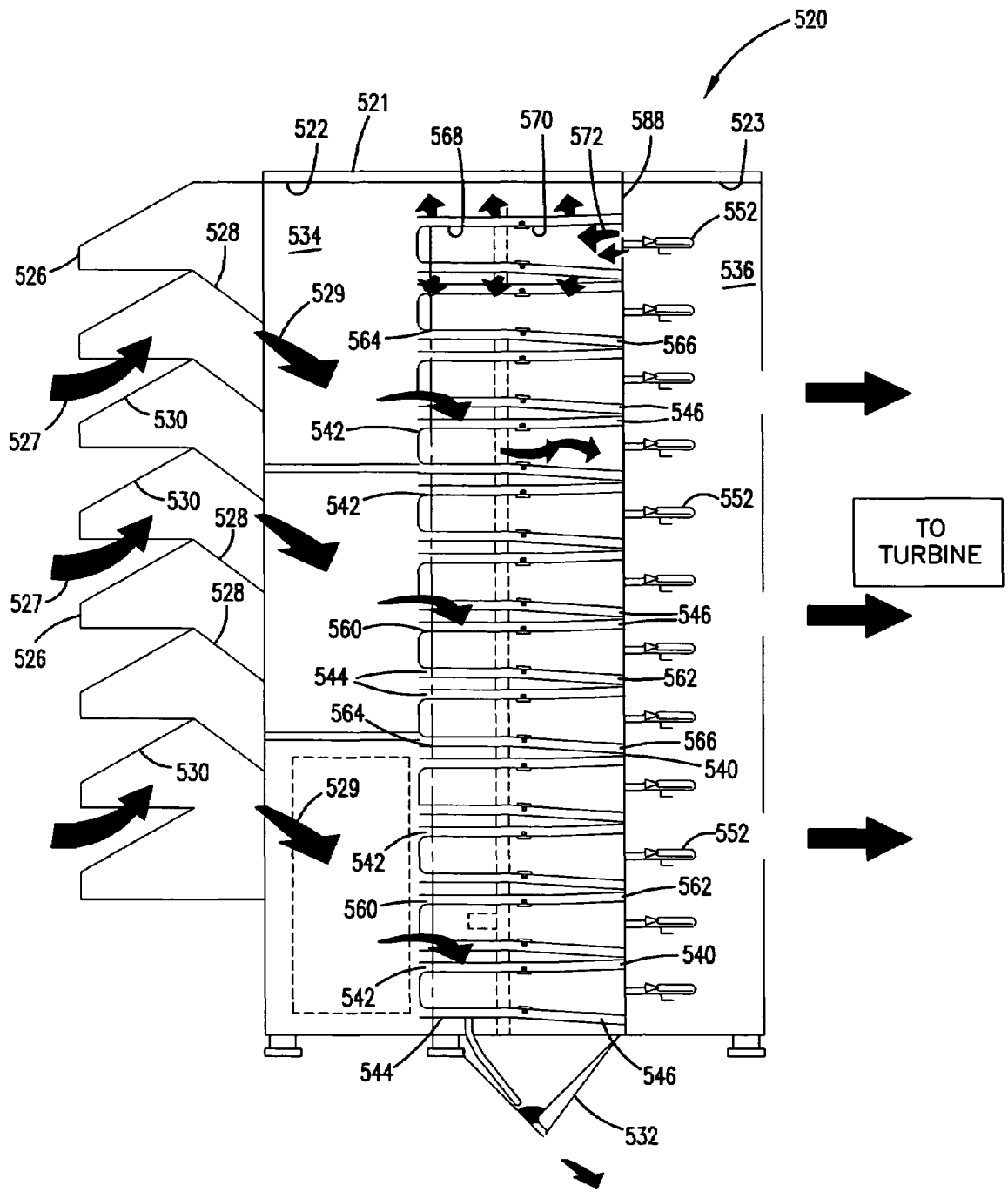
FIG. 34 is a schematic cross-sectional view of a gas turbine air intake filtration system, utilized in the methods of this disclosure.

After an interval of filtering, the filter elements 432, 432' will become coated with dust or other particulate material. Each of the filter elements 432, 432' are pulse jet cleaned by its respective valve 465 and blow pipe 497 that discharges a quantity of pressurized air from the blow pipe 497 toward and into the open filter interior 438, 438'. If a Venturi element 470 is present, the pressurized air is directed into the diffuser portion 472 of the Venturi element 470. The jet stream passes into the open filter interior 438 and passes through the media 435, 435' in a direction opposite to the normal flow of the air stream, when filtering. This jet pulse of air knocks the dust cake and other particulates off of the exterior of the filter media 435, 435', and causes it by gravity to fall into the hopper 14. Single stage, self cleaning air filter systems are known. One such system, commercially available, is the Donaldson GDX™ Pulse Cleaning Filter System available from Donaldson Company, Inc., Minneapolis, Minn. In FIG. 34, a schematic, cross-sectional, depiction of a Donaldson GDX™ Pulse Cleaning Filter System 20 is presented. Other than certain preferred media formulations utilized in the system of FIG. 34, the structure in the system of FIG. 34 is described in U.S. Pat. No. 6,123,751, which is incorporated by reference herein, and which is commercially available from Donaldson.

Referring to FIG. 34, the system 520 includes a chamber 521 having an air inlet side 522 and an air outlet side 523. Air enters the chamber 521 through a plurality of vertically spaced inlet hoods 526 positioned along the air inlet side 522. The inlet hoods 526 function to protect internal filters of the system 520 from the effects of rain, snow and sun. Also, the inlet hoods 526 are configured such that air entering the inlet hoods 526 is first directed in an upward direction indicated by arrow 527, and then deflected by deflector plates 528 in a downward direction indicated by arrow 529. The initial upward movement of air causes some particulate material and moisture from the air stream to settle or accumulate on lower regions 530 of the inlet hoods 526. The subsequent downward movement of air forces dust within the chamber 521 downward toward a dust collection hopper 532 located at the bottom of the chamber 521.

The chamber 521 of the system 520 is divided into upstream and downstream volumes 534 and 536 by a partition 538. The upstream volume 534 generally represents the "dirty air section" of the air cleaner system 520, while the downstream volume generally represents the "clean air section" of the system 520. The partition 538 defines a plurality of apertures 540 for allowing air to flow from the upstream volume 534 to the downstream volume 536. Each aperture 540 is covered by an air filter 542 or filter cartridge located in the upstream volume 534 of the chamber. The filters 542 are arranged and configured such that air flowing from the upstream volume 534 to the downstream volume 536 passes through the filters 542 prior to passing through the apertures 40.

For the particular filter arrangement shown, each air filter 542 includes a pair of filter elements. For example, each air filter 542 includes a cylindrical element 544 and, a somewhat truncated, conical, element 546. Each truncated, conical element 546 includes one end having a major diameter and another end having a minor diameter. The cylindrical element 544 and the truncated, conical element 546 of each filter 542 are co-axially aligned and connected end-to-end with the minor diameter end of each conical element 546 being secured to one of the cylindrical elements 544 in a sealed manner. The major diameter end of each truncated, conical element 546 is secured to the partition 538 such that an annular seal is formed around its corresponding aperture 540. Each filter 542 is generally co-axially aligned with respect to its corresponding aperture 540 and has a longitudinal axis that is generally horizontal.

Each of the filter elements 542, 546 includes a media pack 560, 562 forming a tubular construction 564, 566 and defining an open filter interior 568, 570 within the construction. The open filter interior 568, 570 is also a clean air plenum. Preferably, each media pack 560, 562 is pleated and comprises a composite of a substrate at least partially covered by a layer of fine fibers. Preferred formulations for media composites are described below.

In general, during filtering, air is directed from the upstream volume 534 radially through the air filters 542 into interior volumes 568, 570 (clean air plenums) of the filters 542. After being filtered, the air flows from the interior volumes 548 through the partition 538, via apertures 540, into the downstream clean air volume 536. The clean air is then drawn out from the downstream volume 536, through apertures 550, into a gas turbine intake, not shown.

Each aperture 540 of the partition 538 includes a pulse jet air cleaner 552 mounted in the downstream volume 536. Periodically, the pulse jet air cleaner 552 is operated to direct a pulse jet of air, shown at arrows 572, backwardly through the associated air filter 542, i.e. from the interior volume 568, 570 of the filter element outwardly to shake or otherwise dislodge particular material trapped in or on the filter media of the air filter 542. The pulse jet air cleaners 552 can be sequentially operated from the top to the bottom of the chamber 521 to eventually direct the dust particulate material blown from the filters into the lower hopper 532, for removal.

Arrangements such as those shown in FIG. 34 may be rather large. Filter pairs used in such arrangements commonly include cylindrical filters that are about 26 inches long and about 12.75 inches in diameter, and truncated conical filters that are about 26 inches long, about 12.75 inches in minor diameter, and about 17.5 inches in major diameter. Such arrangements might be used, for example, for filtering intake air to a gas turbine system having an air flow demand on the order of 8000 to 1.2 million cubic feet per minute (cfm).

Figure 35:
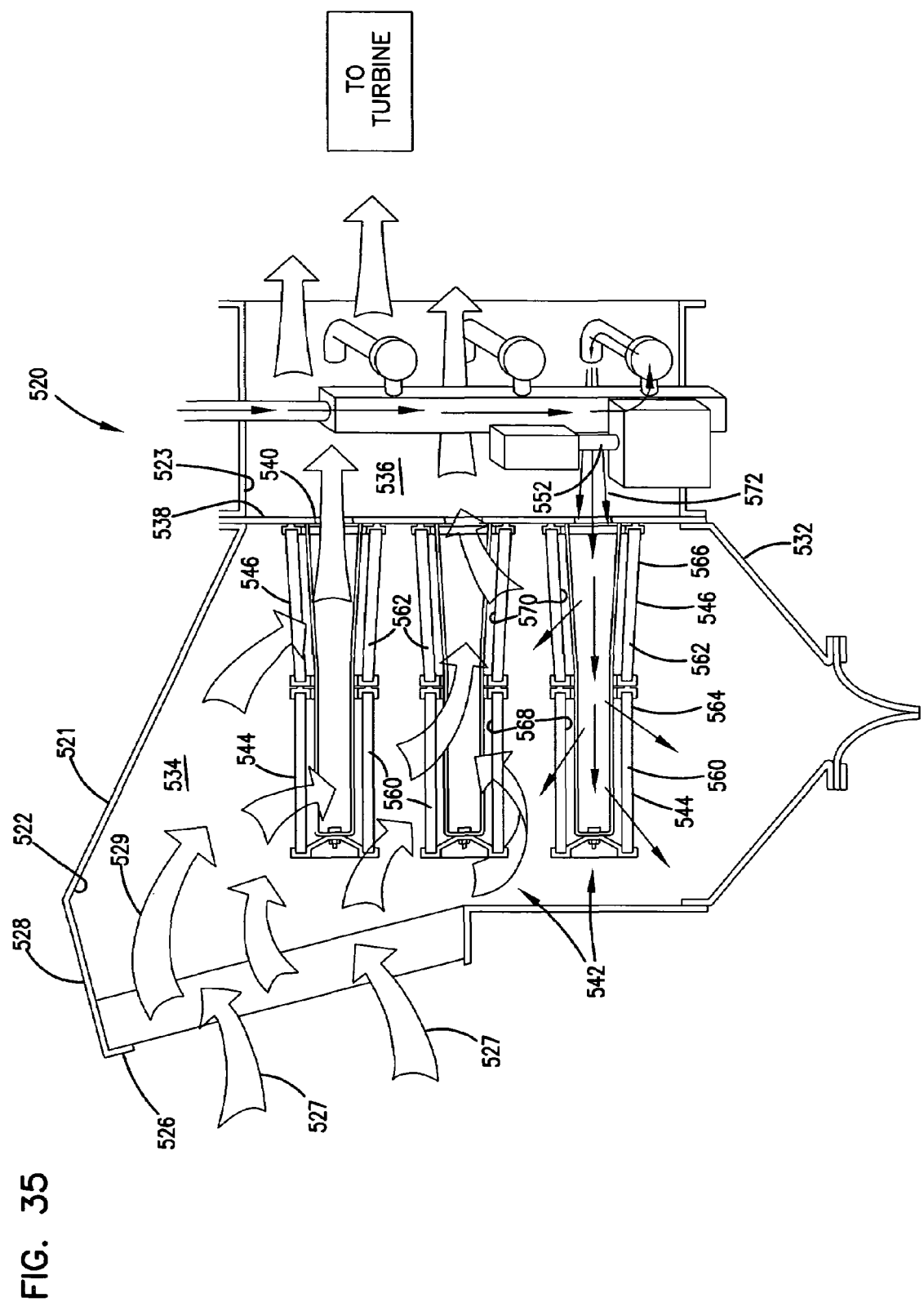
FIG. 35 is a schematic cross-sectional view of another gas turbine intake filtration system, similar to the system of FIG. 29 but smaller, utilized in the methods of this disclosure.

In FIG. 35, another air intake filtration system for a gas turbine is illustrated. Other than preferred media formulations, the system shown in FIG. 35 is commercially available as the Donaldson GDX™ Self-Cleaning Air Filter available from Donaldson Company. In FIG. 35, a schematic, cross-sectional, depiction of a Donaldson GDX™ Self Cleaning Air Filter 520 is presented. The system of FIG. 35 is not prior art, in that it utilizes certain preferred media formulations in its methods for filtering the air intake stream.

The system 520 of FIG. 35 is similar to the system 20 of FIG. 34, except that the system 520 is depicted as a smaller, more compact unit.

In FIG. 35, the system 520 includes a chamber 521 having an air inlet side 522 and an air outlet side 523. Air enters the chamber 521 through an inlet hood 526 positioned along the air inlet side 522. The inlet hood 526 helps to direct air entering the inlet hood 526 in an upward direction indicated by arrow 527, and then deflect by deflector plate 528 in a downward direction indicated by arrow 529. The downward movement of air forces dust within the chamber 21 downward toward a dust collection hopper 532 located at the bottom of the chamber 521.

As with system 10 of FIG. 34, the chamber 521 of the system 520 is divided into upstream and downstream volumes 534 and 536 by a partition 538. The upstream volume 534 represents the "dirty air section" of the air cleaner system 520, while the downstream volume generally represents the "clean air section" of the system 520. The partition 538 defines a plurality of apertures 540 for allowing air to flow from the upstream volume 534 to the downstream volume 536. Each aperture 540 is covered by an air filter 542 or filter cartridge located in the upstream volume 534 of the chamber. The filters 542 are arranged and configured such that air flowing from the upstream volume 534 to the downstream volume 536 passes through the filters 542 prior to passing through the apertures 540.

Each air filter 542 includes a pair of filter elements. For example, each air filter 542 includes a cylindrical element 544 and, a truncated, conical, element 546. Each truncated, conical element 546 includes one end having a major diameter and another end having a minor diameter. The cylindrical element 544 and the truncated, conical element 546 of each filter 542 are co-axially aligned and connected end-to-end with the minor diameter end of each conical element 546 being secured to one of the cylindrical elements 544 in a sealed manner. The major diameter end of each truncated, conical element 546 is secured to the partition 538 such that an annular seal is formed around its corresponding aperture 540. Each filter 542 is generally co-axially aligned with respect to its corresponding aperture 540 and has a longitudinal axis that is generally horizontal.

Each of the filter elements 544, 546 includes a media pack 560, 562 forming a tubular construction 564, 566 and defining an open filter interior 568, 570 within the construction. Preferably, each media pack 560, 562 is pleated and comprises a composite of a substrate at least partially covered by a layer of fine fibers. Preferred formulations for media composites are described below.

In general, during filtering, air is directed from the upstream volume 534 radially through the air filters 542 into interior volumes 568, 570 (clean air plenums) of the filters 542. After being filtered, the air flows from the interior volumes 568, 570 through the partition 538, via apertures 540, into the downstream clean air volume 536. The clean air is then drawn out from the downstream volume 536, through apertures 550, into a gas turbine intake, not shown.

Each aperture 540 of the partition 538 includes a pulse jet air cleaner 552 mounted in the downstream volume 536. Periodically, the pulse jet air cleaner 552 is operated to direct a pulse jet of air backwardly, shown at arrows 572, through the associated air filter 542, i.e. from the interior volume 568, 570 of the filter element outwardly to shake or otherwise dislodge particular material trapped in or on the filter media of the air filter 542. The pulse jet air cleaners 552 can be sequentially operated from the top to the bottom of the chamber 521 to eventually direct the dust particulate material blown from the filters into the lower hopper 532, for removal.

In reference to FIG. 37, a filter element 500 is shown in perspective view. Filter element 500 comprises a cylindrical filter 500 including first and second opposing end caps 501 and 502 with the tubular, preferably cylindrical construction of filter media 504 in pleated form extending therebetween. The media construction defines an open filter interior 505 which can correspond to a clean air conduit or plenum in use, alternatively, can comprise the incident surface of a contaminated air flow. The tubular construction of the corrugated filter media 504 secured or bonded to the end caps 501 and 502 typically with adhesive technology. In the filter structure 500, there is also an inner support tubular liner 503 providing structural integrity to the media 504.

Figure 38:
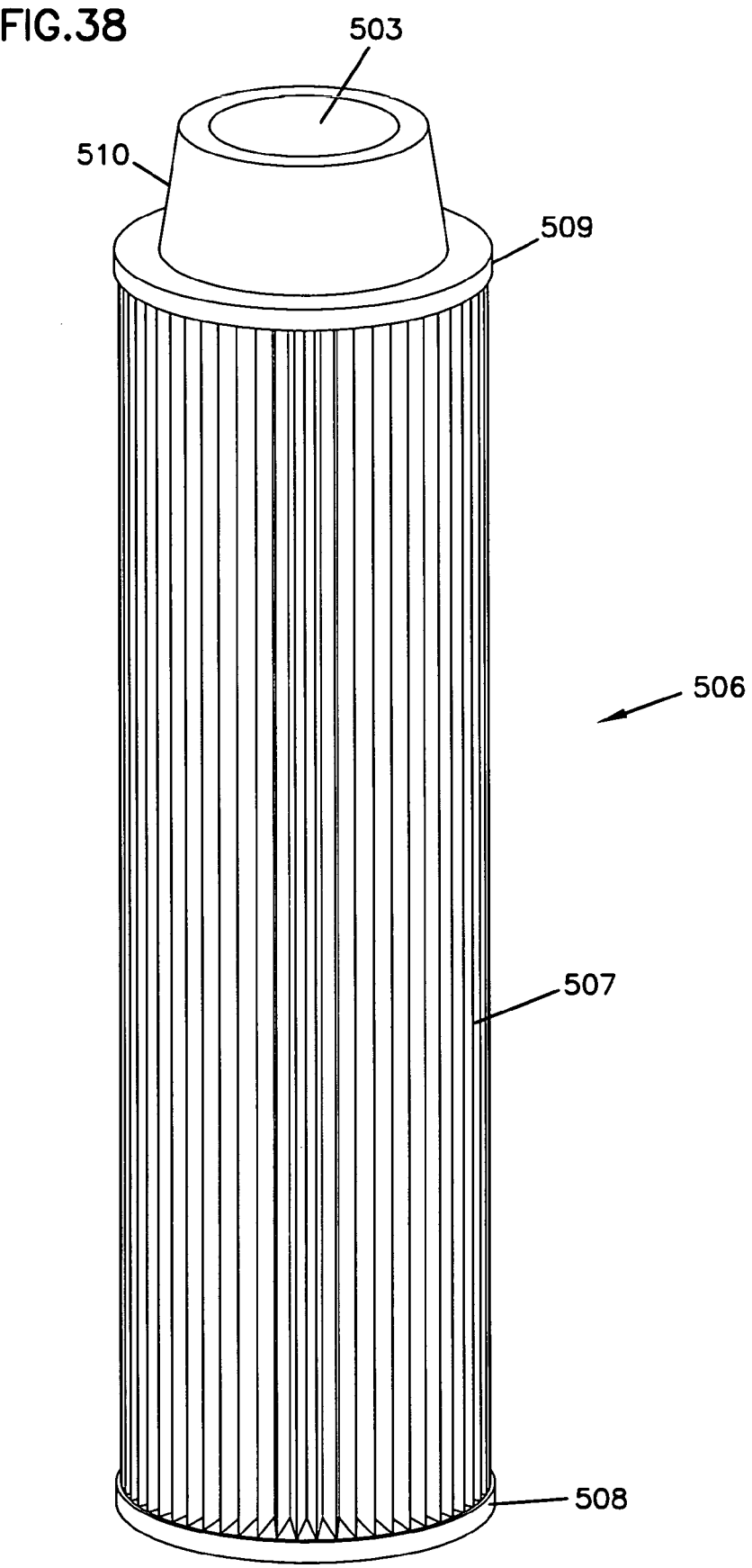

In reference to FIG. 38, one of the filter elements 506 is shown in perspective view. In general, filter element 506 includes a first and second opposing end caps 508 and 509 with the tubular, preferably cylindrical construction of filter media 507 extending therebetween. The media construction defines an open filter interior 505. The tubular construction of corrugated filter media 507 is secured or bonded to end caps 508 and 509, typically using adhesive technology. In filter element 506, there is also a tapered cylindrical seal 510 can be used to install the filter element into a filtration unit using the end seal to couple the filter to an inlet or outlet of a filtration device. The filter element 506 is designed to support the passage of a contaminated air stream from the exterior of media 507 to the interior of 505 of the filter media 506.

In reference to FIG. 39, a flat panel filter element 511 is shown in perspective view. In general, filter element 511 includes a rectangular housing 513 with the pleated media in a rectangular form 514 combined with the housing 513 using typically adhesive technology (not shown) to secure the media within the housing. The pleated media 514 is maintained in a pleated form with spacer means 512 fixing the media into a secure pleated form. Such spacer media 512 can comprise a preformed structure or can comprise an extruded structural thermoplastic spacer material. The flange portion 514 of the housing 513 can aid in installing the filter element 511 into a filtration unit. The filtration element 511 is designed to have the clean air portion exit the pleated media as shown in FIG. 39.

Figure 40:
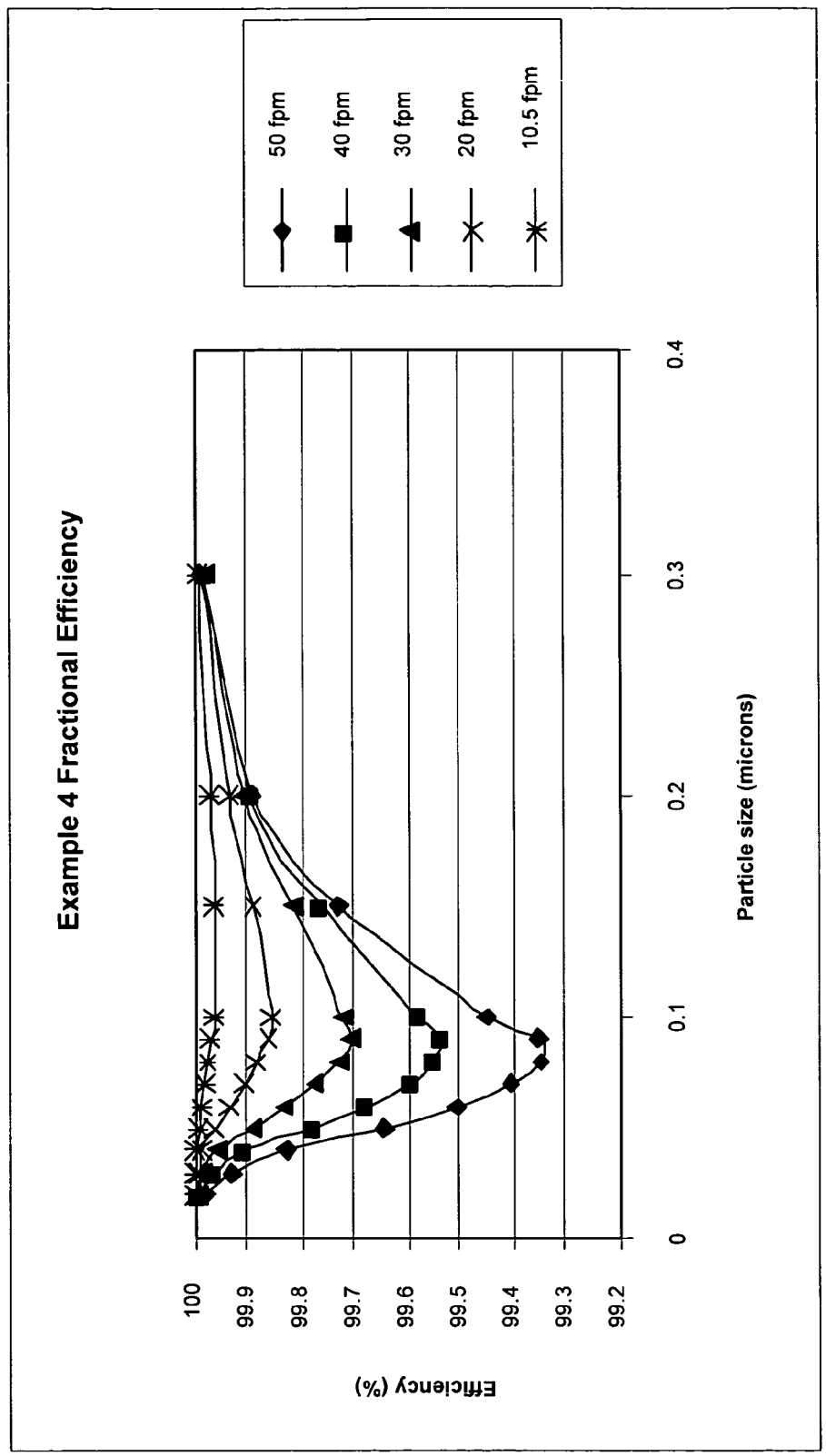

FIG. 40 is a graph of data showing the fractional efficiency of the filter element of Example 4 at air velocities ranging from 10.5 to 50 ft-m$^{-1}$.

Figure 41:
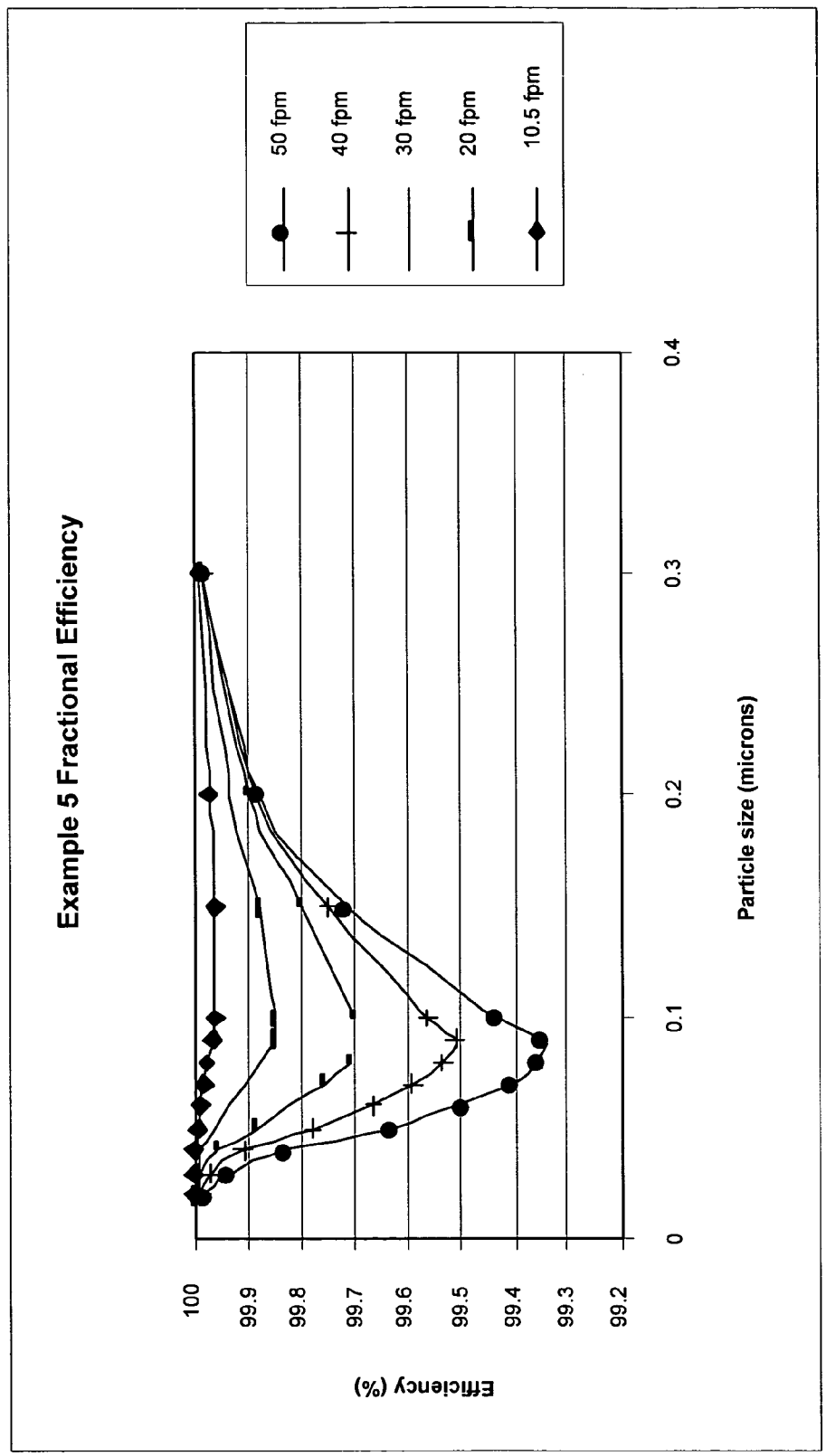
FIGS. 41–46 are graphed data showing various measures of the filtration efficiency of the filter examples 4–8.

FIG. 41 shows similar fractional efficiency for the filter element of Example 5.

Figure 42:
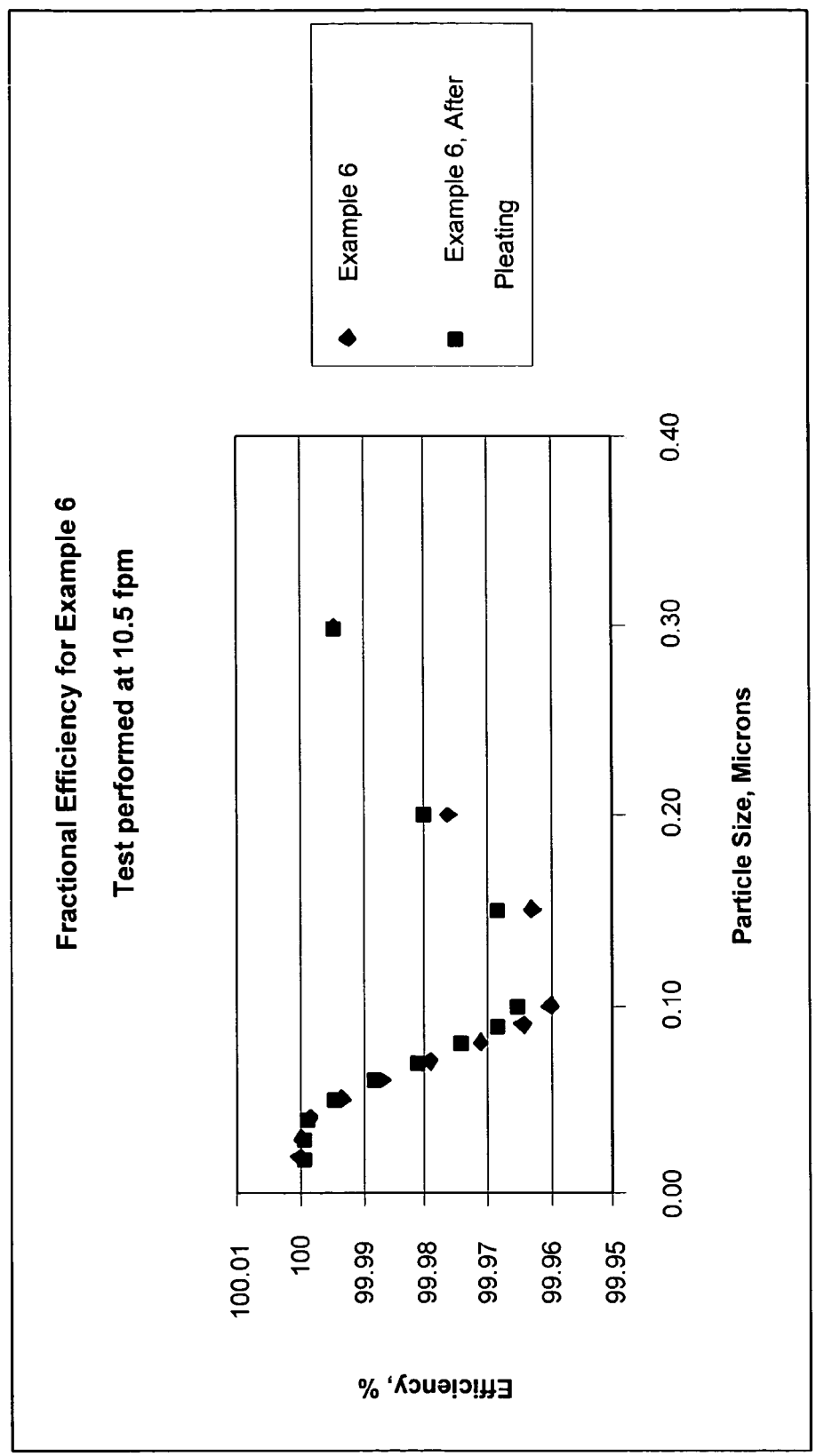

FIG. 42 shows fractional efficiency of the filter element of Example 6 at a single fluid velocity to establish the resistance of the media to failure due to media pleating.

Figure 43:
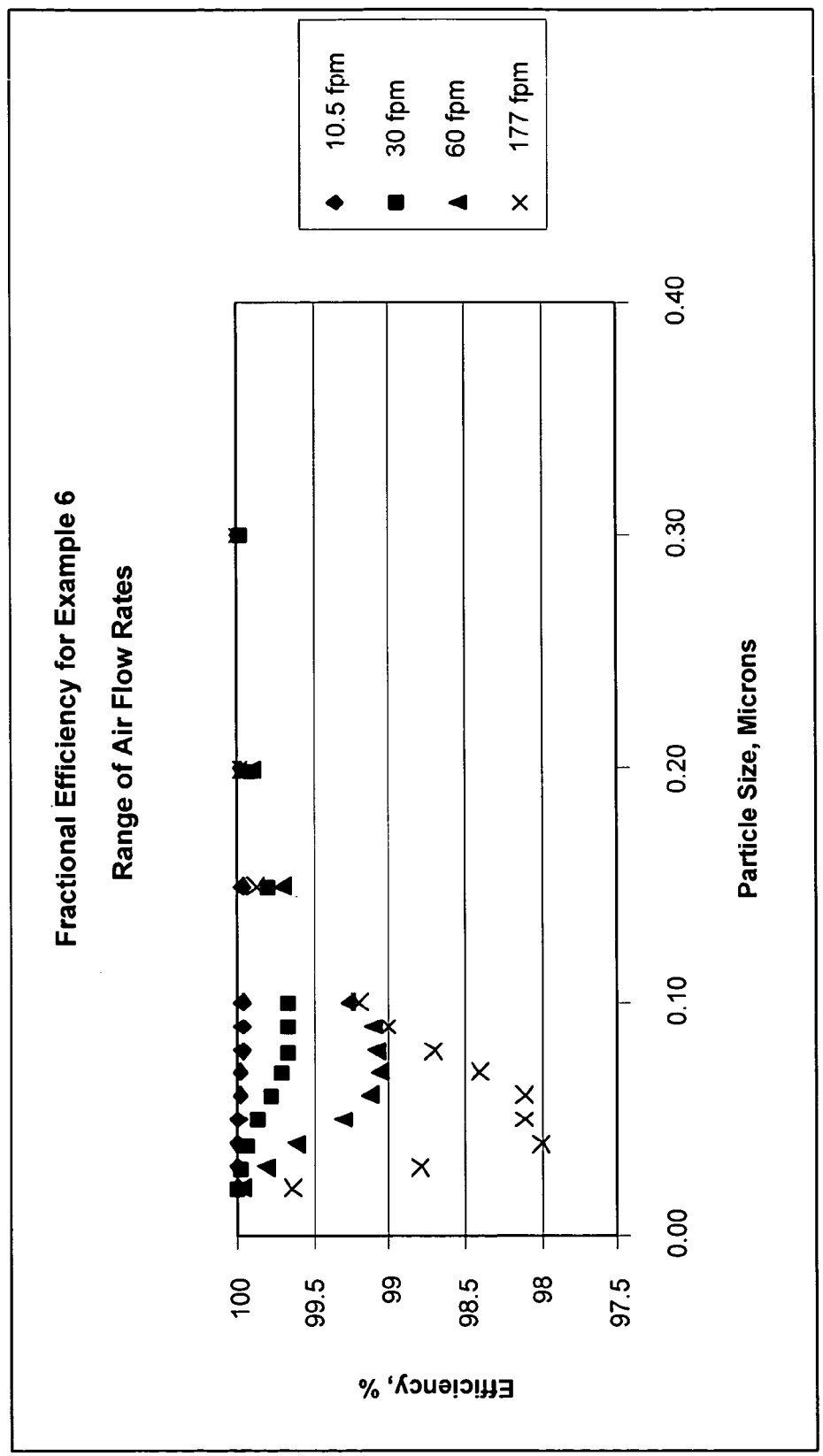

FIG. 43 shows fractional efficiency of the filter element of Example 6 at the stated flow rates.

Figure 44:
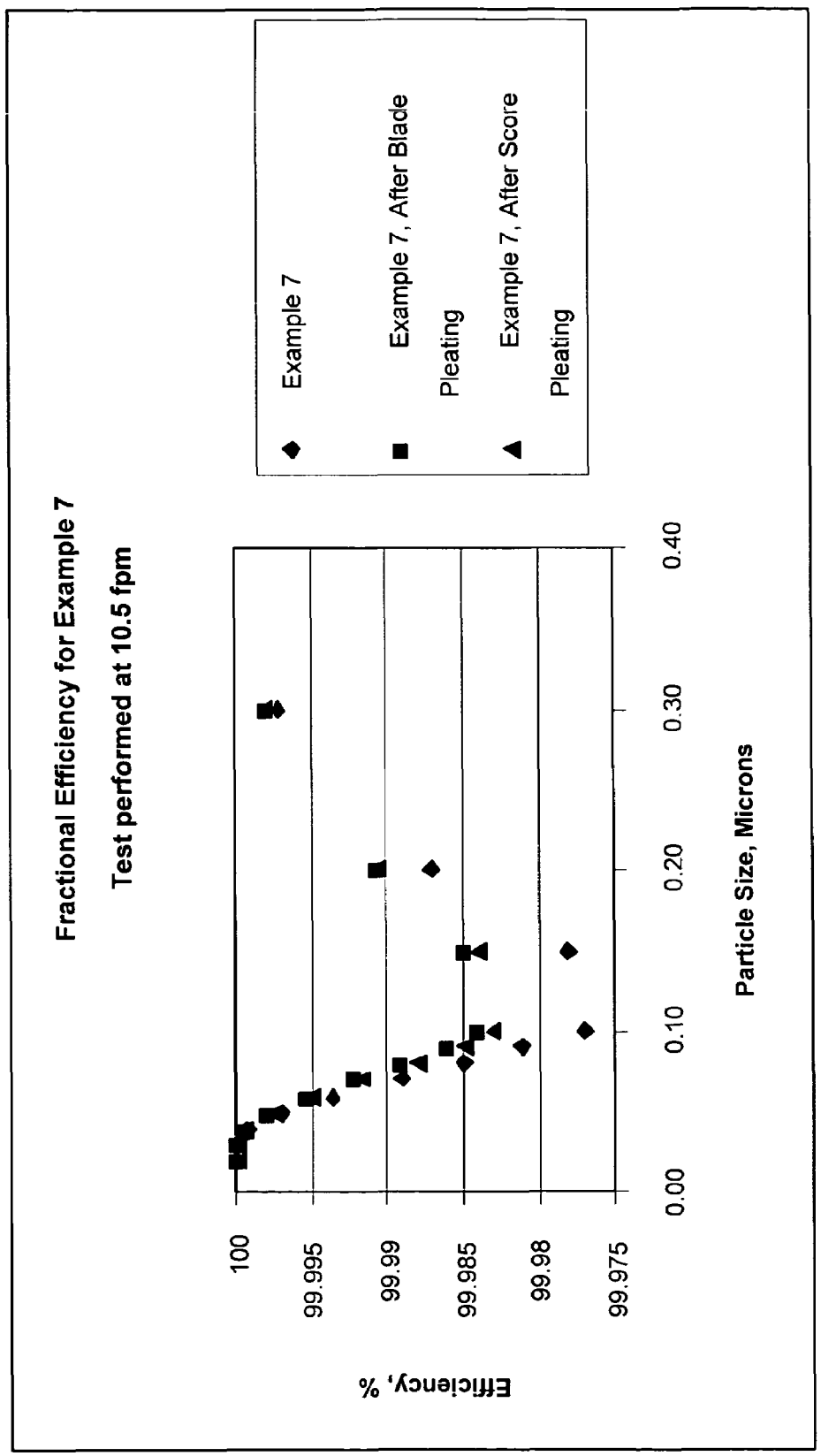

FIG. 44 is a graph of data showing the fractional efficiency for the filter element of Example 7 performed at 10.5 ft-m$^{-1}$ showing the resistance due blade or score pleating.

Figure 45:
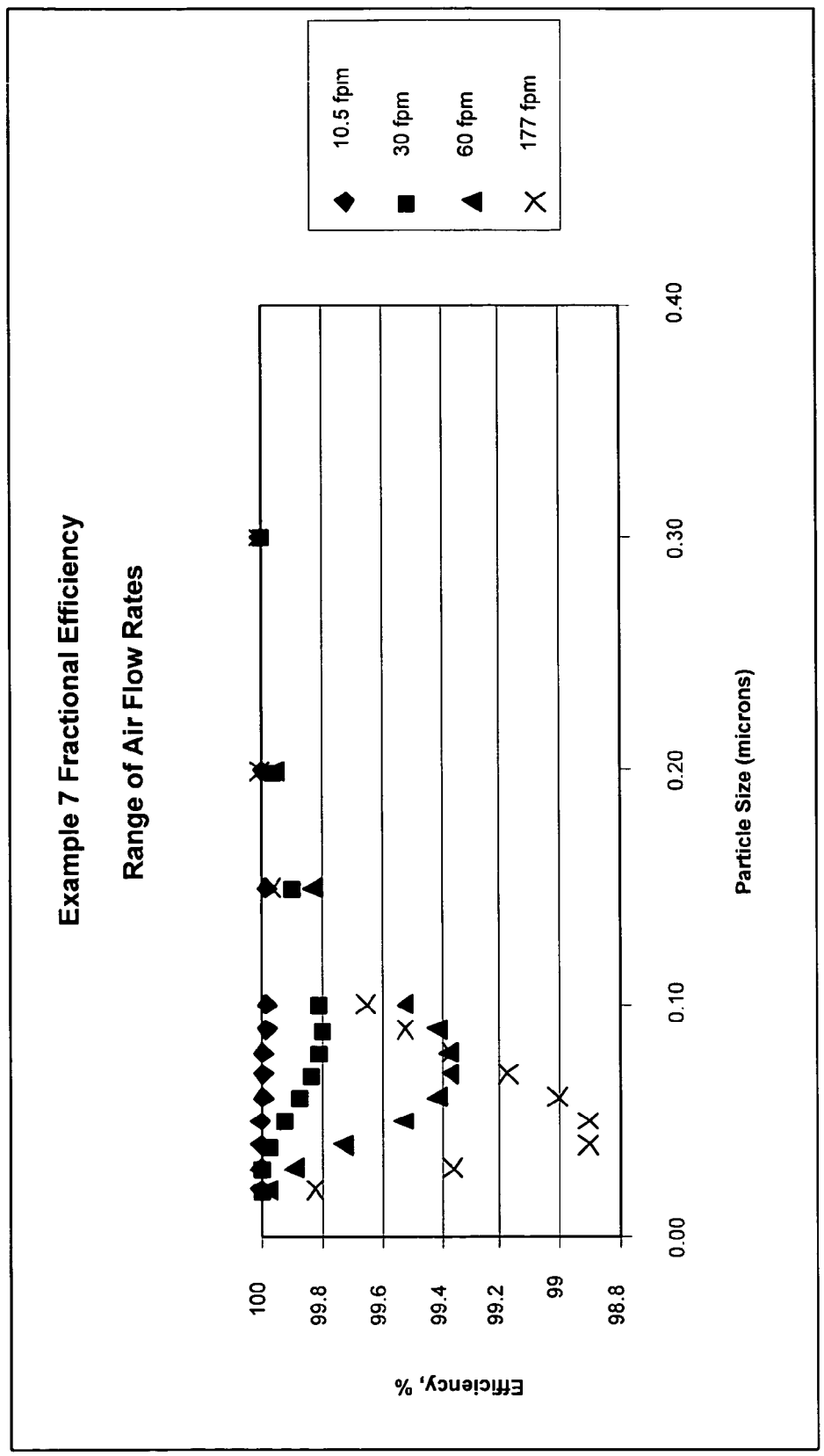

FIG. 45 is a graph of data showing the fractional efficiency for the filter element of Example 7 at the stated range of airflow rates.

Figure 46:
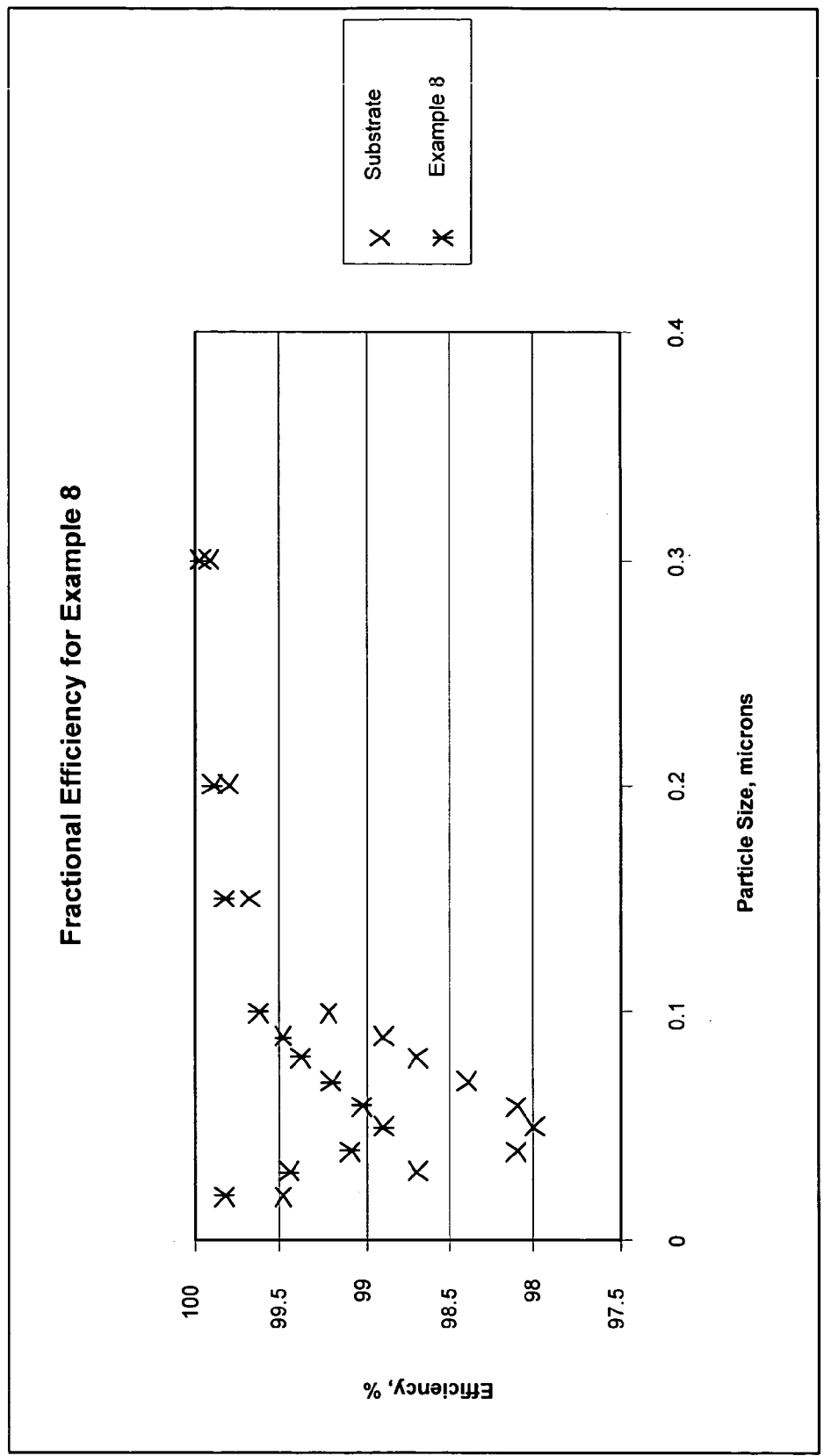

FIG. 46 is a graph of data showing the fractional efficiency for the filter element of Example 8 showing an insubstantial increase in efficiency when the filter element is compared to substrate only in efficiency for the range of particle sizes shown.

EXPERIMENTAL

Flat panel samples of the filters or the invention were made by forming a layer of a non-woven scrim on a layer of HEPA grade fiberglass. Onto the scrim was placed a layer of fine fiber. These filter panels were tested for efficiency and permeability and were compared to the performance of a panel comprising scrim and HEPA fiberglass without fine fiber, and to two filters comprising expanded PTFE.

Example 1

A glass fiber filter medium having a basis weight of 59 lb-3000 ft$^{-2}$ and a thickness of 0.013 inch was combined with two layers of a spun bonded polyester scrim material. One layer of the scrim was laminated to either side of the glass fiber filter medium sheet. The polyester scrim had a thickness of 0.007 inches and a basis weight of 0.5 oz-yd$^{-2}$. The three layer substrate had an air flow resistance of 39 millimeters of water at a flow rate of 10.5 ft-min$^{-1}$ air velocity. The substrate had an efficiency (DOP) of 99.97% at 10.5 ft-min$^{-1}$ air velocity. The substrate material was then combined with an electrospun nanofiber layer. The polyamide nanofiber layer had a 40% efficiency when tested according to ASTM 1215 and had a basis weight of about 0.1 gm-m$^{-2}$.

Example 2

Example 1 was repeated except that the nanofiber layer had a 70% efficiency when tested under ASTM 1215 and had a basis weight of about 0.2 gm-m$^{-2}$.

Example 3

Example 1 was repeated except that the nanofiber layer had a 95% efficiency when tested under ASTM 1215 having a basis weight of about 0.3 gm-m$^2$.

The media described in Examples 1–3 were tested in a flat sheet configuration, in an experiment to test its filtration properties including its pressure drop, dust and dirt loading capacity, and cleaning properties. These parameters were measured by first weighing the flat panel media sample, placing the flat panel media sample into a duct wherein the media is exposed to an air flow of 10 ft-min and a load of ASHRAE dust at a rate of about 1.03 gm-min. The apparatus is run until the pressure drop across the media is 30 inches of water. The media is then removed from the duct and weighed to note dust loading. The media is then clamped into a frame and the frame apparatus was inverted over a dust bin. Some dust fell off immediately, the frame was tapped gently with a screwdriver until dust stopped falling from the media. The media was then reloaded into the apparatus and the experiment was continued until the media had been exposed three times to the flow rate of 10 ft-min and 1.03 gm-min of loading.

TABLE I

Samples Tested (Two of Each)

| Sample Description (all flat sheet) | Efficiency* | Permeability** |
|---|---|---|
| Polyester Scrimmed Fiberglass HEPA No Fine Fiber | 99.982% | 4.4 |
| Scrimmed HEPA + Fine Fiber | 99.988% | 4.3 |

TABLE I-continued

Samples Tested (Two of Each)

| Sample Description (all flat sheet) | Efficiency* | Permeability** |
|---|---|---|
| Example 1 Scrimmed HEPA + Fine Fiber | 99.990% | 4.2 |
| Example 2 Scrimmed HEPA + Fine Fiber | 99.993% | 3.8 |
| Example 3 PTFE A Comparison | 98.354% | 3.6 |
| PTFE B Comparison | 98.243% | 8.2 |

*Efficiency measured with 0.3 micron NaCl particle at 10.5 fpm.
**Permeability is flow through the material, in fpm, at 0.5" w.g. per ASTM D-737.

Example 4

A glass fiber filter medium was laminated to a wet-laid cellulose/synthetic blend media. The properties for the composite are:
Basis weight of 132 lb.-3000 ft.$^{-2}$
Thickness of 0.045 inches
Permeability of 5.1 feet-min$^{-1}$ at 0.5" w.g. (Frazier)
Machine direction—Gurley stiffness of 28,000 mg (1.0"×3.5" sample).
Efficiency: 99.85% on 0.3 micron particles at 10 feet per minute (DOP)

This laminated material was then combined with an electro spun nanofiber layer. The polyamide nanofiber layer had 98% efficiency when tested (ASTM 1215) had a basis weight of about 0.35 grams-meter$^{-2}$. The fractional efficiency of the composite structure was tested, using NaCl as a challenge aerosol and a TSI 8160 tester, through the range of media velocities shown in FIG. 40. In all cases the composite efficiency exceeded 99.97% with 0.3 micron particles.

Example 5

A glass fiber filter medium was laminated to a spunbonded polyester scrim. The properties for the composite are:
Basis weight of 125 lb.-3000 ft.$^{-2}$
Thickness of 0.034 inches
Permeability of 4.9 feet-min$^{-1}$ at 0.5" w.g. (Frazier)
Machine direction Gurley stiffness of 12,867 mg (1.0"×3.5" sample).
Efficiency: 99.97% on 0.3 micron particles at 10 feet per minute (DOP)

This laminated material was then combined with an electrospun nanofiber layer. The polyamide nanofiber layer had a 98% efficiency when tested (ASTM 1215) with a basis weight of about 0.35 grams-meter$^{-2}$. The fractional efficiency of the composite structure was tested, using NaCl as a challenge aerosol and a TSI 8160 tester, through the range of media velocities shown shown in FIG. 41. In all cases the composite efficiency exceeded 99.97% on 0.3 micron particles.

Example 6

A wet-laid cellulose/synthetic scrim material was laminated to one side of a glass fiber filter medium. A lightweight polyester spunbond material was laminated to the other side of the glass fiber filter medium. The laminated structure was combined with a layer of electrospun nanofibers on the wet-laid scrim. The properties for the composite media are:
Basis weight of 99.99 lb.-3000 ft.$^{-2}$
Thickness of 0.032 inches
Permeability of 4.22 feet-min$^{-1}$ at 0.5" w.g. (Frazier)
Gurley stiffness of 1336 mg (1.0"×3.5" sample).
Efficiency: 99.987% on 0.3 micron particles at 10 feet per minute (DOP)

This material was then pleated using a rotary score-style pleater to a pleat height of 0.75". The fractional efficiency of the media was tested before and after pleating using a TSI 8160 tester with NaCl; the results are shown below. In both cases the composite efficiency exceeded 99.99% on 0.3 micron particles. The Example 6 media was also tested for efficiency over a range of air flow velocities. The results are shown shown in FIGS. 42–43. All tests indicate an efficiency exceeding 99.98% on 0.3 micron particles.

Example 7

A wet-laid cellulose/synthetic scrim material was laminated to one side of a glass fiber filter medium. The laminated structure was combined with a layer of electrospun nanofibers on the wet-laid scrim. The properties for the composite media are:
Basis weight of 90.77 lb.-3000 ft.$^{-2}$
Thickness of 0.029 inches
Permeability of 3.88 feet-min$^{-1}$ at 0.5" w.g. (Frazier)
Gurley stiffness of 1336 mg (1.0"×3.5" sample).
Efficiency: 99.995% on 0.3 micron particles at 10 feet per minute (DOP).

This material was then pleated using two different pleating technologies. First, a blade-style pleater was used with a pleat height of 0.5". Second, a rotary score-style pleater was used with a pleat height of 0.75". The fractional efficiency of the media was tested before and after pleating using a TSI 8160 tester with NaCl; the results are shown below. In all cases the composite efficiency exceeded 99.99% on 0.3 micron particles. The media was also tested for efficiency across a range of velocities using the TSI 8160 tester with NaCl; the results are shown shown in FIGS. 44–45. In all cases the composite efficiency exceeded 99.99% on 0.3 micron particles.

Example 8

An electrostatically-charged meltblown material was combined with a wet-laid scrim support. The properties for this substrate material are:

| | |
|---|---|
| Basis Weight: | 128 grams-meter$^{-2}$ |
| Thickness: | 0.031 inches |
| Permeability: | 25.1 feet-min$^{-1}$ at 0.5" w.g. (Frazier) |

The laminated substrate structure was combined with a layer of electrospun nanofibers on the wet-laid scrim side. The nanofiber layer had an efficiency of approximately 70% when tested with 0.8 micron polystyrene latex particles at 20 feet/minute (ASTM 1215). The resulting structure had a permeability of 17.8 feet-min$^{-1}$ at 0.5" w.g. (Frazier). The fractional efficiency of the structure was tested using a TSI 8160 tester and NaCl at 10.5 feet per minute. The results are shown in FIG. 46. Notably, there appear to be no negative effects on the electrostatically-charged substrate material from exposure to the electric field used in the electrospinning process.

FIGS. 1–7 contain the results of the experimental testing. FIG. 1 shows the increase in resistance to air flow for each sample following the three cycles of dust loading and cleaning. Examples 1, 2, and 3 all exhibited modest increases in resistance compared to the PTFE samples and the fiberglass HEPA without a fine fiber layer. The modest increase in airflow resistance for the examples demonstrates an improvement in the cleanability of the materials. Dust loads onto the surface of the fine fiber layer and is easily removed via typical filter cleaning mechanisms.

FIG. 2 shows the increase in weight for each sample following three cycles of dust loading and cleaning. An increase in weight indicates that dust is held in the sample and represents an amount of dust that is unable to be cleaned from the material via typical filter cleaning mechanisms. The example materials and PTFE materials both exhibit modest weight gain compared to the fiberglass HEPA material.

FIG. 3 shows the total weight of ASHRAE dust loaded onto each sample over the 3 cycles of dust loading and cleaning. The life of a filter media amount of dust that can be loaded onto the filter before airflow is reduced to an unacceptable level. FIG. 3 indicates that similar quantities of dust were loaded onto the example materials and PTFE materials during the test. In contrast, the fiberglass HEPA material was not as cleanable and therefore less dust was used throughout the test. The quantities of dust indicated in FIG. 3 resulted in the final clean airflow resistances shown in FIG. 1.

FIGS. 4, 5, and 6 show the loading curves for EX1, fiberglass HEPA, and PTFE samples. Data from these loading curves was used to generate FIGS. 1–3.

FIG. 7 shows the results of a test whereby a flat sheet of example 3 media was compared with the fiberglass HEPA material in a pulse-clean test apparatus. The curves show that the pre- and post-pulse pressure drop of the fiberglass HEPA material is higher, and is increasing faster, than the pre- and post-pulse pressure drop of the Example 3 material. This test provided a constant dust loading at a rate of 10 grains per cubic foot of Atomite dust. Atomite dust is a free-flowing calcium carbonate powder with an irregular shape, manufactured by Imerys (France) and commercially available from a variety of sources including George C. Brandt Co. Atomite dust is composed of particles smaller than 1 micron, 25% by weight; between 1 and 2.5 microns, 25% by weight; between 2.5 and 5 microns, 30% by weight; between 5 and 10 microns, 18% by weight; and between 10 and 15 microns, 2% by weight. The air velocity was set to 9.1 feet per minute for a sample size of 8" diameter. A backward pulse of 40 psi was provided once per minute, for a duration of 100 milliseconds. As pulse-cleaned filters are often changed when they reach a terminal pressure drop, the lower pressure drop of the Example 3 media indicates a better cleanability and longer filter life than the fiberglass HEPA without nanofibers.

FIG. 9 compares the efficiency of the fiberglass HEPA and Example media 3 both before and after pulse testing. This figure shows that the pulsing action did not reduce the efficiency of the media. The result is surprising, as it was thought that the pulse pressure and movement of the media would cause the microfiber glass fibers to separate, perhaps creating voids that ultimately reduce the media efficiency. This was found to be untrue, and HEPA efficiency was maintained for for both the fiberglass HEPA material and the Example Media 3.

TABLE 2

Fractional Efficiency after pulse testing

| Particle Size | Example 3 (post-pulse) | Example 3 (pre-pulse) | Scrimmed HEPA (post-pulse) | Scrimmed HEPA (pre-pulse) |
|---|---|---|---|---|
| 0.02 | 99.9999 | 99.9996 | 99.9996 | 99.9995 |
| 0.03 | 99.9998 | 99.9995 | 99.9998 | 99.999 |
| 0.04 | 99.9997 | 99.999 | 99.9997 | 99.997 |
| 0.05 | 99.998 | 99.993 | 99.999 | 99.985 |
| 0.06 | 99.997 | 99.99 | 99.998 | 99.979 |
| 0.07 | 99.996 | 99.986 | 99.997 | 99.971 |
| 0.08 | 99.994 | 99.982 | 99.997 | 99.964 |
| 0.09 | 99.993 | 99.978 | 99.996 | 99.959 |
| 0.1 | 99.992 | 99.975 | 99.996 | 99.954 |
| 0.2 | 99.995 | 99.982 | 99.998 | 99.966 |
| 0.3 | 99.999 | 99.996 | 99.9993 | 99.982 |

Figure 36:
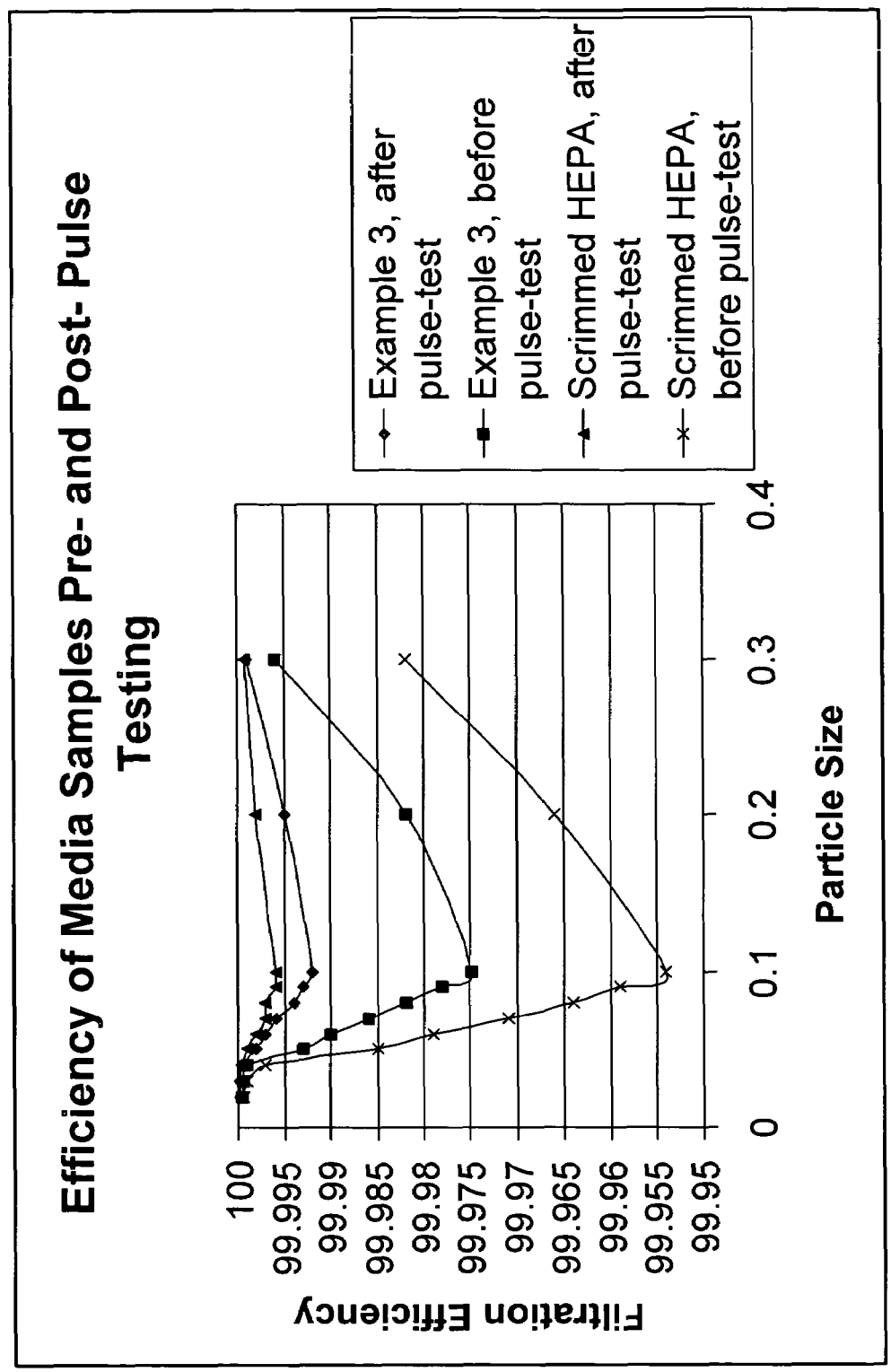
FIG. 36 is a graphed data showing the pre- and post pulse efficiency a cleanable unit of the invention compared to a similar structure without the fine fiber.

FIG. 36 is a graph of data showing the pre- and post pulse efficiency a cleanable unit of the invention compared to a similar structure without the fine fiber. The efficiency performance of the pre pulse materials is comparable but the post pulse efficiency of the materials of the invention is substantially improved over the comparison filter with no fine fiber.

The above discussion, examples, and data illustrate our current understanding of the invention. However, since many variations of the invention can be made without departing form the spirit and scope of the invention, the invention resides wholly in the claims hereinafter appended.

We claim:

1. A filter media comprising a nanofiber layer and a high efficiency substrate layer; the nanofiber layer comprising a polymer material and having a fiber diameter of about 0.01 to 0.5 micron, a basis weight of about $3 \times 10^{-7}$ to $6 \times 10^{-5}$ gm-cm$^{-2}$, an average pore size of about 0.01 to 100 microns and a thickness of about 0.05 to 50 microns; the high efficiency substrate layer comprising a non-woven layer comprising a basis weight of about 0.2 oz-yd$^2$ to 350 lb-3000 ft$^2$, a layer thickness of about 0.001 to 0.2 inch, the overall filter substrate having a permeability of about 1 to 200 ft-min$^{-1}$ at 0.5 inch (water) ΔP, an efficiency in removing a 0.1 micron particle at 10 ft-min$^{-1}$ of about 35 to 99.99995% and an efficiency in removing a 0.76 micron particle at 20 ft-min$^{-1}$ of about 80 to greater than 98%.

2. The media of claim 1 wherein the substrate layer is electrostatically charged.

3. The media of claim 1 wherein the media is pleated and comprises a non-woven comprising spunbond fiber, cellulose fiber, melt blown fiber, glass fiber or blends thereof.

4. The media of claim 1 wherein the media comprises a scrim layer between the nanofiber layer and the substrate layer.

5. The media of claim 1 wherein the polymer comprises an addition polymer.

6. The media of claim 1 comprising a condensation polymer.

7. The media of claim 6 comprising a nylon polymer.

8. The media of claim 5 also comprising a resinous additive comprising an oligomer having a molecular weight of about 500 to 3000 and an aromatic character wherein the additive is miscible in the condensation polymer.

9. The media of claim 8 wherein the additive comprises an oligomer comprising a phenol.

10. The media of claim 6 wherein the polymer comprises the polymeric reaction product of a nylon 6 and a nylon copolymer comprising a cyclic lactam, a $C_{6-10}$ diamine monomer and a $C_{6-10}$ diacid monomer and a resinous additive comprising an oligomer having a molecular weight of about 500 to 3000 and an aromatic character wherein the additive is miscible in the condensation polymer.

11. A media composition of claim 10 wherein the polymeric reaction product comprises nylon 6,6 and the nylon copolymer.

12. A filter cartridge comprising a filter element comprising a nanofiber layer and a high efficiency substrate layer; the nanofiber layer comprising a polymer material and having a fiber diameter of about 0.01 to 0.5 micron, a basis weight of about $3\times10^{-7}$ to $6\times10^{-5}$ gm-cm$^{-2}$, an average pore size of about 0.01 to 100 microns and a thickness of about 0.05 to 50 microns; the high efficiency substrate layer comprising a non-woven layer comprising a basis weight of about 0.2 oz-yd$^{-2}$ to 350 lb-3000 ft$^{-2}$, a layer thickness of about 0.001 to 0.2 inch, the overall filter substrate having a permeability of about 1 to 200 ft-min$^{-1}$ at 0.5 inch (water) ΔP, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%, the cartridge having an overall design flow rate between about 5 and 10000 cubic feet per minute.

13. The cartridge of claim 12 wherein the cartridge comprises a flat panel cartridge.

14. The cartridge of claim 12 wherein the filter element is pleated.

15. The cartridge of claim 14 wherein the pleated filter element has pleats having a depth of about 0.25 to about 4 inches.

16. The cartridge of claim 12 wherein the cartridge comprises a cylindrical cartridge.

17. The cartridge of claim 16 wherein the cylindrical cartridge has a circumference of about 3 to about 50 inches.

18. The cartridge of claim 12 wherein the polymer comprises an addition polymer.

19. The cartridge of claim 12 comprising a condensation polymer.

20. The cartridge of claim 19 comprising a nylon polymer.

21. The cartridge of claim 18 also comprising a resinous additive comprising an oligomer having a molecular weight of about 500 to 3000 and an aromatic character wherein the additive is miscible in the condensation polymer.

22. The cartridge of claim 21 wherein the additive comprises an oligomer comprising a phenol.

23. The cartridge of claim 19 wherein the polymer comprises a polymeric composition of a polymeric reaction product of a nylon 6 and a nylon copolymer comprising a cyclic lactam, a $C_{6-10}$ diamine monomer and a $C_{6-10}$ diacid monomer, and a resinous additive comprising an oligomer having a molecular weight of about 500 to 3000 and an aromatic character wherein the additive is miscible in the condensation polymer.

24. The cartridge of claim 23 wherein the polymeric reaction product comprises nylon 6,6 and the nylon copolymer.

25. A vacuum cleaner comprising a 0.25 to 500 HP motor driving an air stream having a flow rate of 5 to 600 ft-min$^{-1}$ through a filter, the filter comprising a nanofiber layer and a high efficiency substrate layer; the nanofiber layer comprising a polymeric material and having a fiber diameter of 0.01 to 0.5 micron, a basis weight of about $3\times10^{-7}$ to $6\times10^{-5}$ gram-cm$^{-2}$, an average pore size of about 0.01 to 100 microns, and a layer thickness of about 0.05 to 50 microns; the high efficiency substrate layer comprising a non-woven layer comprising a basis weight of about 0.2 oz-yd$^{-2}$ to 350 lb-3000 ft$^{-2}$, a thickness of about 0.001 to 0.2 inch, the overall filter having a permeability of about 1 to 200 ft-min$^{-1}$ at 0.5 inch (water) ΔP, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%.

26. A filter arrangement comprising a media pack having an element comprising first and second opposite flow faces and a plurality of flutes wherein in said media pack;
 (a) each of said flutes have a first end portion adjacent to said first flow face and a second end portion adjacent to said second flow face;
 (b) selected ones of said flutes being open at said first end portion and closed at said second end portion; and selected ones of said flutes being closed at said first end portion and open at said second end portion
 (c) said element comprising a nanofiber layer and a high efficiency substrate layer; the nanofiber layer comprising a polymer material and having a fiber diameter of 0.01 to 0.5 micron, a basis weight of about $3\times10^{-7}$ to $6\times10^{-5}$ gram-cm$^{-2}$, an average pore size of about 0.01 to 10 microns and a thickness of about 0.05 to 50 microns; the high efficiency substrate layer comprising a non-woven layer comprising a basis weight of about 0.2 oz-yd$^{-2}$ to 350 lb-3000 ft$^{-2}$, a layer thickness of about 0.001 to 0.2 inch, the overall filter having a permeability of about 1 to 200 ft-min$^{-1}$ at 0.5 inch (water) ΔP, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%.

27. The filter of claim 26 wherein when tested under conditions of exposure for a test period of 16 hours to test conditions of 140° F. air at a relative humidity of 100%, retains greater than 30% of the fiber changed for filtration purposes.

28. The filter of claim 26 wherein the polymer comprises an addition polymer.

29. The filter of claim 26 comprising a condensation polymer.

30. The filter of claim 29 comprising a nylon polymer.

31. The filter of claim 28 also comprising a resinous additive comprising an oligomer having a molecular weight of about 500 to 3000 and an aromatic character wherein the additive is miscible in the condensation polymer.

32. The filter of claim 31 wherein the additive comprises an oligomer comprising a phenol.

33. A filter according to claim 26 further including:
 (a) a sealing system including a frame construction and a seal member;
  (i) said frame arrangement including an extension projecting axially from one of said first and second flow faces;
   (A) said extension comprises a hoop construction having an outer radial surface;
  (ii) said seal member being supported by said extension of said frame arrangement;
   (A) said seal member comprising a resilient seal; and
   (B) said seal member being oriented against at least said outer radial surface.

34. A filter according to claim 33 wherein:
 (a) said media pack and said frame construction have a circular cross-section.

35. A filter according to claim 33 wherein:
 (a) said media pack and said frame construction have a race track shaped cross-section; and
 (b) said frame construction includes radially supporting cross braces.

36. A filter according to claim 33 further including:
(a) a panel structure; said media pack being mounted within said panel structure.

37. A filter according to claim 33 further including:
(a) a handle projecting from the first face of the media pack said handle being sized to accommodate a human hand.

38. A filter according to claim 33 further including:
(a) a sleeve member secured to and circumscribing said media pack;
   (i) said sleeve member being oriented relative said media pack to extend at least 30% of said axial length of said media pack; and
(b) a seal member pressure flange at least partially circumscribing said media pack.
   (i) said seal member pressure flange extending radially from said sleeve member and fully circumscribing said sleeve member.

39. A method for filtering air, the method comprising;
(a) directing air through a media pack at a rate of 5 to 10,000 cfm, the pack comprising a substrate having first and second opposite flow faces, the element comprising a plurality of flutes wherein in said media pack;
   (i) said flutes have a first end portion adjacent to the first flow face and a second end portion adjacent to the second flow face;
   (ii) selected ones of the flutes being open at the first end portion and closed at the second end portion; and selected ones of the flutes being closed at the first end portion and open at the second end portion;
   (iii) the element comprises a nanofiber layer and a high efficiency substrate layer; the nanofiber layer comprising a polymer material and having a fiber diameter of 0.01 to 0.5 micron, a basis weight of about $3\times10^{-7}$ to $6\times10^{-5}$ gram-cm$^{-2}$, an average pore size of about 0.01 to 100 microns and a layer thickness of about 0.05 to 50 microns; the high efficiency substrate layer comprising a non-woven layer comprising a basis weight of about 0.2 oz-yd$^{-2}$ to 350 lb-3000 ft$^{-2}$, a thickness of about 0.001 to 0.2 inch, the overall filter having a permeability of about 1 to 200 ft-min$^{-1}$ at 0.5 inch (water) $\Delta P$, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%.

40. The method of claim 39 wherein the nanofiber, when tested under conditions of exposure for a period of 16 hours to test conditions of 1400° F. air at a relative humidity of 100%, retains greater than 30% of the fiber unchanged for filtration purposes.

41. A method according to claim 40 wherein the method comprises a step of directing a pulse of air through the media pack to remove particulate collected in the pack.

42. A method according to claim 41 wherein the pulse is directed in a direction opposite to the flow direction of the air in normal operation.

43. A method according to claim 42 wherein the pulse removes greater than 50% of the particulate in the pack.

44. A method according to claim 39 wherein:
(a) the step of directing the air through a media pack includes directing the air into an air intake conduit of an engine rated at an engine intake air flow of about 50 to 500 cfm.

45. A method according to claim 39 wherein:
the step of directing the air through a media pack includes directing the air through a filter element including the media pack and a sealing system; the sealing system comprising a frame arrangement and a seal member;
   (i) the frame arrangement including an extension projecting axially from one of the first and second flow faces;
   (ii) the seal member being supported by the extension of the frame arrangement; and
   (iii) the seal member forming a radial seal between and against the extension and a duct in the engine air intake.

46. A method according to claim 39 wherein:
(a) the step of directing the air through a media pack includes directing the air into an air intake conduit of a gas turbine system.

47. A method according to claim 42 wherein:
(a) the step of directing the air into an air intake conduit of a gas turbine system includes directing the air into the air intake conduit of the gas turbine system including:
   (i) a tube sheet having at least a single through hole;
   (ii) a sleeve member removably and replaceably mounted trough the hole; the media pack being held by the sleeve member;
   (iii) a flange at least partially circumscribing the sleeve member; and
   (iv) a seal member pressed between and against the flange and the tube sheet to form a seal therebetween.

48. A method according to claim 40 wherein:
(a) the step of directing the air through a media pack includes directing the air into an air intake of a fuel cell system including a filter assembly and a downstream fuel cell.

49. A method according to claim 48 wherein:
(a) the step of directing the air through a media pack includes directing the air into the air intake of the fuel cell system including the filter assembly upstream of the fuel cell, the filter assembly including:
   (i) a housing having an inlet and an outlet, the inlet receiving dirty atmospheric air to the filter assembly, and the outlet receiving clean air from the filter assembly;
      (A) the media pack being operably installed in the housing;
   (ii) a sound suppression element within the housing; the sound suppression element construction and arranged to attenuate at least 6 dB; and the fuel cell having an air intake port; the filter assembly constructed and arranged to provide clean air from the outlet of the filter assembly to the intake port of the fuel cell.

50. An air filter assembly comprising:
(a) a housing including an air inlet, an air outlet, a spacer wall separating said housing into a filtering chamber and a clean air chamber; said spacer wall including a first air flow aperture therein;
(b) a first filter construction positioned in air flow communication with said first air flow aperture in said spacer wall; said first filter construction including an extension of a pleated filter media composite defining a filter construction inner clean air chamber;
   (i) said first filter construction being oriented with said filter inner clean air chamber in air flow communication with said spacer wall first air flow aperture;
   (ii) said pleated filter media composite comprising a nanofiber layer and a high efficiency substrate layer; the nanofiber layer comprising a polymer material and having a fiber diameter of 0.01 to 0.5 micron, a basis weight of about $3 \times 10^{-7}$ to $6 \times 10^{31\ 5}$ gram-cm$^{-2}$, an avenge pore size of about 0.01 to 100 microns and a thickness of about 0.05 to 50 microns; the high efficiency substrate layer comprising a non-woven layer comprising a basis weight of about 0.2 oz-yd$^{-2}$ to 350 lb-3000 ft$^{-2}$, a thickness of about 0.001 to 0.2 inch, the overall filter having a permeability of about 1 to 200 ft-min$^{-1}$ at 0.5 inch (water) $\Delta P$, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%; and (c) a cleaning system comprising at least one of a pulse-jet cleaning system oriented to direct a pulse of air through said filter construction into said inner clean air chamber or a vibration cleaning system oriented to vibrate said filter construction inner clean air chamber.

51. The air filter assembly according to claim 50 that after exposure for a test period of 16 hours to test conditions of 140° F. air and a relative humidity of 100% retains greater than 30% of the fiber unchanged for filtration purposes.

52. An air filter assembly according to 50 wherein the polymer comprises a condensation polymer.

53. Au air filter assembly according to claim 50 wherein the polymer comprises an addition polymer.

54. The air filter assembly according to claim 52 wherein the polymer comprises a nylon, other than a copolymer formed from a cyclic lactam and a $C_{6-10}$ diamine monomer or a $C_{6-10}$ diacid monomer, and a resinous additive comprising an oligomer having a molecular weight of about 500 to 3000 and an aromatic character wherein the additive miscible in the condensation polymer.

55. The air filter assembly of claim 52 wherein the condensation polymer comprises a nylon.

56. An air filter assembly according to claim 50 further including:
(a) a first Venturi element mounted in said spacer wall first air flow aperture and positioned to project into said first filter construction inner clean air chamber; and wherein
(i) said pulse-jet cleaning system includes a first blowpipe oriented to direct a pulse of air into said first Venturi element from said clean air chamber and toward said first filter construction.

57. An air filter assembly according to claim 50 wherein:
(a) said first filter construction includes a first end cap having a central aperture; said extension of filter media being embedded within said first end cap.

58. An air filter assembly according to claim 50 wherein:
(a) said first filter construction includes first and second filter elements in axial alignment;
(i) said extension of a pleated filter media composite comprising a first extension of media in said first filter element and a second extension of media in said second filter element.

59. An air filter assembly according to claim 50 wherein;
(a) said spacer wall includes a second air flow aperture therein; and wherein the assembly further includes:
(i) a second filter construction positioned in air flow communication with said second air flow aperture in said spacer wall; said second filter construction including an extension of a pleated filter media composite defining a second filter construction inner clean air chamber;
(A) said second filter construction being oriented with said second filter inner clean air chamber in air flow communication with said spacer wall second air flow aperture; and
(B) said pleated filter media composite of said second filter construction including a substrate at least partially covered by a layer of fine fiber.

60. An air filter assembly according to claim 50 wherein:
(a) said spacer wall includes a second air flow aperture therein; and wherein the assembly further includes:
(i) a second filter construction positioned in air flow communication with said second air flow aperture in said spacer wall; said second filter construction including an extension of a pleated filter media composite defining a second filter construction inner clean air chamber;
(A) said second filter construction being oriented with said second filter inner clean air chamber in air flow communication with said spacer wall second air flow aperture; and
(B) said pleated filter media composite of said second filter construction including a substrate at least partially covered by a layer of fine fiber;
(ii) a second Venturi element mounted in said spacer wall second air flow aperture and positioned to project into said second filter construction inner clean air chamber;
(iii) a second blowpipe oriented to direct a pulse of air into said second Venturi element from said clean air chamber and toward said second filter construction.

61. A method for filtering air, the method comprising;
(a) directing the air through an inlet of a housing and into a filtering chamber; the housing including a spacer wall separating the filtering chamber from a clean air chamber; the spacer wall including a first air flow aperture therein;
(b) after directing the air into the filtering chamber, directing the air through an extension of a pleated filter composite of a first filter construction and into a filter construction inner clean air chamber; the first filter construction being positioned in air flow communication wit the first air flow aperture in the spacer wall; the extension of a pleated filter media composite defining the filter construction inner clean air chamber;
(i) the first filter construction being oriented with the filter inner clean air chamber in air flow communication with the spacer wall first air flow aperture;
(ii) the filter composite comprising a nanofiber layer and a high efficiency substrate layer; the nanofiber layer comprising a polymer material and having a fiber diameter of 0.01 to 0.5 micron, a basis weight of about $3 \times 10^{-7}$ to $6 \times 10^{-5}$ gram-cm$^{-2}$, an avenge pore size of about 0.01 to 100 microns and a thickness of about 0.05 to 50 microns; the high efficiency substrate layer comprising a non-woven layer comprising a basis weight of about 0.2 oz-yd$^{-2}$ to 350 lb-3000 ft$^{-2}$, a layer thickness of about 0.001 to 0.2 inch, the overall filter having a permeability of about 1 to 200 ft-min$^{-1}$ at 0.5 inch (water) $\Delta P$, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%; and
(e) after directing the air through an extension of a pleated filter media composite of a first filter construction and into a filter construction inner clean air chamber, directing the air into the clean air chamber and out of the housing.

62. The method of claim 61 wherein after exposure for a test period of 16 hours to test conditions of 140° F. air and a relative humidity of 100% retains greater than 30% of the nanofiber is unchanged for filtration purposes.

63. A method according to claim 61 further including directing a pulse of air into the filter construction inner clean air chamber to at least partially remove particulates collected on the pleated filter media composite.

64. A method according to claim 63 wherein said step of directing a pulse of air into the filter construction inner clean air chamber to at least partially remove particulates collected on the pleated filter media composite includes directing the pulse of air into a Venturi element mounted to project into the first filter construction inner clean air chamber.

65. A method according to claim 61 wherein said housing spacer wall includes a plurality of extensions of pleated filter media composites of a plurality of filter constructions wherein each of the extensions of a pleated filter media composites define a respective filter construction inner clean air chamber.

66. A method according to claim 61 further including directing a series of pulses of air into each of the filter construction inner clean air chambers to at least partially remove particulates collected on each of the pleated filter media composites.

67. A method according to claim 63 wherein said step of directing a series of pulses of air into each of the filter construction inner clean air chambers to at least partially remove particulates collected on each of the pleated filter media composite includes directing the pulse of air into a plurality of Venturi elements each mounted to project into a respective filter construction inner clean air chamber.

68. A method according to claim 61 further Including vibrating the media to at least partially remove particulates collected on the pleated filter media composite.

69. A filter structure for filtering air in a gas turbine intake system, the intake air having an ambient temperature and a humidity of at least 50% RH, the structure comprising, in an air intake of a gas turbine system, at least one filter element, the filter element having a media pack forming a tubular construction and construction defining an open filter interior, the open filter interior being a clean air plenum, the media pack including a pleated construction of a media composites the media composite including a nanofiber layer and a high efficiency substrate layer; the nanofiber layer comprising a polymer material and having a fiber diameter of 0.01 to 0.5 micron, a basis weight of about $3 \times 10^{-7}$ to $6 \times 10^{-1}$ gram-$cm^{-2}$, an average pore size of about 0.01 to 100 microns and a thickness of about 0.05 to 50 microns; the high efficiency substrate layer comprising a non-woven layer comprising a basis weight of about 0.2 oz-$yd^{-2}$ to 350 lb-3000 $ft^{-2}$, a layer thickness of about 0.001 to 0.2 inch, the overall filter having a permeability of about 1 to 200 ft-$min^{-1}$ at 0.5 inch (water) $\Delta P$, an efficiency in removing a 0.1 micron particle at 10 ft-$min^{-1}$ of about 35 to 99,99995% and an efficiency in removing a 0.76 micron particle at 20 ft-$min^{-1}$ of about 80 to greater than 98%.

70. The structure of claim 69 wherein the fine fibers comprise a polymeric composition comprising an addition polymer or a condensation polymer.

71. The structure of claim 69 wherein the substrate comprises a cellulosic fiber, a synthetic fiber or mixtures thereof.

72. The structure of claim 70 wherein the condensation polymer comprises additive comprising an oligomer having a molecular weight of about 500 to 3000 and an aromatic character free of an alkyl moiety wherein the additive is miscible in the condensation polymer.

73. The structure of claim 70 wherein the condensation polymer comprises a nylon homopolymer, a nylon copolymer or mixtures thereof.

74. A method for filtering air in a gas turbine intake system, the turbine operating at a temperature of about 120° F. to about 220° F., the intake air having an ambient temperature and a humidity of at least 50% RH, the method comprising the steps of:
(a) installing a filter proximate an air intake of a gas turbine system, the filter comprising at least one filter element, the filter element having a media pack forming a tubular construction defining a open filter interior; the open filter interior being a clean air plenum, the media pack including a pleated construction of a media composite, the media composite, comprising a nanofiber layer and a high efficiency substrate layer; the nanofiber layer comprising a polymer material and having a fiber diameter of 0.01 to 0.5 micron, a basis weight of about $3 \times 10^{-7}$ to $6 \times 10^{-5}$ gram-$cm^{-2}$, an average pore size of about 0.01 to 100 microns and a thickness of about 0.05 to 50 microns; the high efficiency substrate layer comprising a non-woven layer comprising a basis weight of about 0.2 oz-$yd^{-2}$ to 350 lb-3000 $ft^{-2}$, a thickness of about 0.001 to 0.2 inch, the overall filter having a permeability of about 1 to 200 ft-$min^{-1}$ at 0.5 inch (water) $\Delta P$, an efficiency in removing a 0.1 micron particle at 10 ft-$min^{-1}$ of about 35 to 99,99995% and an efficiency in removing a 0.76 micron particle at 20 ft-$min^{-1}$ of about 80 to greater than 98%; and
(b) directing intake air into an air intake of a gas turbine system.

75. The method of claim 74 wherein the fine fibers comprise an addition polymer or a condensation polymer.

76. The method of claim 74 wherein the fine fiber comprises a condensation polymer and additive comprising an oligomer having a molecular weight of about 500 to 3000 and an aromatic character free of an alkyl phenolic moiety wherein the additive is miscible in the condensation polymer.

77. The method of claim 75 wherein the condensation polymer comprises a nylon polymer.

78. The method according to claim 75 wherein, said step of directing air into an air intake of a gas turbine system having at least one filter element includes directing air into an air intake of a gas turbine system having a plurality of filter element pairs, each of the filter element pairs including a first tubular filter element with the media pack sealed against an end of a second tubular filter element with the media pack; each of the first and second tubular filter elements defining the clean air plenum.

79. A method according to claim 74 wherein said step of directing air into an air intake of a gas turbine system having a plurality of filter element pairs includes directing air into the first tubular filter element and the second tubular filter element; wherein the first tubular filter element is cylindrical and the second tubular filter element is conical.

80. A method according to claim 74 further including directing a pulse of air into each of the clean air plenums of each of the filter element pairs to at least partially remove particulates collected on each of the media packs.

81. A method for filtering air in a gas turbine intake system, an intake air having an ambient temperature and a humidity of at least 50% RH,
(a) directing intake air into an air intake of a gas turbine system having at least one filter element, the filter element having a media pack forming a tubular construction and construction defining a open filter interior; the open filter interior being a clean air plenum, the media pack including a pleated construction of a media composite, the media composite including a substrate at least partially covered by a layer of fine fibers, comprising a nanofiber layer and a high efficiency substrate layer; the nanofiber layer comprising a polymer material and having a fiber diameter of 0.01 to 0.5 micron, a basis weight of about $3\times10^{-7}$ to $6\times10^{-5}$ gram-cm$^{-2}$, an average pore size of about 0.01 to 100 microns and a layer thickness of about 0.05 to 50 microns; the high efficiency substrate layer comprising a non-woven layer comprising a basis weight of about 0.2 oz-yd$^{-2}$ to 350 lb-3000 ft$^{-2}$, a layer thickness of about 0.001 to 0.2 inch, the overall filter having a permeability of about 1 to 200 ft-min$^{-1}$ at 0.5 inch (water) $\Delta P$, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%; and (b) directing the air through the media pack of the filter element and into the open filter interior to clean the air.

82. The method of claim 81 wherein the fine fibers comprising an additive polymer or a condensation polymer.

83. The method of claim 82 wherein the condensation polymer comprises a nylon.

84. The method according to claim 81 wherein, said step of directing air into an air intake of a gas turbine system having at least one filter element includes directing air into an air intake of a gas turbine system having a plurality of filter element pairs, each of the filter element pairs including a first tubular filter element with the media pack sealed against an end of a second tubular filter element with the media pack; each of the first and second tubular filter elements defining the clean air plenum.

85. A method according to claim 81 wherein said step of directing air into an air intake of a gas turbine system having a plurality of filter element pairs includes directing air into the first tubular filter element and the second tubular filter element; wherein the first tubular filter element is cylindrical and the second tubular filter element is conical.

86. A method according to claim 81 further including directing a pulse of air into each of the clean air plenums of each of the filter element pairs to at least partially remove particulates collected on each of the media packs.

87. A filtration system for an enclosed locus of human habitation, the system comprising a filter cartridge comprising a filter element comprising a nanofiber layer and a high efficiency substrate layer; the nanofiber layer comprising a polymer material and having a fiber diameter of about 0.01 to 0.5 micron, a basis weight of about $3\times10^{-7}$ to $6\times10^{-5}$ gm-cm$^{-2}$, an average pore size of about 0.01 to 100 microns and a thickness of about 0.05 to 50 microns; the high efficiency substrate layer comprising a non-woven layer comprising a basis weight of about 0.2 oz-yd$^{-2}$ to 350 lb-3000 ft$^{-2}$ a layer thickness of about 0.001 to 0.2 inch, the overall filter substrate having a permeability of about 1 to 200 ft-min$^{-1}$ at 0.5 inch (water) $\Delta P$, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%, the cartridge having an overall design flow rate between about 5 and 10000 cubic feet per minute.

88. The system of claim 87 wherein the cartridge comprises a flat panel cartridge.

89. The system of claim 87 wherein the filter media is pleated.

90. The system of claim 89 wherein the pleated filter media has pleats having a depth of about 0.25 to about 4 inches.

91. The system of claim 87 wherein the cartridge comprises a cylindrical cartridge.

92. The system of claim 91 wherein the cylindrical cartridge has a circumference of about 3 to about 90 inches.

93. The system of claim 87 wherein the system is in a military structure.

94. A filtration system for an enclosed portion of a human transportation conveyance, the system comprising a filter cartridge comprising a filter element comprising a nanofiber layer and a high efficiency substrate layer; the nanofiber layer comprising a polymer material and having a fiber diameter of about 0.01 to 0.5 micron, a basis weight of about $3\times10^{-7}$ to $6\times10^{-5}$ gm-cm$^{-2}$, an average pore size of about 0.01 to 100 microns and a thickness of about 0.05 to 50 microns; the high efficiency substrate layer comprising a non-woven layer comprising a basis weight of about 0.2 oz-yd$^{-2}$ to 350 lb-3000 ft$^{-2}$, a layer thickness of about 0.001 to 0.2 inch, the overall filter substrate having a permeability of about 1 to 200 ft-min$^{-1}$ at 0.5 inch (water) $\Delta P$, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%, the cartridge having an overall design flow rate between about 5 and 10000 cubic feet per minute.

95. The system of claim 94 wherein the cartridge comprises a flat panel cartridge.

96. The system of claim 94 wherein the filter media is pleated.

97. The system of claim 96 wherein the pleated filter media has pleats having a depth of about 0.25 to about 4 inches.

98. The system of claim 94 wherein the cartridge comprises a cylindrical cartridge.

99. The system of claim 98 wherein the cylindrical cartridge has a circumference of about 3 to about 90 inches.

100. The system of claim 94 wherein the system is in a military vehicle.

101. The system of claim 100 wherein the vehicle is a tank, an armored personnel carrier, a truck, an ambulance, a self-propelled howitzer, a self-propelled missile launcher, an aircraft, a ship, or a High Mobility Multipurpose Wheeled Vehicle (HMMWV).

102. The system of claim 94 wherein the vehicle is an aircraft.

103. A filtration system for a personal respirator, the system comprising a mask enclosing at least the mouth and nose, the mask comprising at least one air intake the intake, the intake comprising a filter cartridge comprising a filter element comprising a nanofiber layer and a high efficiency substrate layer; the nanofiber layer comprising a polymer material and having a fiber diameter of about 0.01 to 0.5 micron, a basis weight of about $3\times10^{-7}$ to $6\times10^{-5}$ $gm\text{-}cm^{-2}$, an average pore size of about 0.01 to 100 microns and a thickness of about 0.05 to 50 microns; the high efficiency substrate layer comprising a non-woven layer comprising a basis weight of about 0.2 oz-yd$^{-2}$ to 350 lb-3000 ft$^{-2}$, a layer thickness of about 0.001 to 0.2 inch, the overall filter substrate having a permeability of about 1 to 200 ft-min$^{-1}$ at 0.5 inch (water) $\Delta P$, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%, the cartridge having an overall design flow rate between about 0.2 and 3 cubic feet per minute.

104. The system of claim 103 wherein the cartridge comprises a flat panel cartridge.

105. The system of claim 103 wherein the filter media is pleated.

106. The system of claim 105 wherein the pleated filter media has pleats having a depth of about 0.125 to about 2 inches.

107. The system of claim 108 wherein the system is in a military mask.

108. A filtration system for a liquid having entrained particulate loading, the system comprising a conduit for a stream of the liquid and placed across the strem a filter cartridge comprising a filter element comprising a nanofiber layer and a high efficiency substrate layer; the nanofiber layer comprising a polymer material and having a fiber diameter of about 0.01 to 0.5 micron, a basis weight of about $3\times10^{-7}$ to $6\times10^{-5}$ gm-cm$^{-2}$, an average pore size of about 0.01 to 100 microns and a thickness of about 0.05 to 50 microns; the high efficiency substrate layer comprising a non-woven layer comprising a basis weight of about 0.2 oz-yd$^{-2}$ to 350 lb-3000 ft$^{-2}$, a layer thickness of about 0.001 to 0.2 inch, the overall filter substrate having a permeability of about 1 to 200 ft-min$^{-1}$ at 0.5 inch (water) $\Delta$P, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%, the cartridge having an overall design flow rate between about 5 and 10000 cubic feet per minute.

109. The system of claim 108 wherein the cartridge comprises a flat panel cartridge.

110. The system of claim 108 wherein the filter media is pleated.

111. The system of claim 110 wherein the pleated filter media has pleats having a depth of about 0.25 to about 4 inches.

112. The system of claim 108 wherein the cartridge comprises a cylindrical cartridge.

113. The system of claim 112 wherein the cylindrical cartridge has a circumference of about 3 to about 30 inches.

114. A filtration system for a liquid having entrained particulate loading, the system comprising a stream of the liquid having a crossflow path across filter surface, the filter comprising a filter element comprising a nanofiber layer and a high efficiency substrate layer; the nanofiber layer comprising a polymer material and having a fiber diameter of about 0.01 to 0.5 micron, a basis weight of about $3\times10^{-7}$ to $6\times10^{-5}$ gm-cm$^{-2}$, an average pore size of about 0.01 to 100 microns and a thickness of about 0.05 to 50 microns; the high efficiency substrate layer comprising a non-woven layer comprising a basis weight of about 0.2 oz-yd$^{-2}$ to 350 lb-3000 ft$^{-2}$ a layer thickness of about 0.001 to 0.2 inch, the overall filter substrate having a permeability of about 1 to 200 ft-min$^{-1}$ at 0.5 inch (water) $\Delta$P, an efficiency in removing a 0.1 micron particle at 10 ft-min$^{-1}$ of about 35 to 99,99995% and an efficiency in removing a 0.76 micron particle at 20 ft-min$^{-1}$ of about 80 to greater than 98%, the cartridge having an overall design flow rate between about 5 and 10000 cubic feet per minute; the filter passing a portion of the fluid and retaining the particulate.

115. The system of claim 114 wherein the cartridge comprises a flat panel cartridge.

116. The system of claim 114 wherein the particulate is recovered.

117. The system of claim 114 wherein the cartridge comprises a cylindrical cartridge.

118. The system of claim 117 wherein the cylindrical cartridge has a circumference of about 3 to about 30 inches.

119. The media of claim 1 wherein when tested under conditions of exposure for a test period of 16 hours to test conditions of 140° F. air at a relative humidity of 100%, retains greater than 30% of the fiber changed for filtration purposes.

120. The media of claim 5 wherein the polymer is crosslinked.

121. The media of claim 5 wherein the polymer is a polyvinyl alcohol.

122. The media of claim 121 wherein the polyvinyl alcohol is crosslinked.

123. The cartridge of claim 18 wherein the polymer is crosslinked.

124. The cartridge of claim 18 wherein the polymer is a polyvinyl alcohol.

125. The cartridge of claim 124 wherein the polyvinyl alcohol is crosslinked.

126. The filter of claim 28 wherein the polymer is crosslinked.

127. The filter of the claim 28 wherein the polymer is a polyvinyl alcohol.

128. The filter of claim 127 wherein the polyvinyl alcohol is crosslinked.

129. The filter of claim 1 wherein tested under conditions of exposure for a test period of 16 hours to test conditions of 140° F. air at a relative humidity of 100%, retain greater than 30% of the fiber changed for filtration purposes.

130. The media of claim 1 wherein the polymer is crosslinked.

131. The media of claim 1 wherein the polymer is polyvinylalcohol.

132. The media of claim 131 wherein the polyvinylalcohol is crosslinked.

133. The cartridge of claim 12 wherein the polymer is crosslinked.

134. The cartridge of claim 12 wherein the polymer is polyvinylalcohol.

135. The cartridge of claim 134 wherein the polyvinylalcohol is crosslinked.

136. The filter of claim 26 wherein the polymer is crosslinked.

137. The filter of claim 26 wherein the polymer is polyvinylalcohol.

138. The filter of claim 137 wherein the polyvinylalcohol is crosslinked.

139. The method of claim 39 wherein the polymer is crosslinked.

140. The method of claim 39 wherein the polymer is polyvinylalcohol.

141. The method of claim 140 wherein the polyvinylalcohol is crosslinked.

142. The assembly of claim 50 wherein the polymer is crosslinked.

143. The assembly of claim 50 wherein the polymer is polyvinylalcohol.

144. The assembly of claim 143 wherein the polyvinylalcohol is crosslinked.

145. The method of claim 61 wherein the polymer is crosslinked.

146. The method of claim 61 wherein the polymer is polyvinylalcohol.

147. The method of claim 146 wherein the polyvinylalcohol is crosslinked.

148. The filter of claim 69 wherein the polymer is crosslinked.

149. The filter of claim 69 wherein the polymer is polyvinylalcohol.

150. The filter of claim 147, wherein the polyvinylalcohol is crosslinked.

151. The method of claim 74, wherein the polymer is crosslinked.

152. The method of claim 74, wherein the polymer is polyvinylalcohol.

153. The method of claim 152, wherein the polyvinylalcohol is crosslinked.

154. The method of claim 81, wherein the polymer is crosslinked.

155. The method of claim 81, wherein the polymer is polyvinylalcohol.

156. The method of claim 155, wherein the polyvinylalcohol is crosslinked.

157. The method of claim 87, wherein the polymer is crosslinked.

158. The method of claim 87, wherein the polymer is polyvinylalcohol.

159. The method of claim 158, wherein the polyvinylalcohol is crosslinked.

160. The system of claim 94, wherein the polymer is crosslinked.

161. The system of claim 94, wherein the polymer is polyvinylalcohol.

162. The system of claim 161, wherein the polyvinylalcohol is crosslinked.

163. The system of claim 103, wherein the polymer is crosslinked.

164. The system of claim 103, wherein the polymer is polyvinylalcohol.

165. The system of claim 164 wherein the polyvinylalcohol is crosslinked.

166. The system of claim 108, wherein the polymer is crosslinked.

167. The system of claim 108, wherein the polymer is polyvinylalcohol.

168. The system of claim 167, wherein the polyvinylalcohol is crosslinked.

169. The system of claim 114, wherein the polymer is crosslinked.

170. The system of claim 114, wherein the polymer is polyvinylalcohol.

171. The system of claim 170, wherein the polyvinylalcohol is crosslinked.

172. The media of claim 1 wherein the media is treated with an anti-microbial, anti-viral, or anti-mycotic agent.

173. The cartridge of claim 12 wherein the cartridge is treated with an anti-microbial, anti-viral, or anti-mycotic agent.

174. The vacuum cleaner of claim 25 wherein the filter is treated with an anti-microbial, anti-viral, or anti-mycotic agent.

175. The filter of claim 26 wherein the filter is treated with an anti-microbial, anti-viral, or anti-mycotic agent.

176. The method of claim 36 wherein the media is treated with an anti-microbial, anti-viral, or anti-mycotic agent.

177. The air filter assembly of claim 50 wherein the filter is treated wit an anti-microbial, anti-viral, or anti-mycotic agent.

178. The method of claim 61 wherein the filter is treated with an anti-microbial, anti-viral, or anti-mycotic agent.

179. The filtration system of claim 87 wherein the filter element is treated with an anti-microbial, anti-viral, or anti-mycotic agent.

180. The filtration system of claim 94 wherein the filter element is treated wit an anti-microbial, anti-viral, or anti-mycotic agent.

181. The filtration system of claim 103 wherein the filter element is treated with an anti-microbial, anti-viral, or anti-mycotic agent.

182. The vacuum cleaner according to claim 25 that further comprises a pulse-jet cleaning system to remove particulate collected in the filter.

183. The vacuum cleaner according to claim 182 wherein the pulse is directed in a direction opposite to the flow direction of the air in normal operation.

184. The vacuum cleaner according to claim 183 wherein the pulse removes greater than 50% of the particulate in the filter.

185. The vacuum cleaner according to claim 25 that further comprises a vibration cleaning system to remove particulate collected in the filter.

186. The vacuum cleaner according to claim 184 wherein the vibration is directed in a direction opposite to the flow direction of the air in normal operation.

187. The vacuum cleaner according to claim 185 wherein the vibration removes greater than 50% of the particulate in the filter.

188. The method of claim 40, wherein the method comprises a step of directing a vibration of air through the media pack to remove particulate collected in the media pack.

189. The method of claim 40 wherein the method comprises a step of directing a reverse pressure pulse of air through the media pack to remove particulate collected in the media pack.

190. The method of claim 189 wherein the vibration removes greater than 50% of the particulate in the media pack.

191. The air filter assembly of claim 51, wherein the pulse is directed in a direction apposite to the flow direction of the air in normal operation.

192. The air filter assembly of claim 191, wherein the pulse removes greater than 50% of the particulate in the filter.

193. The air filter assembly according to claim 55, wherein the vibration is directed in a direction opposite to the flow direction of the air in normal operation.

194. The air filter assembly according to claim 193 wherein the vibration removes greater than 50% of the particulate in the filter.

195. The method according to claim 74 further including directing a vibration of air into each of the clean air plenums of each of the filter element pairs to at least partially remove particulates collected on each of the media packs.

196. The method according to claim 195, wherein the vibration is directed in a direction opposite to the flow direction of air in normal operation.

197. The method according to claim 196, wherein the vibration removes greater than 50% of the particulate in the filter.

198. The method according to claim 79, wherein the pulse is directed in a direction opposite to the flow direction of air in normal operation.

199. The method according to claim 198, wherein the pulse removes greater than 50% of the particulate in the filter.

200. The method according to claim 81 further including directing a vibration of air into each of the clean air plenums of each of the filter element pairs to at least partially remove particulates collected on each of the media packs.

201. The method according to claim 200, wherein the vibration is directed in a direction opposite to the flow direction of air in normal operation.

202. The method according to claim 201, wherein the vibration removes greater than 50% of the particulate in the filter.

203. The method according to claim 86, wherein the pulse is directed in a direction opposite to the flow direction of air in normal operation.

204. The method according to claim 203, wherein the pulse removes greater than 50% of the particulate in the filter.

205. The system according to claim 87 that further comprises a pulse-jet cleaning system to remove particulate collected in the filter.

206. The system according to claim 205 wherein the pulse is directed in a direction opposite to the flow direction of the air in normal operation.

207. The system according to claim 206 wherein the pulse removes greater than 50% of the particulate in the filter.

208. The system according to claim 87 that further comprises a vibration cleaning system to remove particulate collected in the filter.

209. The system according to claim 208 wherein the vibration is directed in a direction opposite to the flow direction of the air in normal operation.

210. The system according to claim 209 wherein the vibration removes greater than 50% of the particulate in the filter.

211. The system according to claim 94 that further comprises a pulse-jet cleaning system to remove particulate collected in the filter.

212. The system according to claim 211 wherein the pulse is directed in a direction opposite to the flow direction of the air in normal operation.

213. The system according to claim 212 wherein to pulse removes greater than 50% of the particulate in the filter.

214. The system according to claim 94 that further comprises a vibration cleaning system to remove particulate collected in the filter.

215. The system according to claim 214 wherein the vibration is directed in a direction opposite to the flow direction of the air in normal operation.

216. The system according to claim 215 wherein the vibration removes greater than 50% of the particulate in the filter.

217. The system according to claim 108 that further comprises a pulse-jet cleaning system to remove particulate collected in the filter.

218. The system according to claim 217 wherein the pulse is directed in a direction opposite to the flow direction of the air in normal operation.

219. The system according to claim 218 wherein the pulse removes greater than 50% of the particulate in the filter.

220. The system according to claim 108 that further comprises a vibration cleaning system to remove particulate collected in the filter.

221. The system according to claim 220 wherein the vibration is directed in a direction opposite to the flow direction of the air in normal operation.

222. The system according to claim 221 wherein the vibration removes greater than 50% of the particulate in the filter.

223. The system according to claim 114 that further comprises a pulse-jet cleaning system to remove particulate collected in the filter.

224. The system according to claim 223 wherein the pulse is directed in a direction opposite to the flow direction of the air in normal operation.

225. The system according to claim 224 wherein the pulse removes greater than 50% of the particulate in the filter.

226. The system according to claim 114 that further comprises a vibration cleaning system to remove particulate collected in the filter.

227. The system according to claim 226 wherein the vibration is directed in a direction opposite to the flow direction of the air in normal operation.

228. The system according to claim 227 wherein the vibration removes greater than 50% of the particulate in the filter.

* * * * *

UNITED STATES PATENT AND TRADEMARK OFFICE
CERTIFICATE OF CORRECTION

PATENT NO. : 7,008,465 B2
APPLICATION NO. : 10/869459
DATED : March 7, 2006
INVENTOR(S) : Graham et al.

It is certified that error appears in the above-identified patent and that said Letters Patent is hereby corrected as shown below:

Col. 10, line 3: "can be crosslinlced using" should read --can be crosslinked using--

Col. 10, line 7: melamine-fonnaldehyde" should read --melamine-formaldehyde--

Col. 27, lines 46-47: "material," absorption material," should read --material," "absorption material,"--

Col. 29, line 35: "by the teaci gs of" should read --by the teachings of--

Col. 43, line 23: "filter media amount" should read --filter media is related to the amount--

Col. 45, line 20, claim 12: "35 to 99,99995%" should read --35 to 99.99995%--

Col. 46, line 3, claim 25: "35 to 99,99995%" should read --35 to 99.99995%--

Col. 46, line 28, claim 26: "35 to 99,99995%" should read --35 to 99.99995%--

Col. 47, line 43, claim 39: "35 to 99,99995%" should read --35 to 99.99995%--

Col. 47, line 48, claim 40: "of 1400° F. air" should read --of 140° F. air--

Col. 49, lines 1-2, claim 50: "$3 \times 10^{-7}$ to $6 \times 10^{31\,5}$ gram-cm$^{-2}$, an avenge pore size" should read --$3 \times 10^{-7}$ to $6 \times 10^{-5}$ gram-cm$^{-2}$, an average pore size--

Col. 49, line 10, claim 50: "35 to 99,99995%" should read --35 to 99.99995%--

Col. 49, line 24, claim 53: "Au air filter" should read --An air filter--

Col. 50, line 39, claim 61: "wit the first air" should read --with the first air--

Col. 50, line 58, claim 61: "35 to 99,99995%" should read --35 to 99.99995%--

Col. 51, line 32, claim 68: "further Including" should read --further including--

Col. 51, line 42, claim 69: "media composites" should read --media composite,--

Col. 51, line 46, claim 69: "$3 \times 10^{-7}$ to $6 \times 10^{-1\,n}$" should read --$3 \times 10^{-7}$ to $6 \times 10^{-5}$--

Col. 54, line 54, claim 69: "35 to 99,99995%" should read --35 to 99.99995%--

UNITED STATES PATENT AND TRADEMARK OFFICE
CERTIFICATE OF CORRECTION

PATENT NO. : 7,008,465 B2
APPLICATION NO. : 10/869459
DATED : March 7, 2006
INVENTOR(S) : Graham et al.

It is certified that error appears in the above-identified patent and that said Letters Patent is hereby corrected as shown below:

Col. 52, line 28, claim 74: "99,99995% and an" should read --99.99995% and an--

Col. 53, line 18, claim 81: "35 to 99,99995%" should read --35 to 99.99995%--

Col. 53, line 56, claim 87: "lb-3000 ft$^{31\ 2}$ a layer" should read --lb-3000 ft$^{-2}$, a layer--

Col. 53, line 60, claim 87: "99,99995% and an" should read --99.99995% and an--

Col. 54, line 24, claim 94: "35 to 99,99995%" should read --35 to 99.99995%--

Col. 54, lines 50-51, claim 103: "air intake then intake, the intake comprising" should read --air intake, the intake comprising--

Col. 54, line 55, claim 103: "6x10$^{-5\ gm-cm31\ 2}$," should read --6x10$^{-5}$ gm-cm$^{-2}$,--

Col. 54, line 63, claim 103: "35 to 99,99995%" should read --35 to 99.99995%--

Col. 55, line 12, claim 108: "the strem a filter" should read --the stream a filter--

Col. 55, line 25, claim 108: "35 to 99,99995%" should read --35 to 99.99995%--

Col. 55, line 55, claim 114: "99,99995% and an" should read --99.99995% and an--

Col. 57, line 1, claim 150: "claim 147," should read --claim 149,--

Col. 57, line 55, claim 176: "claim 36 wherein" should read --claim 39 wherein--

Col. 57, line 58, claim 177: "treated wit an" should read --treated with an--

Col. 57, line 66, claim 180: "treated wit an" should read --treated with an--

Col. 58, line 33, claim 191: "direction apposite to" should read --direction opposite to--

UNITED STATES PATENT AND TRADEMARK OFFICE
CERTIFICATE OF CORRECTION

PATENT NO. : 7,008,465 B2
APPLICATION NO. : 10/869459
DATED : March 7, 2006
INVENTOR(S) : Graham et al.

It is certified that error appears in the above-identified patent and that said Letters Patent is hereby corrected as shown below:

Col. 58, line 38, claim 193: "to claim 55," should read --to claim 51,--

Signed and Sealed this

Eighth Day of August, 2006

JON W. DUDAS
*Director of the United States Patent and Trademark Office*